United States Patent
Ball et al.

(10) Patent No.: US 10,761,538 B2
(45) Date of Patent: Sep. 1, 2020

(54) SYSTEMS AND METHODS FOR ENHANCED COLLISION AVOIDANCE ON LOGISTICS GROUND SUPPORT EQUIPMENT USING MULTI-SENSOR DETECTION FUSION

(71) Applicant: FEDEX CORPORATE SERVICES, INC., Collierville, TN (US)

(72) Inventors: John E. Ball, Starkville, MS (US); Reuben F. Burch, V, Columbus, MS (US); Lucas D. Cagle, Starkville, MS (US); Collin S. Davenport, Vicksburg, MS (US); James R. Gafford, Charlotte, NC (US); Tyler J. Hannis, Starkville, MS (US); Andrew R. Hegman, Carmel, IN (US); Andrew M. LeClair, Starkville, MS (US); Yucheng Liu, Starkville, MS (US); Michael S. Mazzola, Mint Hill, NC (US); Howard G. McKinney, Bartlett, TN (US); Tasmia Reza, Central, SC (US); Jian Shi, Starkville, MS (US); Pan Wei, Cambridge, MA (US); Dennison W. Iacomini, Pensacola, FL (US)

(73) Assignee: FEDEX CORPORATE SERVICES, INC., Collierville, TN (US)

( * ) Notice: Subject to any disclaimer, the term of this patent is extended or adjusted under 35 U.S.C. 154(b) by 3 days.

(21) Appl. No.: 16/285,542

(22) Filed: Feb. 26, 2019

(65) Prior Publication Data
US 2019/0265714 A1    Aug. 29, 2019

Related U.S. Application Data

(60) Provisional application No. 62/635,274, filed on Feb. 26, 2018, provisional application No. 62/650,118,
(Continued)

(51) Int. Cl.
*G06F 7/70* (2006.01)
*G05D 1/02* (2020.01)
(Continued)

(52) U.S. Cl.
CPC .......... *G05D 1/0223* (2013.01); *G01S 17/931* (2020.01); *G05D 1/0221* (2013.01);
(Continued)

(58) Field of Classification Search
CPC .. G05D 1/0223; G05D 1/0248; G05D 1/0236; G05D 1/0221; G05D 1/024;
(Continued)

(56) References Cited

U.S. PATENT DOCUMENTS

| | | | | |
|---|---|---|---|---|
| 5,940,012 A | * | 8/1999 | Studebaker | B60Q 9/007 180/167 |
| 2010/0017128 A1 | * | 1/2010 | Zeng | G01S 13/865 701/301 |

(Continued)

FOREIGN PATENT DOCUMENTS

CN    102156476 B    12/2013

OTHER PUBLICATIONS

Puente et al. "Review of mobile mapping and surveying technologies", In: Measurement, Mar. 21, 2013 (Mar. 21, 2013) Retrieved on Jun. 6, 2019 (Jun. 6, 2019} from <https://www.sciencedirect.com/science/article/pii/S0263224113000730> entire document.
(Continued)

*Primary Examiner* — Shardul D Patel
(74) *Attorney, Agent, or Firm* — Withers & Keys, LLC

(57) ABSTRACT

Enhanced systems and methods for collision avoidance of a high value asset with reflective beacons around it using multi-sensor data fusion on a mobile industrial vehicle. The system has a sensing processing system with a LiDAR and camera sensors, and a multi-processor module responsive to
(Continued)

the different sensors. The sensing processing system fuses the different sensor data to locate the reflective beacons. A model predictive controller on the vehicle determines possible control solutions where each defines a threshold allowable speed for the vehicle at discrete moments based upon an estimated path to a breaching point projected from the reflective beacons, and then identifies an optimal one of the control solutions based upon a performance cost function and associated with an optimal threshold allowable speed. The system has a vehicle actuator configured to respond and alter vehicle movement to avoid a collision when the vehicle exceeds the optimal threshold allowable speed.

45 Claims, 40 Drawing Sheets

Related U.S. Application Data filed on Mar. 29, 2018, provisional application No. 62/665,822, filed on May 2, 2018.

(51) Int. Cl.
*G06N 3/08* (2006.01)
*G06N 5/04* (2006.01)
*G01S 17/931* (2020.01)

(52) U.S. Cl.
CPC ......... *G05D 1/0236* (2013.01); *G05D 1/0248* (2013.01); *G06N 3/08* (2013.01); *G06N 5/046* (2013.01)

(58) Field of Classification Search
CPC ......... G05D 2201/0216; G05D 1/0217; G05D 1/0274; G01S 17/931; G01S 17/86; G06N 5/046; G06N 3/08; G06N 7/02; G06N 5/048; G06N 20/10; G06N 3/0454; B64F 1/32; G06F 7/70
USPC ............................ 701/70, 301; 180/167, 169
See application file for complete search history.

(56) References Cited

U.S. PATENT DOCUMENTS

| | | | |
|---|---|---|---|
| 2016/0100521 A1* | 4/2016 | Halloran | G01S 13/46 180/169 |
| 2017/0057498 A1* | 3/2017 | Katoh | B60W 10/184 |
| 2017/0146350 A1* | 5/2017 | Beaurepaire | H04W 12/08 |
| 2018/0362028 A1* | 12/2018 | Prokhorov | B62D 15/0255 |

OTHER PUBLICATIONS

PCT Application No. PCT/US2019/019525 International Search Report and Written Opinion, dated Jun. 24, 2019.

\* cited by examiner

| Feature Number | Data Subset | Analysis Region | Description |
|---|---|---|---|
| 1 | HT | Inner | Extent of Z in cluster. Extent {Z} = max{Z} - min{Z}. |
| 2 | LT | Outer | Max of X and Y extents in cluster, beam 7. This is max {extent[X], extent[Y]}. Extent {X} = max{X} - min{X}. Extent {Y} = max{Y} - min{Y}. |
| 3 | LT | Outer | Max of X and Y extents in cluster, beam 5. This is max {extent[X], extent[Y]}. Extent {X} = max{X} - min{X}. Extent {Y} = max{Y} - min{Y}. |
| 4 | HT | Outer | Max{Z in cluster - LiDAR height}. Z is vertical (height) of LiDAR return. |
| 5 | LT | Outer | Extent of Z in cluster. Extent {Z} = max{Z} - min{Z}. |
| 6 | LT | Inner | Number of valid points in cluster, beam 7. |
| 7 | LT | Inner | Max of X and Y extents in cluster, beam 6. This is max {extent[X], extent[Y]}. Extent {X} = max{X} - min{X}. Extent {Y} = max{Y} - min{Y}. |
| 8 | LT | Outer | Number of points in cluster, beam 5. |
| 9 | LT | Inner | Extent of X in cluster. Extent {X} = max{X} - min{X}. |
| 10 | LT | Inner | Number of points in cluster, beam 4. |
| 11 | LT | Inner | Number of points in cluster, beam 5. |
| 12 | LT | Outer | Number of points in cluster, beam 6. |
| 13 | HT | Inner | Number of points in cluster, beam 6. |
| 14 | LT | Inner | Max of X and Y extents in cluster, beam 5. This is max {extent[X], extent[Y]}. Extent {X} = max{X} - min{X}. Extent {Y} = max{Y} - min{Y}. |
| 15 | LT | Outer | Number of points in cluster divided by the cluster radius in beam 5. |
| 16 | LT | Inner | Extent of X in cluster. Extent {X} = max{X} - min{X}. |
| 17 | HT | Inner | Number of points in cluster, beam 7. |
| 18 | LT | Inner | Number of points in cluster. |
| 19 | LT | Outer | Number of points in cluster. |
| 20 | LT | Outer | Extent of Z in cluster. Extent {Y} = max{Y} - min{Y}. |

FIG 28

Table 2. LiDAR training confusion matrix

|  | Beacon | Non-Beacon |
|---|---|---|
| Beacon | 13,158 | 32 |
| Non-Beacon | 610 | 14,599 |

Table 3. LiDAR testing confusion matrix

|  | Beacon | Non-Beacon |
|---|---|---|
| Beacon | 5,653 | 13 |
| Non-Beacon | 302 | 11,782 |

FIG 37

SYSTEMS AND METHODS FOR ENHANCED COLLISION AVOIDANCE ON LOGISTICS GROUND SUPPORT EQUIPMENT USING MULTI-SENSOR DETECTION FUSION

PRIORITY APPLICATIONS

The present application hereby claims the benefit of priority to related and commonly owned U.S. provisional patent applications as follows: U.S. Provisional Patent Application No. 62/635,274 filed Feb. 26, 2018 and entitled "Systems and Methods for Enhanced Collision Avoidance on Logistics Ground Support Equipment Using Multi-sensor Detection Fusion;" U.S. Provisional Patent Application No. 62/650,118 filed Mar. 29, 2018 and entitled "Systems and Methods for Enhanced Collision Avoidance on Logistics Ground Support Equipment Using Multi-sensor Detection Fusion;" and U.S. Provisional Patent Application No. 62/665,822 filed May 2, 2018 and entitled "Systems and Methods for Enhanced Collision Avoidance on Logistics Ground Support Equipment Using Multi-sensor Detection Fusion."

FIELD OF THE DISCLOSURE

The present disclosure generally relates to systems, apparatus, and methods in the field of collision avoidance systems and, more particularly, to various aspects of systems, apparatus, and methods related to enhanced collision avoidance structure and techniques for use by mobile industrial vehicles, such as a cargo tractor and associated dollies.

BACKGROUND

Collision avoidance may be important in many applications, such as Advanced driver-assistance systems (ADAS), industrial automation, and robotics. Conventional collision avoidance systems are commonly known to reduce the severity or occurrence of a collision or provide a forward collision warning.

In an industrial automation setting, certain areas are commonly off limits to a vehicle (e.g., automated vehicles or non-automated vehicles) for the protection of people and high value assets where damage is to be avoided. These areas may be quarantined by mapping (e.g., GPS coordinates, geofencing, and the like) or defined by markers that delineate a no-entry area. Collision avoidance systems may then be used to avoid the no-entry area or restricted space, which protects people and/or high value assets.

One common problem with conventional collision avoidance systems may come from detecting and reacting to false positives. For example, a collision avoidance system may suffer from false positives when detecting objects/markers and not delineating intended markers and non-intended reflective surfaces (such as a worker safety vest). The detection of false positives typically results in sub-optimal performance due to the response of the control system to all detections. Control response to false detections may result in unnecessary action which results in reduction of efficiency. The impact of false positive detection to an autonomous/semi-autonomous system is application specific. Tolerance of false positive detection may be integrated into the system design. The capability of a sensing platform to an application may be defined by false positive detection as well as missed true detection. Other common problems encountered with collision avoidance systems using some types of sensors may be the inability to handle varying degrees of illumination and the inability to differentiate colors.

To address one or more of these types of problems, there is a need for a technical solution that may be deployed to enhance ways to avoid collisions causing damage to logistics vehicles (such as cargo tractors and associated dollies) and doing so in an enhanced manner that improves system performance and helps reduce false positives. In particular, what is described are various exemplary types of delineation methods and systems where an industrial vehicle may use a light detection and ranging (LiDAR) sensor and multiple color cameras to detect beacons as types of markers, and deploy one or more model-predictive control systems to stop the vehicle from entering a restricted space as a way to avoid damage or contact with high value assets and provide an enhanced implementation of object detection and avoidance.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In general, aspects of the disclosure relate to improved collision avoidance systems, methods, apparatus, and techniques that help avoid false object detection and improve the ability to avoid collisions involving towed dollies that do not follow the same travel path of a towing vehicle, such as a mobile industrial vehicle (e.g., a cargo tractor that can be pulling multiple dollies loaded with items being transported and moved as part of one or more logistics operations).

In one aspect of the disclosure, a method is described for enhanced collision avoidance by a mobile industrial vehicle of a high value asset based upon multi-sensor data fusion. In this aspect, the high value asset has one or more reflective beacons disposed relative to the high value asset. The method begins with a LiDAR sensor on the mobile industrial vehicle detecting one or more of the reflective beacons relative to the mobile industrial vehicle. Then, a camera sensor on the mobile industrial vehicle detects one or more objects relative to the mobile industrial vehicle. The method then has a sensor processing system on the mobile industrial vehicle fusing the sensor data detected by each of the LiDAR and camera sensors to identify a relative location of the reflective beacons based upon a multi-sensor fused data source using the detected LiDAR sensor data and the detected camera sensor data. The method then has a model predictive controller on the mobile industrial vehicle determining multiple control solutions, where each of the control solutions defines a threshold allowable speed for the mobile industrial vehicle at discrete moments based upon an estimated path to a breaching point radially projected from the verified relative location of reflective beacons. The method proceeds with the model predictive controller identifying one of the control solutions as an optimal solution with an optimal threshold allowable speed based upon a performance cost function. The method then has a vehicle actuation system on the mobile industrial vehicle responsively actuating a vehicle speed control element when the mobile industrial vehicle exceeds the optimal threshold allowable speed to cause the mobile industrial vehicle to alter movement operations within a time window and achieve a desired movement operation relative to a current speed of the mobile industrial vehicle.

In another aspect of the disclosure, an enhanced system is described for collision avoidance by a mobile industrial vehicle of a high value asset based upon multi-sensor data fusion. In this additional aspect, the high value asset has one or more reflective beacons disposed near it. In general, the system in this aspect includes a sensing processing system on the vehicle, LiDAR and camera sensors on the front of the vehicle, a multi-processor module that can fuse sensor data, a model predictive controller, and a vehicle actuation system. The multi-processor module is responsive to inputs from each of the LiDAR and camera sensors and advantageously fuses the sensor data detected by each of these different sensors to identify a relative location of the reflective beacons based upon a multi-sensor fused data source using the detected LiDAR sensor data and the detected camera sensor data. The model predictive controller on the mobile industrial vehicle is configured by being programmatically operative to determine multiple control solutions and identify one as an optimal control solution. Each of the control solutions defines a threshold allowable speed for the mobile industrial vehicle at discrete moments based upon an estimated path to a breaching point radially projected from the verified relative location of the reflective beacons. The model predictive controller identifies one of the control solutions as the optimal solution associated with an optimal threshold allowable speed based upon a performance cost function. The vehicle actuation system (having a vehicle actuator) is configured to respond to when the vehicle exceeds the optimal threshold allowable speed by causing the vehicle to alter movement operations of the vehicle to avoid collision with the high value asset.

In yet another aspect, another enhanced system is described for collision avoidance by a mobile industrial vehicle of a high value asset based upon multi-sensor data fusion. In this further aspect, the enhanced system has reflective beacons disposed relative to pre-designated positions on the high value asset, a sensing processing system on the vehicle, a model predictive controller on the vehicle, and a vehicle actuation system on the vehicle. The sensing processing system has a LiDAR sensor mounted in a forward orientation to detect one or more of the reflective beacons in front of the mobile industrial vehicle, and a camera sensor mounted in a forward orientation to detect one or more objects in front of the mobile industrial vehicle. The sensing processing system further includes a multi-processor module responsive to inputs from the LiDAR and camera sensors and operative to fuse the sensor data detected by each of the LiDAR sensor and the camera sensor to identify a relative location of the reflective beacons based upon a multi-sensor fused data source using the detected LiDAR sensor data and the detected camera sensor data. To fuse the sensor data detected by each of the LiDAR sensor and the camera sensor in order to identify the relative location of the one or more of the reflective beacons, the multi-processor module of the sensing processing system is operatively configured and programmatically operative to determine one or more bounding boxes based upon sensor data generated by the camera sensor when detecting the one or more objects; determine a mapped space based upon sensor data generated by the LiDAR sensor when detecting the reflective beacons; project the determined bounding boxes into the determined mapped space; and compare the determined bounding boxes to objects detected in the mapped space to verify the relative location of the reflective beacons. The model predictive controller disposed on the mobile industrial vehicle is configured by being programmatically operative to determine multiple control solutions, where each of the control solutions defines a threshold allowable speed for the mobile industrial vehicle at discrete moments based upon an estimated path to a breaching point radially projected from the verified relative location of the reflective beacons; and identify one of the control solutions as an optimal solution based upon a performance cost function, where the optimal control solution is associated with an optimal threshold allowable speed. The vehicle actuation system has at least a vehicle actuator configured to respond to when the mobile industrial vehicle exceeds the optimal threshold allowable speed by causing the mobile industrial vehicle to alter movement operations of the mobile industrial vehicle to avoid collision with the high value asset.

In still another aspect of the disclosure, an enhanced system is described for front guard collision avoidance by a mobile industrial vehicle of objects in a direction of travel of a mobile industrial vehicle based upon multi-sensor data fusion. In this further aspect, the system includes a sensing processing system disposed on the mobile industrial vehicle, a model predictive controller on the vehicle, and a vehicle actuation system on the vehicle. The sensing processing system has a LiDAR sensor mounted in a forward orientation to detect one or more of the objects in front of the mobile industrial vehicle, and a camera sensor mounted in a forward orientation to detect the objects in front of the mobile industrial vehicle. The sensing processing system also includes a multi-processor module responsive to inputs from each of the LiDAR sensor and the camera sensor and operative to fuse the sensor data detected by each of the LiDAR sensor and the camera sensor to identify a relative location of the objects based upon a multi-sensor fused data source using the detected LiDAR sensor data and the detected camera sensor data. The multi-processor module of the sensing processing system is operatively configured to fuse the sensor data detected by each of the LiDAR sensor and the camera sensor in order to identify the relative location of the one or more of the objects by being programmatically operative to determine one or more bounding boxes based upon sensor data generated by the camera sensor when detecting the objects; determine a mapped space based upon sensor data generated by the LiDAR sensor when detecting the objects; project the determined bounding boxes into the determined mapped space; and compare the determined bounding boxes to objects detected in the mapped space to verify the relative location of the objects. The model predictive controller is configured by being programmatically operative to determine different possible control solutions, where each of the possible control solutions defines a threshold allowable speed for the vehicle at discrete moments based upon an estimated path to a breaching point radially projected from the verified relative location of the objects; and identify one of the control solutions as an optimal solution associated with an optimal threshold allowable speed based upon a performance cost function. The vehicle actuation system has at least a vehicle actuator configured to respond to when the mobile industrial vehicle exceeds the optimal threshold allowable speed by causing the mobile industrial vehicle to alter movement operations of the mobile industrial vehicle to avoid collision with the objects.

In yet another aspect, a method is described for enhanced collision avoidance by a mobile industrial vehicle using a multi-mode onboard collision avoidance system and that may operate in a plurality of different operating areas. In this aspect, the method begins with the multi-mode onboard collision avoidance system on the mobile industrial vehicle operating in a first collision avoidance mode while the mobile industrial vehicle is operating in a first of the different operating areas. Next, one of multiple sensors on the multi-mode onboard collision avoidance system detects an object identification marker (such as an ArUco marker), and identified the detected first object identification marker to be an operating boundary identification marker. The method then proceeds with the sensors detecting when the mobile industrial vehicle passes a zonal boundary associated with the operating boundary identification marker and enters a second of the different operating areas, where the multi-mode onboard collision avoidance system automatically and autonomously changes operations from the first collision avoidance mode to a second collision avoidance mode governing operations of the multi-mode onboard collision avoidance system when in the second of the different operating areas. In this situation, the second collision avoidance mode has at least one operating parameter (e.g., speed limit, etc.) that is more restrictive compared to that operating parameter in the first collision avoidance mode.

Additional advantages of these and other aspects of the disclosed embodiments and examples will be set forth in part in the description which follows, and in part will be evident from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIG. 28 is an exemplary table of features and information about such features used as part of the extraction of features for object from LiDAR information in accordance with an embodiment of the invention;

FIG. 37 is a series of tables showing LiDAR training and testing confusion matrix information in accordance with an embodiment of the invention;

DESCRIPTION OF THE EMBODIMENTS

Figure 1:
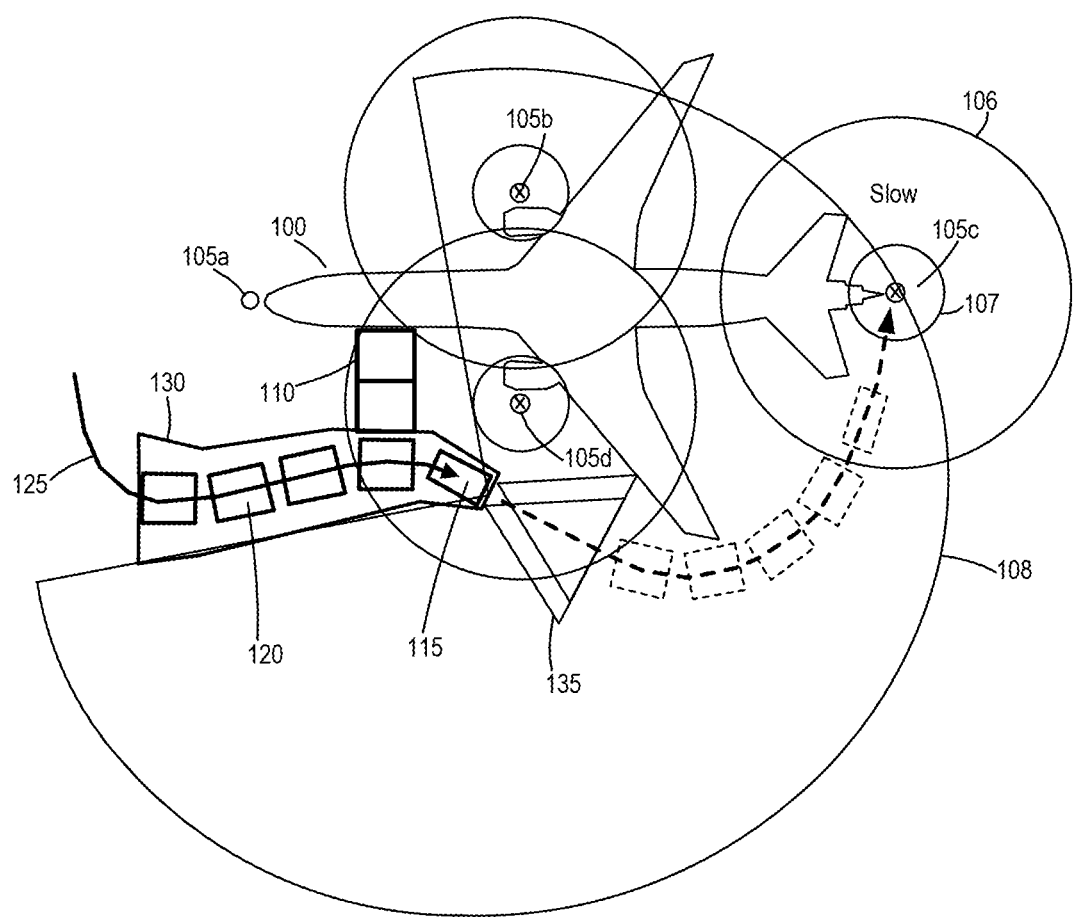
FIG. 1 is a diagram of an exemplary tractor collision avoidance system operational diagram deployed in a logistics environment in accordance with an embodiment of the invention.

Reference will now be made in detail to various exemplary embodiments. Wherever possible, the same reference numbers are used in the drawings and the description to refer to the same or like parts. However, those skilled in the art will appreciate that different embodiments may implement a particular part in different ways according to the needs of the intended deployment and operating environment for the respective embodiments.

The following describes various embodiments of different systems, apparatus, and applied methods that are deployed and used to improve how to prevent and avoid collisions with objects and people (e.g., high value assets) during operation of various mobile industrial vehicles, such as a cargo tractor that pulls one or more dollies or trailers. Furthermore, those skilled in the art will appreciate that additional embodiments may combine some of these otherwise independent solutions to provide for an even more robust system for avoiding collisions with high value assets by a mobile industrial vehicle (such as a cargo tractor and associated dollies) as described in more detail below.

Those skilled in the art will appreciate that the description below includes detailed exemplary information on an exemplary dynamic path-following or kinematics model that may be deployed as part of applied and enhanced system, apparatus, and method embodiments that involve predicting the movement and path of multiple element mobile industrial vehicles, such as a cargo tractor with towed dollies or trailers, as part of avoiding collisions. The description below also includes detailed exemplary information on detailed embodiments that use multiple sensors to generate different types of data (e.g., camera data and LiDAR data) and deploy an innovative, inventive, and advantageous process that fuses such different types of data to improve the detection of objects (e.g., physical structures, aircraft, people, and the like) as part of applied and enhanced system, apparatus, and method embodiments that improve how to avoid collisions.

Generally, an exemplary local system with "front guard" features is described herein that may be used for collision avoidance as a novel fusion of available sensors, feasible real-time control, and the actuators and sensors on a mobile industrial vehicle, such as a cargo-tractor and associated dollies/trailers that can transport items (e.g., unpackaged goods, packaged goods, and containers that may be used for transporting goods). The general system may use a passive beacon detection based aircraft collision avoidance approach and a general object detection based front guard to better reduce the incidence of frontal collisions with any object. Furthermore, such a system may use warning cones as a platform for the passive "beacons" that the cargo-tractor sensors may use for local situational awareness and orientation with respect to vulnerable aircraft parts to be protected. In more detail, such an exemplary system may integrate a sensing and sensor processing system on board a cargo tractor type of mobile industrial vehicle, a cargo tractor/dolly model used by the system, a model predictive controller, and a vehicle actuation system to avoid high value assets. One or more beacons may be placed in strategic positions to allow for highly robust detection and avoidance of the high value assets. Further uses of such a system may be accomplished to achieve object detection and avoidance, which leverages data fusion of different sources of detected potential objects and making timely reactions using the vehicle actuation system.

FIG. 1 is a diagram of an exemplary tractor collision avoidance system operational diagram deployed in a logistics environment in accordance with an embodiment of the invention. As shown in FIG. 1, the logistics environment includes an exemplary aircraft 100 as a type of high value asset. In general, a high value asset may be considered to be certain equipment, structure, and/or people where mobile industrial vehicles (such as cargo tractor 115 and its linked dollies 120) are desired to have limitations when approaching or moving around or near such assets. Indeed, certain areas may be considered a high value asset for the potential of having such equipment, structure, and/or people but do not necessarily have to be currently occupied. In various embodiments described herein, an off limit (or restricted movement) area associated with such a high value asset may be established or determined as a boundary for the protection of that high value asset.

The exemplary aircraft 100, shown from above in FIG. 1, may be a type of high value asset used to transport items as part of a logistics pickup and/or delivery operation. As shown in FIG. 1, the exemplary aircraft 100 has a nose cone structure protruding from the front end of the aircraft, protruding engines on each wing, and tail structure that protrudes from the back end of the aircraft 100. Those skilled in the art will appreciate that such protrusions are examples of points on the aircraft that are of more risk for collisions with mobile industrial vehicles operating in the vicinity of the aircraft. Thus, in this example shown in FIG. 1, an exemplary reflective beacon (e.g., 105a-105d) may be placed adjacent to each of such protrusions and used during operation of the exemplary collision avoidance system described herein. Further information related to such exemplary passive beacons are discussed below relative to FIGS. 5, 6, and 25.

FIG. 1 also illustrates a cargo loading structure 110 shown alongside the fuselage of the exemplary aircraft 100 where items (e.g., unpackaged goods, packaged goods, and containers that may be used for transporting goods) may be loaded into the aircraft 100 from a cargo tractor 115 and its associated dollies 120 or where such items may be off loaded from the aircraft 100 to the cargo tractor 115 and its associated dollies 120 as part of different logistics operations. In general, the cargo tractor 115 may move along a path 125 (noted in solid line in FIG. 1 for actual path and dashed line in FIG. 1 for potential path for purposes of discussion) near the aircraft 100 and its cargo loading structure 115 so as to facilitate pickup and/or delivery of items from its associated dollies 120 to and from the aircraft 100. The concentric rings around beacons 105 in FIG. 1 indicate sensed beacons 105a-d near the high value asset (e.g., the noted protrusions on the aircraft) and protected areas surrounding each beach (e.g., area 106 restricted for no entry, area 107 restricted for slow speed upon entering such an area). Missing beacons outside of the sensor scanning range 108 of the sensor suite on board the cargo tractor are not tracked by the sensor suite.

In this type of logistics environment, several different embodiments that incorporate novel and innovative aspects may be explained that present technical solutions to the technical problem of avoiding collisions by mobile vehicles 115 and their towed vehicles (e.g., dollies and trailers 120) in logistics operations. For example, a "local option" embodiment may leverage use of a self-sufficient autonomous (or semi-autonomous) control system where sensing, calculations, decisions, and action are local relative to individual cargo tractors. In this way, such an embodiment enhances a collision avoidance system for the cargo tractor 115 that requires no communications with other vehicles or additional infrastructure.

In another example, an embodiment may include a passive beacon that uses retroreflective surfaces (e.g., taped or painted surfaces of reflective beacons 105a-d). Generally, such a beacon may be used with an enhanced collision avoidance system on a cargo tractor to improve the weather capabilities of the system, reduce system complexity, and facilitate an advantageously low impact integration with existing standard logistics operating procedures relative to protecting high value assets (such as the aircraft).

In still another example, an embodiment may deploy a novel kinematics model and predictive calculations relative to a cargo tractor and its towed vehicles (e.g., dollies/trailers) to help prevent collisions by the cargo tractor as well as the associated towed dollies even though there is no active detection mechanism deployed on the dollies. The kinematics model, in general, is used to inform calculations performed on processing systems deployed on the cargo tractor of possible future states of the mobile vehicle system (i.e., the powered vehicle as well as the linked towed vehicles that follow). Thus, when using such a model and calculations as part of an exemplary system, a virtual perimeter 130 along the sides of the dolly train may effectively bound the system to prevent collisions from off-tracking the associated towed dollies 120. As shown in FIG. 1, the widening track outline of perimeter 130 indicates a probabilistically determined dolly location that can be used by the exemplary collision avoidance system without the need for actual location sensors to be deployed on the dollies (e.g., via tracking and considering the persistence of detected objects without continued detection of such objects on the sides of the towed train of dollies 120 with further sensors as part of the model and calculations of an exemplary).

In yet another example, a "front guard" type of embodiment may use different sensors, such as a light detection and ranging (LiDAR) sensor and one or more cameras (such as stereo cameras or two mono cameras), to detect objects (including humans, chocks, cones, boxes, and the like, but not necessarily limited to reflective beacons) in the direction of travel 135 of the mobile cargo tractor 115. This embodiment of a fusion-based type of system enhances collision detection where vehicular actuation controls may be involved and applied automatically to prevent collisions (e.g., applying speed control with throttle and/or braking). In some front guard embodiments, sensor data may be filtered to only observe a space defined by the path of the mobile cargo tractor 115. Further front guard embodiments, as described in more detail below, may use a dynamically adjustable field of view (FOV) of sensor data from the LiDAR/camera(s) allowing an embodiment to adaptively respond to objects in the path of the mobile cargo tractor 115 and/or a change in movement of the mobile cargo tractor 115 (e.g., responsively changing the FOV due to an angular velocity of the mobile cargo tractor 115).

In an example that leverages other types of sensors (such as LiDAR and mono camera sensors) looking for beacons, the system may also fuse the different types of sensor data via camera detection bounding boxes into LiDAR space, leverage the predictability of states of the cargo tractors 115 and associated dollies 120 when calculating control solutions, and implement a cost function for each potential control solution to determine in at or near real time a maximum allowable speed at a particular moment (e.g., a moment in time/space). With this determined speed limit, the system may monitor actual speed and may implement responsive deceleration actions within a time window to achieve a desired speed using a feedback control system that actuates the cargo tractor vehicle's brake and/or throttle. As such, this system embodiment leverages the model based calculations to determine shortest realizable paths for collision with detected beacons and a predictive controller part of the system that may continuously or periodically update maximum allowable speeds along such paths. As shown in FIG. 1, the area 106 represents a speed governed zone of a sensed beacon for any cargo tractor traversing such a zone while area 107 represents a virtual barrier representing a no travel or no incursion zone.

In general, an exemplary mobile industrial vehicle 115 that may be deployed as part of an exemplary enhanced collision avoidance system and method of operating the same may be implemented with a cargo tractor type of vehicle capable of pulling one or more dollies or trailers 120 loaded with items being shipped (e.g., being transported between places, being loaded onto a logistics transport, or being offloaded from a logistics transport). Such an exemplary cargo tractor 115 may be enhanced to use a variety of on-board sensing devices (e.g., LiDAR, stereo cameras, mono cameras, ultrasound sensors, laser range finders, radar, and the like). One or more brackets may be used to affix such on-board sensing devices to the cargo tractor. A sensor alignment tool may also be affixed to the front grill plate of the cargo tractor for aiding in the alignment of such on-board sensing devices. The cargo tractor may further include a weatherproof enclosure that protects the suite of electrical and electronic components that make up elements of such an exemplary enhanced collision avoidance system for the cargo tractor against the ingress of unwanted water, chemicals, and other debris. Such electrical and electronic components may, in a general embodiment, include a system interface printed circuit board which manages power and signal interfaces for multiple devices in the enhanced collision avoidance system, a sensor processing system, a model predictive controller that incorporates and makes use of the predictive kinematics model, and a vehicle actuation system as described in more detail below.

Figure 2:
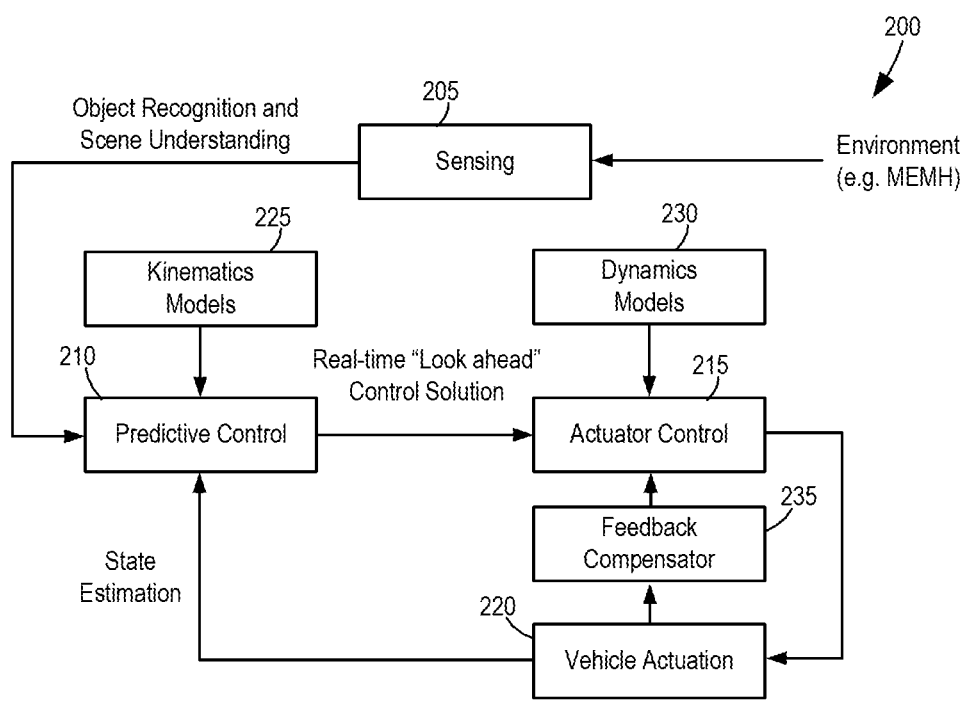
FIG. 2 is an exemplary high level function block diagram for an exemplary collision avoidance system in accordance with an embodiment of the invention.

FIG. 2 is an exemplary high level functional block diagram for an exemplary collision avoidance system in accordance with an embodiment of the invention that illustrates a general flow of operation for such a system 200. Referring now to FIG. 2, the sensing block 205 generally receives and detects information on the cargo tractor's environment (e.g., a camera image, a LiDAR sensed input, etc.). Upon sensing, the system's sensor processing system makes use of the different types of sensed information and is operative to recognize objects and understand the scene being sensed (e.g., is there a reflective passive beacon detected based on the different sensor input). Next, the predictive control block 210 is where multiple real-time "look ahead" control solutions may be generated using an exemplary kinematics models and state estimation 225. Next, the solutions are fed to a feedback control system of an actuator control 215, vehicle actuations (via throttle and braking) 220, a vehicle dynamics database 230 (e.g., characteristics of various vehicle parameters, such as vehicle mass, braking force, etc.), and feedback compensator 235 so that the system responds to recognized objects and leverages that with predictive control solutions to apply the best control solution to improve and enhance how the system avoids collisions for the particular vehicle involved.

Figure 3:
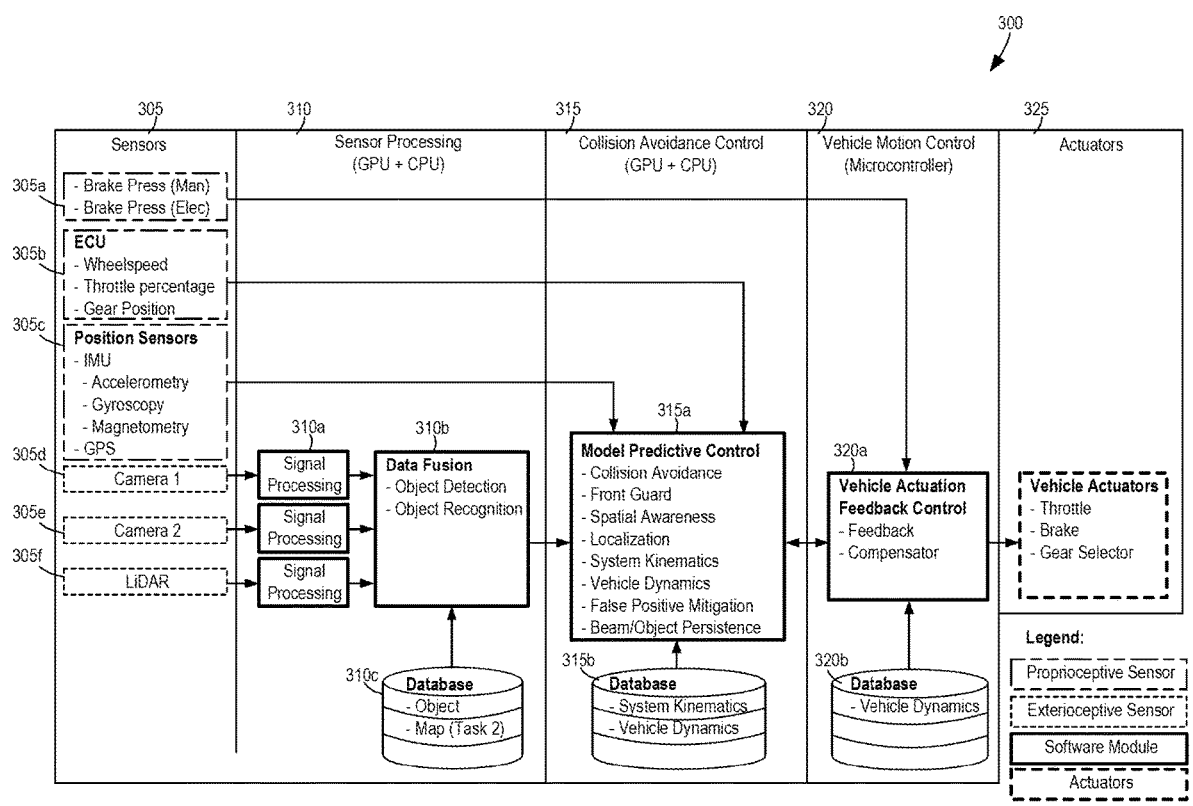
FIG. 3 is a more detailed diagram of an exemplary collision avoidance system shown with logical segmentation of different elements and roles within the system in accordance with an embodiment of the invention.
Figure 4:
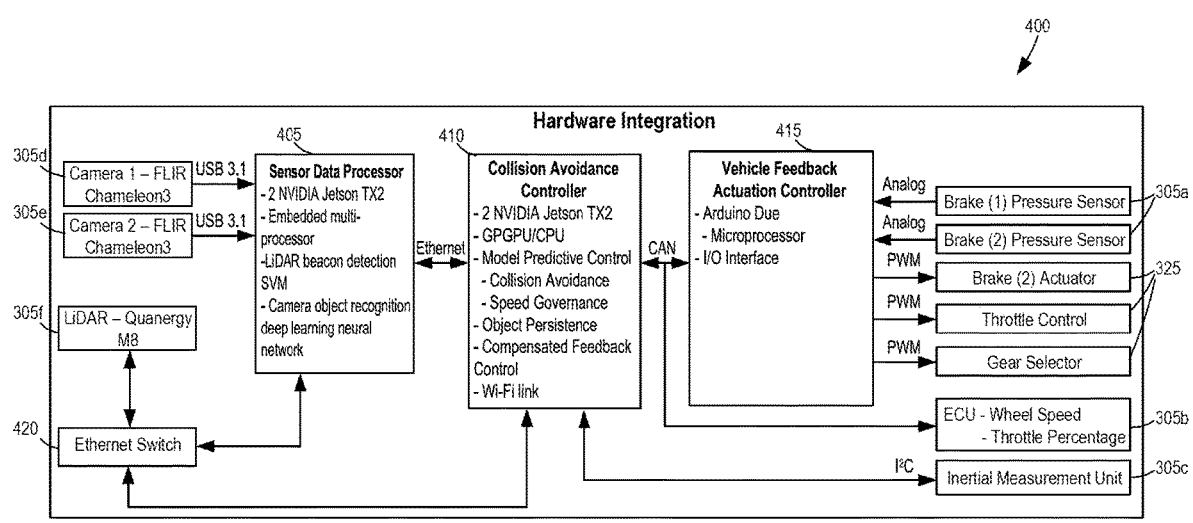
FIG. 4 is a diagram of exemplary implementation details for parts of an exemplary collision avoidance system in accordance with an embodiment of the invention.

FIGS. 3 and 4 illustrate further details of different elements of such an exemplary enhanced collision avoidance system. In particular, FIG. 3 is a more detailed diagram of an exemplary collision avoidance system 300 shown with logical segmentation of different elements and roles within the system in accordance with an embodiment of the invention. Referring now to FIG. 3, elements of an exemplary enhanced collision avoidance system 300 are shown categorized into five different types of system segments: sensors 305, sensor processing 310, collision avoidance control 315, vehicle motion control 320, and actuators 325. In this exemplary embodiment, the sensors segment 305 part of the exemplary system 300 includes proprioceptive sensors (such as brake pressure sensors 305a, ECU related sensors 305b for wheelspeed and throttle percentage, and positional sensors 305c (e.g., inertial measurement based sensors (accelerometer, gyroscope, magnetometer) and receiver based positioning systems (GPS, wireless cell phone locating circuitry, etc.)) as well as exterioceptive sensors (such as cameras 305d, e or LiDAR sensors 305f). The signal processing segment 310 part of the exemplary system includes software-based modules 310a, 310b running on processing platforms that perform signal processing 310a on sensor input from the exterioceptive sensors (e.g., convolutional neural network processing for camera data, data clustering and Support Vector Machine (SVM) processing for LiDAR data) and data fusion processing 310b of each processed sensor input using a database 310c of objects and map information.

The collision avoidance control segment 315 part of the exemplary system 300 includes software-based modules running on other processing platforms (separate from the sensor processing segment 310) that implement the model predictive controller (MPC) 315a. In general, the MPC 315a determines control solutions to determine the maximum allowable speed at a discrete moment in time/space. More particularly, an embodiment of the MPC 315a employs a look-ahead policy and is applicable to discrete event management using supervisory control. In operation, the MPC 315a in this collision avoidance control segment 315 calculates possible control outcomes for the set of control inputs over a limited prediction horizon. With a performance evaluation function (also referred to as a "cost" function related to a performance metric), the MPC 315a predicts and evaluates all reachable system states in the aforementioned prediction horizon such that an optimal outcome can be found, and the corresponding system control input can be selected and transferred to the vehicle controller (i.e., the vehicle motion control segment 320). For example, in one embodiment, the use of "optimal" may mean the predicted control solutions along the most realizable path for collision avoidance which results in the least limiting of vehicle speed while ensuring collision are prevented. This process repeats until a predefined objective is reached, such as system operating in a safe zone away from passive beacons and other obstacles. As such, the MPC 315a may be used for collision avoidance, front guard, spatial awareness, local option focused solutions, system kinematics, vehicle dynamics, false positive mitigation, as well as beacon/object persistence deployed on mobile industrial vehicles and solutions as mentioned herein that use such an enhanced collision avoidance system on a cargo tractor type of vehicle. Further, the MPC 015a is able to access one or more databases 315b with the predictive kinematics model information as well as vehicle dynamics information stored thereon. The vehicle motion control segment 320 part of the exemplary system 300 includes a software module running on yet another processor (e.g., a microcontroller) that implements a vehicle actuation feedback control system 320a accessing the vehicle dynamics information from a database 320b and operating as a feedback compensator to provide input to vehicle actuators 325 (such as the cargo tractor's throttle and/or braking system and/or a gear selector on the cargo tractor).

While FIG. 3 provides implementation details about an embodiment from more of a data processing and data flow perspective, FIG. 4 is a diagram illustrating exemplary hardware implementation details for elements of such an exemplary enhanced collision avoidance system 400 in accordance with an embodiment of the invention. Referring now to FIG. 4, the exemplary hardware integration diagram illustrates three different core processing systems or controllers—namely, the sensor data processor 405, the collision avoidance controller 410, and the vehicle feedback actuation controller 415. Those skilled in the art will appreciate that each of these processors/controllers may be implemented using one or more different processor-based systems (e.g., general purpose graphics processing unit (GP-GPU), central processing unit (CPU), microprocessor, microcontroller, multi-processor, multi-core processor, system-on-a-chip (SoC), or other discrete processing based device) that may include onboard communication interfaces, I/O interfacing circuitry, and associated peripheral circuitry used to interface with the cameras, LiDAR, network switching components, ECU, IMU, and vehicle actuator and vehicle sensor elements as required by the described usage application.

For example, as shown in FIG. 4, the exemplary sensor data processor 405 receives inputs from different cameras (e.g., camera 1 305d and camera 2 305e—each of which may be implemented as forward looking infrared camera sensors) using a USB 3.1 connection for the quicker and more robust transfer of information from the sensors to the embedded multi-processor of the sensor data processor 405 (e.g., 2 NVIDIA Jetson TX2 embedded AI computing devices, which are essentially different AI supercomputers on a module for use in edge applications where each has CPU and GPU structures with a variety of standard interfacing hardware). The sensor data processor 405 also receives LiDAR input from the LiDAR sensor 305f over an Ethernet connection (e.g., via an Ethernet switch 420). With these inputs, the sensor data processor 405 (which may be implemented with both CPU and GPU processors) is operative to detect beacons and objects using a novel fusion of camera and LiDAR data. More specifically, the LiDAR sensor 305f detects beacons and differentiates beacons from other objects (such as people, vehicles, cargo tractors, and the like). The cameras 305d,e detect multiple objects (such as people, beacons, chocks, vehicles, and the like) and provide camera data to the sensor data processor 405 where such objects may be recognized using a learning neural network (e.g., a convolutional neural network trained for such recognition). The data fusion software module 310b running on the sensor data processor 4005 then fuses these different types of data by projecting the camera detection bounding boxes into the LiDAR space. The fusion of these two different and distinct data sources into a multi-sensor fused data source provides a level of enhanced and improved performance when avoiding collisions.

The exemplary collision avoidance controller 410 shown in FIG. 4 has Ethernet connectivity to the sensor data processor 405, and may be implemented, for example, using an NVIDIA Jetson TX2 module having GPGPU/CPU hardware and onboard interfacing hardware. The collision avoidance controller 410 runs the model predictive control software module 315a, which is used as a type of look-ahead controller that predicts the shortest possible path to breaching a point in space radially projected from beacon locations.

In one embodiment, the model predictive control (MPC) software 315a running on the collision avoidance controller 410 incorporates a system kinematics model of the tractor and dollies (an exemplary embodiment of which is described in more detail below) to predict potential collisions between any portion of the tractor/dolly train with the high valued asset. As noted, the MPC software 315a calculates control solutions to determine the maximum allowable speed at any discrete moment in time/space. The timely nature of the collision avoidance issues means that calculation of the MPC solution is executed in real time or substantially in real time. In particular, those skilled in the art will appreciate that the control solutions determined by the MPC software 315a running on the collision avoidance controller 410 involves a large set of possible solutions, where a cost for each solution which prevents collision is calculated. A cost function compares the cost of each possible solution determined by the MPC, and the MPC software 315a may choose an optimal one of the possible solutions based upon the criteria defined by the cost function. As each of the possible solutions may be calculated independently, embodiments of the MPC software 315a may compute such solutions in parallel taking advantage of a real time operating system used by the collision avoidance controller 410 and, in some embodiments, the multi-core/multi-threading capabilities of the collision avoidance controller 410 itself (e.g., the 256 CUDA capable core parallel computing platform and the NVIDIA Pascal GP-GPU processing complex used in the NVIDIA Jetson TX2 computing module).

The MPC software 315a running on the collision avoidance controller 410, as described herein, is further used for speed governance (e.g., calculating control solutions to determine the maximum allowable speed at discrete moments in time/space). The collision avoidance controller 410 may receive information from positioning circuitry and elements 3005c, such as a GPS on board the cargo tractor or an inertial measurement unit or other position sensors (as shown in FIG. 3). As part of an embodiment of an enhanced collision avoidance system 400, the collision avoidance controller 410 provides outputs on a controller area network (CAN) bus to the vehicle feedback actuation controller 415. Such a CAN bus provides a standard mechanism for vehicular communication and automotive interfacing to parts of the cargo tractor, such as the brakes and throttle, the ECU 3005b on the cargo tractor.

The exemplary vehicle feedback actuation controller 415 shown in FIG. 4 has CAN connectivity to the collision avoidance controller 410 as well as other interfacing circuitry (e.g., analog, pulse-width modulation (PWM), or other parallel, serial, digital or other sensing/actuation line interfaces) to control parts of the cargo tractor (e.g, the brake and throttle). The exemplary vehicle feedback actuation controller 415 may be implemented, for example, using an Arduino Due single board 32-bit ARM core microcontroller module having hardware and onboard interfacing hardware. The vehicle actuation feedback control software 320a running on the exemplary vehicle feedback actuation controller 415 typically calculates a rate of deceleration to achieve a desire speed within a particular time window. A feedback control system implemented by the vehicle actuation feedback control software 320a running on controller 415 actuates the tractor brake and throttle controls 325 to achieve the calculated acceleration or deceleration. This feedback system is capable of bringing the vehicle to a complete stop if desired (e.g., if the mobile industrial vehicle is approaching a no entry area 106 around a reflective beacon 105).

Thus, FIGS. 3 and 4 provide exemplary functional, software, and hardware implementation details related to an embodiment of an enhanced collision avoidance system and method of operating such an enhanced collision avoidance system. Additionally, those skilled in the art will appreciate that while FIG. 4 shows three distinct and different processor/controller hardware devices, further embodiments of the exemplary enhanced collision avoidance system may implement these with a single or other multiple processor or logic based solutions that have various software-based modules operating to perform the described enhanced collision avoidance functionality.

Figure 5:
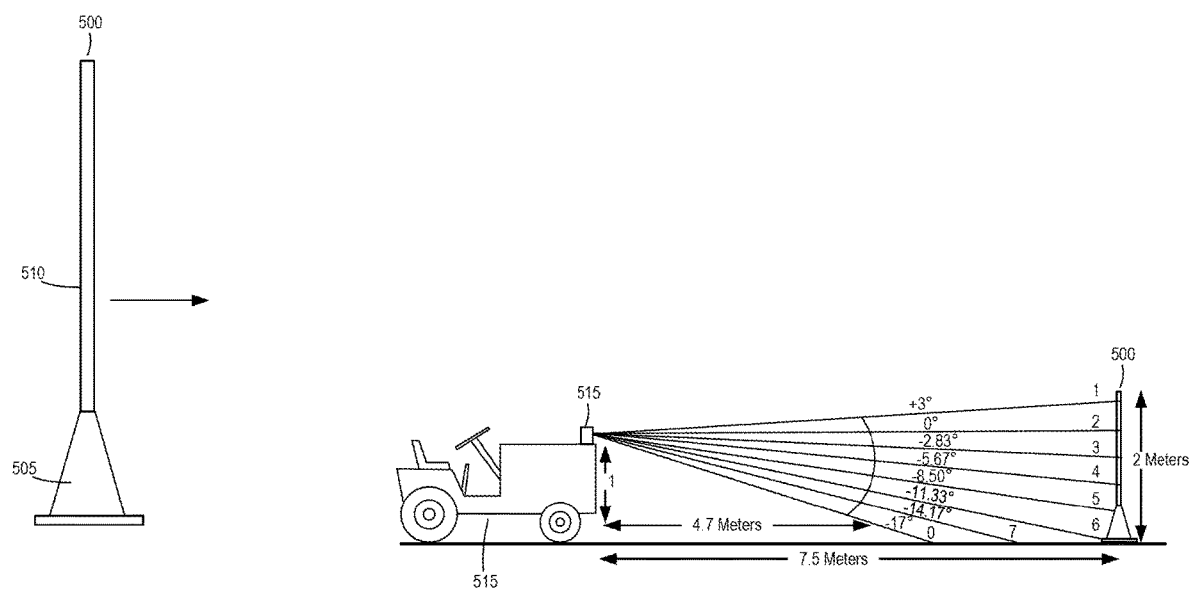
FIG. 5 is a diagram with details on an exemplary passive beacon for use with an exemplary collision avoidance system in accordance with an embodiment of the invention.

FIG. 5 is a diagram illustrating details on an exemplary passive beacon 500 for use with an exemplary collision avoidance system in accordance with an embodiment of the invention. In general, such an exemplary passive beacon 500 may have a characteristic shape so as to yield a particular recognizable return that may be more readily identifiable as the beacon, in contrast to and as opposed to other objects. For example, in a particular embodiment, the exemplary passive beacon 500 may be a tall and thin object with highly reflective material on it so as to stand out as a tall bright object, whereas other objects (e.g., cargo tractors, people, etc.) may have a bright return but are typically much wider in comparison.

Referring now to FIG. 5, an example of such an exemplary passive beacon 500 is shown that integrates a base support 505 (e.g., a traffic cone) with a pole 510 extending up from the base support. The pole includes reflective material disposed along the length of the pole. Such material may be a retro-reflective tape in the near infrared and visible light spectrum, but other embodiments may include other types of reflective material that correspond to what may be detected by sensors (such as the LiDAR sensor) used on the cargo tractor. By integrating the pole with the base support, the visibility of the beacon may be increased to sensing cargo tractors and their sensors. As shown in FIG. 5, an exemplary LiDAR sensor 515 on vehicle 115 may have a characteristic distance/angle of reception where such an increased height of the beacon resulting from use of the pole presents a better target for detection efforts by the LiDAR. For example, the exemplary LiDAR sensor 515 shown in FIG. 5 is an 8-beam LiDAR unit with beams focusing at different heights and azimuth angles. The data detected by such an exemplary LiDAR sensor typically comprises discrete points in space and intensity.

However, some sensors (such as the mono camera) on the cargo tractor may use the color and/or shape of the base support (e.g., traffic cone) as distinguishing features used for enhanced detection of the beacon in combination with returns captured by the LiDAR. In one embodiment, the beacon may be passive and unpowered. However, those skilled in the art will appreciate that other embodiments of the beacon may be powered to provide more visibility to a cargo tractor's sensor suite (e.g., illuminated with lighting, flashing lights that may be recognized, and the like).

Furthermore, while the embodiment of the beacon 500 shown in FIG. 5 is a separately placed, passive beacon structure distinct from a high value asset (such as an aircraft), another embodiment of the beacon may be implemented with a reflective symbol or material fixed to or made part of a portion of the high value asset. In this way, such an embodiment of the beacon may be part of, for example, an edge of an aircraft's wing, engine, nose cone, tail structure, or other protruding parts of an aircraft that may be of more risk for collisions that other parts of the aircraft. Further embodiments may be implemented with extendible structure from such a high value asset, where such extendible structure may be selectively deployed or actuated from a concealed or stowed position to a deployed active position where it may be detected and when there is the opportunity for a mobile industrial vehicle, such as a cargo tractor, to come within the vicinity of the high value asset. For example, an exemplary high value asset, such as an aircraft or tractor/trailer, may have extendible reflective beacons that can be actuated so as to become visible in a deployed active position on the high value asset.

Figure 6:
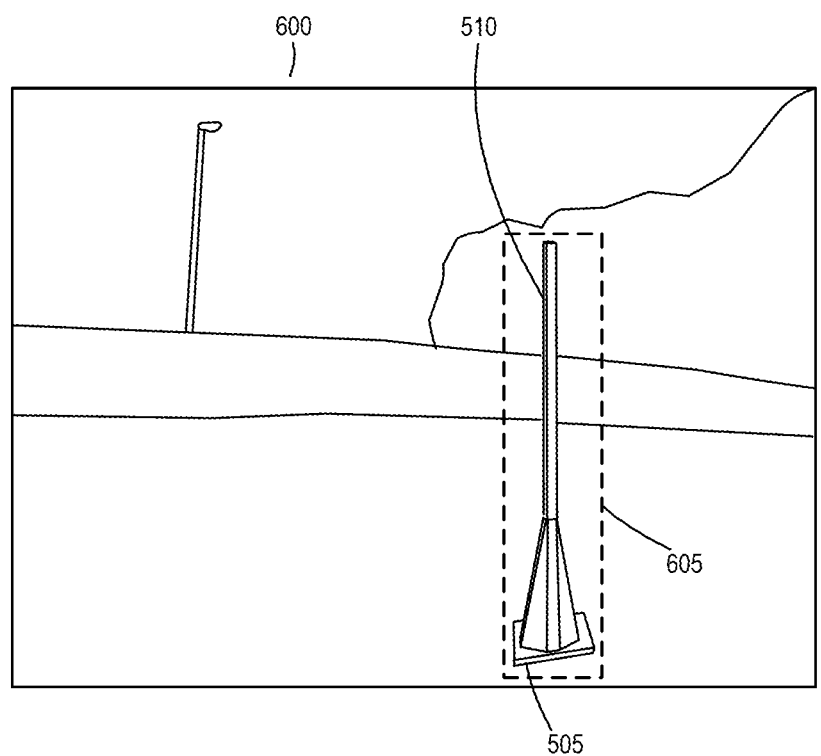
FIG. 6 is an exemplary image illustrating an exemplary passive beacon as seen by a camera and LiDAR sensors and for use as training input for an exemplary collision avoidance system in accordance with an embodiment of the invention.
Figure 7:
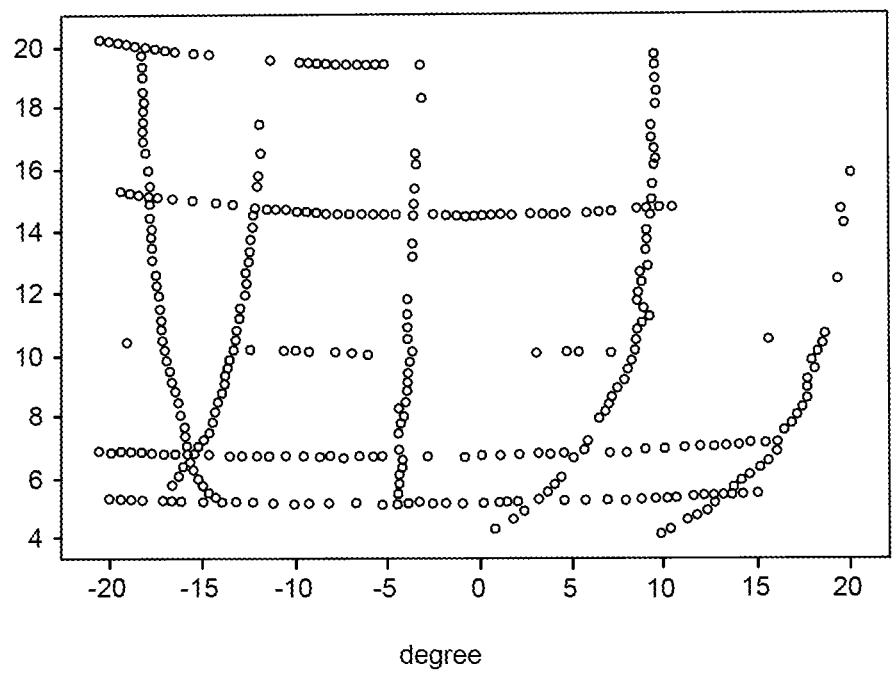
FIG. 7 is a diagram with further exemplary training input for an exemplary collision avoidance system in accordance with an embodiment of the invention.

FIG. 6 is an exemplary image 600 illustrating an exemplary passive beacon 505/510 as seen by exemplary camera and LiDAR sensors and for use as training input for an exemplary collision avoidance system in accordance with an embodiment of the invention. Referring now to FIG. 6, the image 600 is an exemplary visual image as captured by a camera on the cargo tractor. The camera provides the image as sensing data to the signal processing software for the camera, which then provides the processed data to the data fusion software module running on the sensor data processor so that a bounding box 605 for the beacon/cone may be recognized and associated with coordinates $X_{top}$, $Y_{top}$, $X_{bottom}$, and $Y_{bottom}$. As such, the bounding box 605 shown in FIG. 6 for the beacon/cone 505/510 (and represented by the coordinates) is an input to the data fusion software module. The LiDAR detects the beacon/cone as another type of sensing data, and provides that LiDAR data to the signal processing software for the LiDAR sensor, which then provides the processed data to the data fusion software module running on the sensor data processor so that information on detected LiDAR space may be another input to the data fusion software module running on the sensor data processor. An example of such detected LiDAR space is shown in FIG. 7, where the exemplary image 700 shows a distribution of "training data" in graphical form. In FIG. 7, the training data shown in the graph 700 is used for the neural network to learn the mapping between the LiDAR and the camera. The LiDAR returns point cloud data representing coordinates and intensity values for when the LiDAR beam intersects objects in the environment. The camera generates imagery. Objects are detected in the imagery via a deep learning system, and the object is delineated by a bounding box. In the example shown in FIG. 6, the bounding box has coordinates that delineate the region: x and y coordinates for the upper left hand corner ($x_{top}$, $y_{top}$) and x and y coordinates for the bottom right hand corner ($x_{bottom}$, $y_{bottom}$). In operation, the LiDAR determines the center of each detected object and reports a distance and angle to the objects. Thus, the neural network learns the mapping between LiDAR distance and angle and the bounding box data from the camera detection bounding boxes In more detail for the example shown in FIG. 7, there are 1,752 samples collected for the beacon and 1,597 samples collected for the cone. In this particular example, these samples cover the camera field of view, which is approximately +/−20 degrees left-to right, and the area of interest is about 5 to 20 meters in front. As such, the graph 700 shown in FIG. 7 illustrates sample points showing where in range (in meters along the y axis) and degrees left to right from center (along the x axis) for each sample point.

Figure 8:
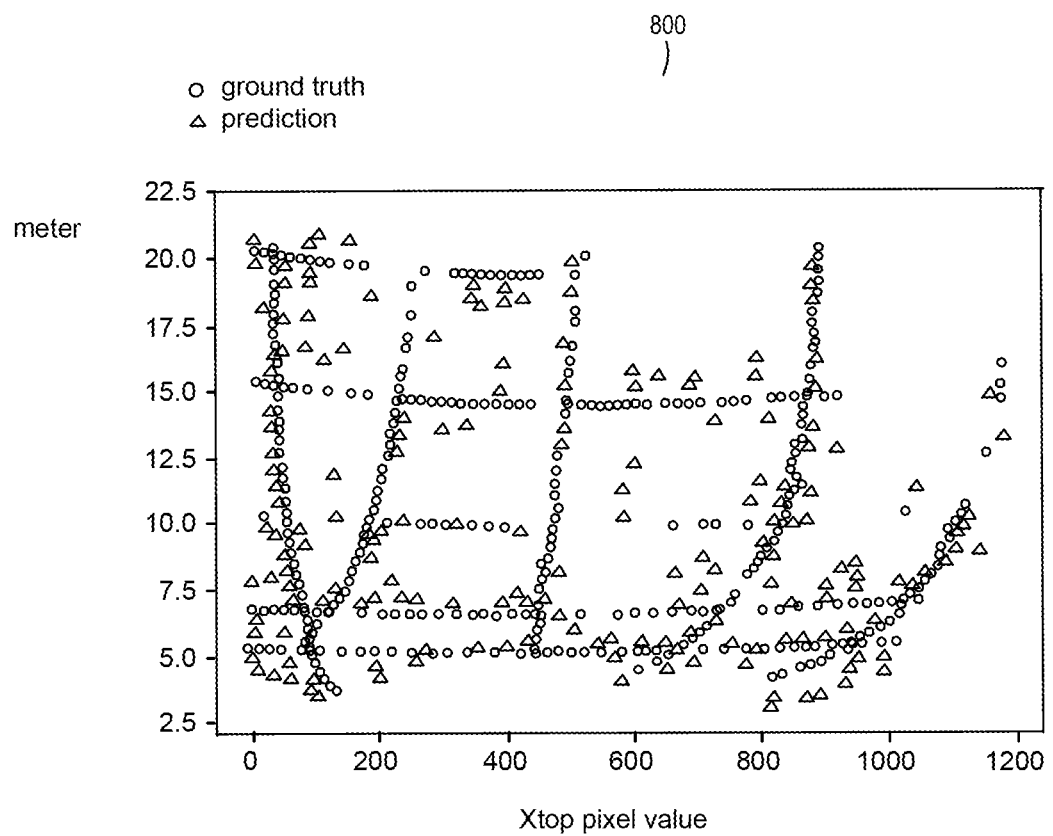
FIG. 8 is a diagram illustrating exemplary training statistics for an exemplary collision avoidance system in accordance with an embodiment of the invention.

FIG. 8 is a graphic diagram 800 illustrating exemplary training statistics for an exemplary collision avoidance system in accordance with an embodiment of the invention. Referring now to FIG. 8, once the system is trained, it has learned to approximate the relationship between the camera bounding boxes and the LiDAR range and angle measurements for the beacon. For example, the graph 800 in FIG. 8 shows the predicted positions (with the "o" symbol) versus true positions (with the "Δ" symbol) and characterizes the system error rates in this example in terms of error rate, mean of error, and variance of error. These are standard metrics for assessing errors.

Figure 9:
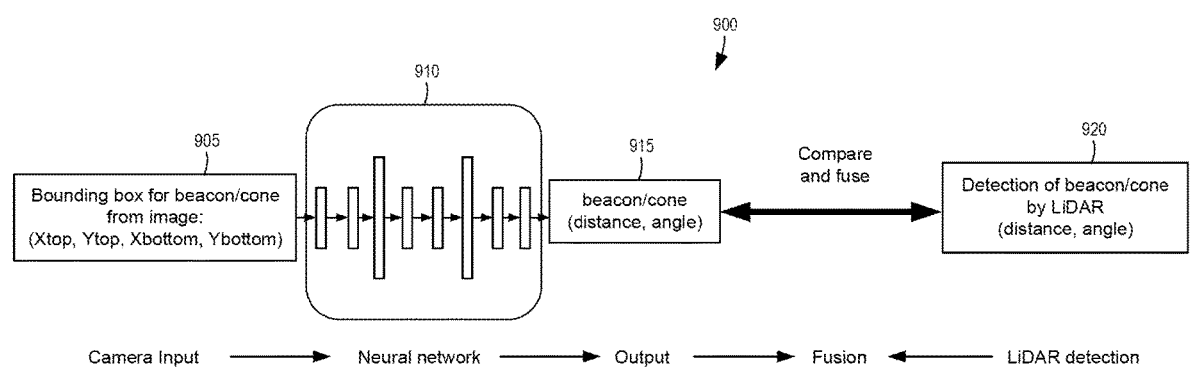
FIG. 9 is a block diagram of exemplary general processing steps involved with enhanced collision avoidance using an exemplary collision avoidance system in accordance with an embodiment of the invention.

In light of the above description of an exemplary enhanced collision avoidance system for a mobile industrial vehicle (such as a powered cargo tractor and linked/towed dollies that follow), FIG. 9 is a block diagram of exemplary general data fusion process steps 900 involved with enhanced collision avoidance in accordance with an embodiment of the invention. Referring now to FIG. 9, the sensor input flow begins on either side of the diagram with camera input on the left side and LiDAR input on the right ride. For example, on the left side of FIG. 9 is a box 905 representing what is done with camera input data (e.g., camera images) captured by one of the cameras (such as those shown in FIG. 3 or 4). The data fusion software module 310b of FIG. 3 operates to take the camera input, recognize and detect objects (such as a beacon/cone from the image), and create a bounding box representing image coordinates of the beacon/cone. This camera detection bounding box is then used by a camera object recognition deep learning neural network 910 running as part of the data fusion software module 310b to label the detected object (e.g., person, cargo tractor, beacon, etc.) and assign a confidence level to that detection, then determines an output 915 as a distance and angle for a detected beacon/cone. From the right side of FIG. 9, LiDAR input 920 is used by the data fusion software module to separately detect a distance and angle for a beacon/cone based upon such LiDAR data. In general, the beacon/cone will appear in the LiDAR data as bright (due to the post's reflective intensity) and relatively tall. The data fusion software module 310b is then able to compare the LiDAR based determination of the beacon/cone's distance and angle to the camera based determination of the beacon/con's distance and angle as part of "fusing" the two types of data or data streams. In this manner, the system advantageously improves performance and accuracy by fusing such different data sources to better detect and recognize objects relative to the cargo tractor vehicle platform. Additionally, the system improves performance by reducing false positive detection from the LiDAR by projecting the beacons in the camera imagery via a deep learning method, and validating the detections using a neural-network learned projection from the camera to the LiDAR space.

As discussed above, an embodiment of the MPC software module 315a running on the collision avoidance controller 410 may leverage a kinematics model used for spatial awareness and estimating the location of not only the cargo tractor, but the location of dollies without the need to have sensors on the dollies providing real-time feedback. A more detailed description of such an exemplary kinematics model (also referenced as a dynamic path-following model) appears below as part of this detailed description. When using the kinematics model as part of the MPC software module 315a running on the collision avoidance controller 410, the controller 410 has access to an inertial measurement unit (IMU) 305c location information (such as heading and accelerometry data) as well as ECU 305b information from the cargo tractor (such as wheel speed data). In one embodiment (e.g., a local option), the location of the cargo tractor may be only known relative to detected objects. Movement of the system may, in some embodiments, be interpolated or extrapolated from a combination of heading, acceleration, and wheel speed data.

Figure 10:
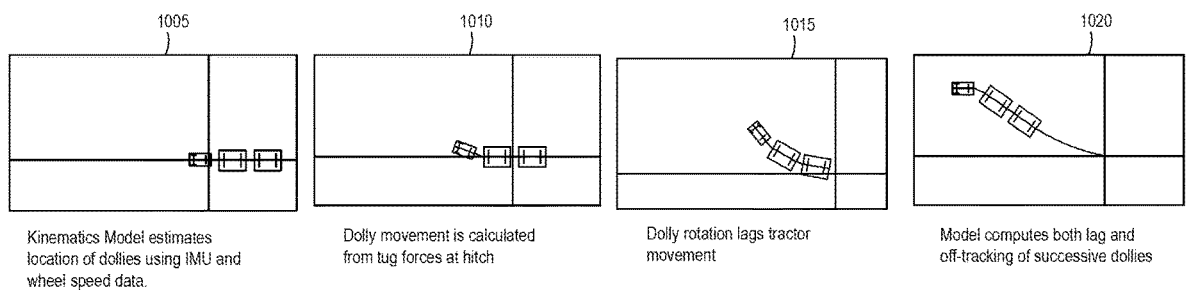
FIG. 10 is a set of diagrams illustrating an exemplary kinematics model visualization related to estimated and predicted movement of an exemplary tractor (industrial vehicle) and following dollies (trailers) that may deploy an exemplary collision avoidance system in accordance with an embodiment of the invention.

Using this data, the kinematics model implementation run by the MPC software module 315a is able to estimate the location and orientation of the dollies following the cargo tractor relative to the cargo tractor. FIG. 10 is a set of diagrams 1005-1020 illustrating exemplary kinematics model visualizations related to estimated and predicted movement of an exemplary tractor (industrial vehicle) and following dollies (trailers) that may deploy an exemplary collision avoidance system in accordance with an embodiment of the invention. Referring now to FIG. 10, the left most visualization 1005 shows the tractor lined up pulling two exemplary dollies. In the next visualizations 1010-1015, the cargo tractor is steering right. Dolly movement is calculated and estimated using the kinematics model as the rotation of dollies lags movement of the cargo tractor. This can be shown in the right most visualization 1020 where the red track of the cargo tractor is different from the blue track of the front most dolly and the yellow track of the next dolly—none of which are shown as lining up as the cargo tractor makes turns and the dollies follow.

In light of the above description of embodiments of an exemplary enhanced collision avoidance system and how it may be implemented with hardware and software elements, what follows is a description of an exemplary method for enhanced collision avoidance that may leverage and use such a system in accordance with an embodiment of the invention that focuses on avoiding a high value asset (such as parts of an aircraft, particular equipment, or areas where people or equipment may be located). The system, for example, may be implemented in an embodiment that integrates a sensing and sensor processing system (e.g., signal processing software and data fusion software running on a sensor data processor module) that detects and recognizes objects and beacons using distinct and different types of sensor data that are advantageously fused to improve detection; a model predictive controller (e.g., model predictive control software running on a collision avoidance controller module operating with real-time capability) that leverages a cargo tractor/dolly kinematics and vehicle dynamics model for collision avoidance and speed governance; and a vehicle actuation system (e.g., vehicle actuation feedback control software running on a vehicle feedback actuation controller modules) that interfaces to vehicular controls to help a mobile industrial vehicle and its towed dollies avoid high value assets. One or more beacons are placed in strategic positions to allow for highly robust detection and avoidance of the high value assets.

In general operation, an embodiment of the method begins with a first sensor (the LiDAR) detecting beacons and differentiating beacons from other objects (such as people, vehicles, cargo tractors, etc.). The method continues with a second sensor (the camera(s)) detecting one or more objects (such as people, beacons, vehicles, etc.). The data may advantageously be fused by first determining bounding boxes based on sensor data captured by the second sensor (camera) and determining a mapped space based on sensor data captured by the first sensor (LiDAR). The determining bounding boxes are then projected into the determined mapped space, and then compared to improve how to identify beacons that demark positions relative to the high value assets and, in some cases, to also differentiate identification of other objects that may pose risks to predicted movement of the cargo tractor relative to the high value asset. In this manner, the method leverages fusion of the two data sources to provide improved, enhanced, and more robust performance of the collision avoidance system.

The embodiment of this method next uses a controller to estimate the shortest possible path to breaching a point in space radially projected from beacon locations. This may be accomplished by, for example, the model predictive control (MPC) software 315a running on a collision avoidance controller module 410 operating with real-time capability where the MPC software 315a receives information on located beacons (e.g., from the sensor data processor 405) and can determine the cargo tractor trajectory relative to the beacons and tractor velocity. The MPC software 315a enabled collision avoidance controller 410 operates as a type of limited look-ahead controller. As such, the MPC software 315a predicts a shortest possible path to breaching a point in space radially projected from beacon locations (and with determined cargo tractor trajectories relative to the beacons and tractor velocity from IMU information) and, with reference to and leveraging use of a system kinematics model of the tractor and dollies (such as that described above and referenced in more detail in embodiments described below), may also predict potential collisions between any portion of the cargo tractor 115 and dolly train 120 with the high valued asset (e.g., aircraft 100) without active detection of the location of any of the towed vehicles that follow the cargo tractor.

The exemplary method proceeds with the MPC software 315a generating multiple control solutions to determine the maximum allowable speed at discrete moments in time/space. Those skilled in the art will appreciate the necessity to generate such control solutions at or near real-time given the large set of possible solutions and the time constraint for being able to make quick decisions based upon such generated control solutions as the cargo tractor and its towed group of dollies continues to move. In more detail, each of the control solutions generated by the MPC software 315a running on the collision avoidance controller module 410 may be implemented with a cost function that compares the cost of each control solution where an optimal solution may be chosen based upon criteria defined by the cost function. For example, a control solution that has the cargo tractor rapidly slowing and then traveling for a long distance may incur a higher performance cost relative to another control solution that has the cargo tractor progressively slowing over the same distance (which incurs a lower performance cost) while staying within speed governance limits relative to areas near the beacons or other speed limits to accommodate particular items being transported, the number of dollies being towed, mass of what is being transported on the dollies, and the like.

Figure 38:
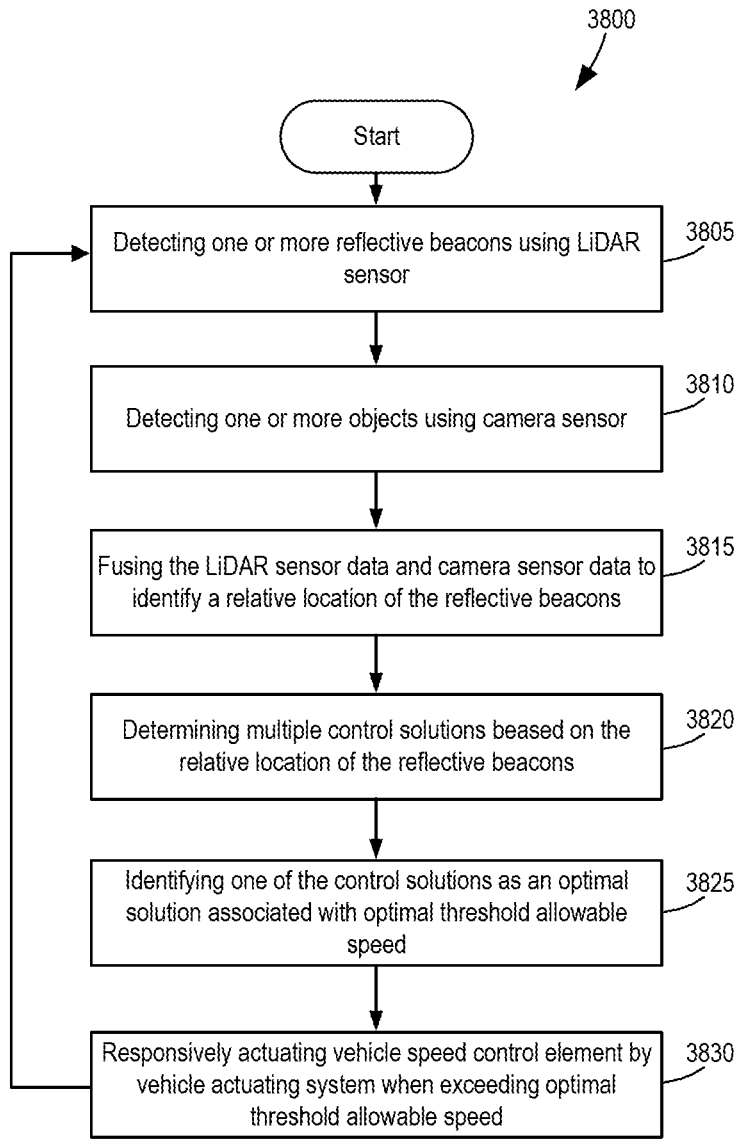
FIG. 38 is a flow diagram of an exemplary method for enhanced collision avoidance by a mobile industrial vehicle of a high value asset based upon multi-sensor data fusion in accordance with an embodiment of the invention.

In the event that the cargo tractor 115 has exceeded a maximum allowable speed calculated by the MPC software 315a enabled collision avoidance controller 410, the method may proceed to have the vehicle feedback actuation controller calculate a rate of deceleration to achieve the desire speed within a fixed time window. As part of this step in the method, a feedback control system embodied in the vehicle actuation feedback control software 320a operates by actuating the cargo tractor brake and/or throttle controls to achieve the calculated deceleration or acceleration. Those skilled in the art will further appreciate that the vehicle feedback actuation controller may also bring the cargo tractor to a complete stop if desired as part of this exemplary method, such as when the cargo tractor and towed dollies approach a loading/unloading area demarked by one or more beacons or when the cargo tractor and towed dollies approach and have a beacon in front of the cargo tractor itself Such a general method embodiment is consistent with an exemplary embodiment of a method described in a flow diagram in FIG. 38 in accordance with an embodiment of the invention. Referring now to FIG. 38, method 3800 begins at step 3805 where a LiDAR sensor on the mobile industrial vehicle (e.g., cargo tractor) is detecting one or more of the reflective beacons relative to the mobile industrial vehicle. Such reflective beacons may be in place already or, alternatively, method 3800 may include step of placing or deploying the one or more reflective beacons relative to the high value asset prior to the detections in step 3805. In this way, an exemplary reflective beacon may be physically placed near or next to pre-designated positions on a high value asset, such as a protruding part of an aircraft (e.g., the nose of the aircraft, an engine nacelle that is extending from the aircraft's wing, the tip of the aircraft's wing, and the like), an area where people are anticipated to be traversing, or a fixed facility. Deployment of a reflective beacon may also be done by activating a reflective beacon that is integrally part of the high value asset or actuating such an integral reflective beacon to become visible from a hidden or stowed position relative to the high value asset.

At step 3810, method 3800 proceeds with a camera sensor on the mobile industrial vehicle detecting one or more objects relative to the mobile industrial vehicle. At step 3815, method 3800 uses an exemplary sensor processing system on the mobile industrial vehicle to fuse the sensor data detected by each of the LiDAR sensor and the camera sensor to identify a relative location of the one or more of the reflective beacons based upon a multi-sensor fused data source using the detected LiDAR sensor data and the detected camera sensor data. In more detail, fusing as part of step 3815 may be more specifically accomplished with the sensor processing system determining one or more bounding boxes based upon sensor data generated by the camera sensor when detecting the one or more objects; determining a mapped space based upon sensor data generated by the LiDAR sensor when detecting the one or more of the reflective beacons; projecting the determined one or more bounding boxes into the determined mapped space (e.g., through use of a conventional neural network as described in more detail below); and comparing the determined one or more bounding boxes to objects detected in the mapped space to verify the relative location of the one or more of the reflective beacons.

In still another embodiment of step 3815, fusing may be accomplished by when the sensor processing system deploys fuzzy logic and confidence scores when performing some of the substeps recited above. For example, this more detailed implementation of fusing may have the sensor processing system determining the one or more bounding boxes and a camera confidence score based upon the sensor data generated by the camera sensor when detecting the one or more objects; determining the mapped space and a LiDAR confidence score based upon the sensor data generated by the LiDAR sensor when detecting the one or more of the reflective beacons; projecting the determined one or more bounding boxes into the determined mapped space to identify the relative location of the one or more objects and determine a final confidence score based upon the camera confidence score and the LiDAR confidence score; disregarding the identified relative location of a particular one of the one or more objects when the final confidence score for that particular one of the one or more objects is below a confidence threshold; and comparing the determined one or more bounding boxes to objects detected in the mapped space to verify the relative location of the one or more objects not disregarded based on its respective final confidence score.

At step 3820, method 3800 has a model predictive controller on the mobile industrial vehicle determining multiple control solutions, where each of the control solutions defines a threshold allowable speed for the mobile industrial vehicle at discrete moments (e.g., moments in time/space) based upon an estimated path to a breaching point radially projected from the verified relative location of the one or more of the reflective beacons. The model predictive controller proceeds, at step 3825, to identify one of the control solutions as an optimal solution based upon a performance cost function, where the one of the control solutions is associated with an optimal threshold allowable speed.

At step 3830, method 3800 proceeds with a vehicle actuation system on the mobile industrial vehicle responsively actuating a vehicle speed control element (e.g., a throttle, a brake) when the mobile industrial vehicle exceeds the optimal threshold allowable speed to cause the mobile industrial vehicle to alter movement operations within a desired time window (so as not to lag in responsiveness) and achieve a desired movement operative relative to a current speed of the mobile industrial vehicle.

A further embodiment of method 3800, the mobile industrial vehicle may be implemented by several wheeled vehicles—e.g., a powered vehicle (such as a cargo tractor) and a plurality of consecutively linked towed vehicles to the powered vehicle (such as dollies linked through hitches to the respective vehicle in front of each dolly). As such, the step of determining the different control solutions may be accomplished with the model predictive controller on the mobile industrial vehicle determining such control solutions, where each of the control solutions defines the threshold allowable speed for the collective vehicles making up the mobile industrial vehicle at discrete moments in time/space based upon a predicted path of the powered vehicle and the towed vehicles to the breaching point radially projected from the verified relative location of the one or more of the reflective beacons, and where such a predicted path is determined by the model predictive controller without active detection of the location of any of the towed vehicles that follow the powered vehicle.

Those skilled in the art will appreciate that such method embodiments as disclosed and explained above may be implemented with an apparatus or system, such as the exemplary enhanced collision avoidance system described with reference to at least FIGS. 2-4 (or embodiments of such a system as described in more detail below) and implemented with the above-described suite of sensors, and different processor modules/controller modules, and the different software modules running on the different processor/controller modules as described above. Such software modules may be stored on non-transitory computer-readable medium in each of the processor/controller modules. Thus, when executing such software modules, the collective processor/controller modules of the enhanced system for collision avoidance may be operative to perform the operations or steps from the exemplary method disclosed above, including variations of that method.

In another embodiment, a further method for enhanced collision avoidance may leverage and use a similar system in accordance with an embodiment of the invention that focuses on object detection and avoidance. Such a system, for example, may be implemented in another embodiment that also integrates a sensing and sensor processing system (e.g., signal processing software and data fusion software running on a sensor data processor module) that detects and recognizes objects and beacons using distinct and different types of sensor data that are advantageously fused to improve detection; a model predictive controller (e.g., model predictive control software running on a collision avoidance controller module operating with real-time capability) that leverages a cargo tractor/dolly kinematics and vehicle dynamics model for collision avoidance and speed governance; and a vehicle actuation system (e.g., vehicle actuation feedback control software running on a vehicle feedback actuation controller modules) that interfaces to vehicular controls to help a mobile industrial vehicle and its towed dollies avoid collisions with multiple objects that are detected.

In general operation, this particular method embodiment begins with a first sensor (the LiDAR) detecting any objects in a geometrically defined area projected in the cargo tractor vehicle's direction of travel as part of mapped space in the cargo tractor's direction of travel. The method continues with a second sensor (the camera(s)) detecting one or more objects (such as people, beacons, vehicles, etc.). The data may advantageously be fused by first determining bounding boxes based on sensor data captured by the second sensor (camera) and determining a mapped space based on sensor data captured by the first sensor (LiDAR). The determining bounding boxes are then projected into the determined mapped space, and the compared to improve how to identify objects in the path of the cargo tractor. In this manner, the method leverages fusion of the two data sources to provide improved, enhanced, and more robust performance of the collision avoidance system relative to objects detected in the path of the cargo tractor.

Similar with the prior method, this method embodiment also uses the MPC software running on the collision avoidance controller to calculate a maximum vehicle speed, which will allow for the system to be brought to rest prior to collision with objects detected by the sensor platform within the restricted space in the vehicle's direction of travel. In the event that the cargo tractor has exceeded the maximum allowable speed calculated by the MPC software running on the collision avoidance controller, the feedback control system embodied in the vehicle actuation feedback control software operates by actuating the cargo tractor brake and/or throttle controls to achieve the calculated deceleration or acceleration. Those skilled in the art will further appreciate that the vehicle feedback actuation controller may also bring the cargo tractor to a complete stop if desired as part of this further method embodiment.

Those skilled in the art will appreciate that this additional method embodiment as disclosed and explained above may be implemented with an apparatus or system, such as the exemplary enhanced collision avoidance system described with reference to at least FIGS. 2-4 and implemented with the above-described suite of sensors, and different processor modules/controller modules, and the different software modules running on the different processor/controller modules as described above. Such software modules may be stored on non-transitory computer-readable medium in each of the processor/controller modules. Thus, when executing such software modules, the collective processor/controller modules of the enhanced system for collision avoidance may be operative to perform the operations or steps from the exemplary method disclosed above, including variations of that method.

As noted above, exemplary model predictive control 315*a* may track the persistence of detected objects, such as the reflective beacons, within the state model. Those skilled in the art will appreciate that an embodiment may implement object persistence as a software feature within the exemplary collision avoidance system 300 that tracks and updates the location of recognized objects (such as reflective beacons) relative to the cargo tractor as the cargo tractor moves through space. This feature enables improved, enhanced, and more accurate collision avoidance calculations for objects which may have moved beyond the current field of view (FOV) of sensors on the cargo tractor or that have become obscured. In other words, an embodiment may implement object persistence as part of the model predictive control 315a to enhanced and improve how the exemplary collision avoidance system 300 accounts for and tracks detected objects (like the reflective beacons) and to avoid collisions with the detected objects after the sensor package on the front of the mobile industrial vehicle (e.g., cargo tractor 115) has moved passed the detected object (e.g., a reflective beacon) and no longer has the detected object in the sensor package's FOV.

Thus, in such an embodiment, the detected objects (such as detected reflective beacons) may persist within the system and be considered by the model predictor control 315a as a part of the collision avoidance and spatial awareness aspects of its functionality so the system could virtually keep track of them in space relative to the vehicle (e.g., the cargo tractor 115 and dolly train 120) to make sure the vehicle's train 120 would track past the object without contacting it or determine if the vehicle's train path 125 would make contact with the object and thus the vehicle 115 and its train 120 would need to stop. In such an embodiment, the system may keep track of changes in the trajectory of the train so the train would only be stopped if indeed the train would make contact with a detected object if the operator was not making the needed changes in direction to avoid contact.

Further embodiments may use types of boundaries to support a variety of applications such as localization, denial of entry, and automated mode selection involved in exemplary collision avoidance systems and methods. In general, an exemplary boundary in the context of exemplary collision avoidance systems used on mobile industrial vehicles (e.g., cargo tractors 115) may be identified by recognizing markers placed in the physical environment. Virtual boundaries may be defined in software with the inclusion of geo-locating instrumentation as part of exemplary collision avoidance system (e.g., using GPS position sensor 305c and the location sensor data provided to model predictive control software module 315a). Thus, geo-referencing (e.g., geo-fencing using GPS coordinate location data), may be used in mode selection and zonal boundaries as discussed in more detail below regarding multi-mode operation of the system and triggers that change operation between modes based upon boundaries, as well as area entry denial through geo-referenced parameter selection.

In further embodiments, a pre-determined type/shape of an object identifier (also referred to as a marker) may be placed strategically outside the vehicle in the environment for sensors on the vehicle to see, detect, recognize, and generate sensor data that allows an exemplary collision avoidance system to react accordingly. In more detail, such an object identifier marker may have a shape and type of symbology as part of the marker to uniquely identify an object or boundary zone (as well as an orientation in some embodiments) through, for example, a pre-determined code and/or size. Examples of such an object identifier marker may be implemented by an ArUco marker, which allows a camera based system to quickly and reliably recognize a unique marker and estimate range, angle, and orientation. An embodiment may use ArUco markers to identify boundaries for a moving cargo tractor 115 and recognize objects, such as cargo loaders (such as loader 110), and their orientation. Identification of unique object identifier markers allows for the collision avoidance controller 410 to track these points in space without continuous observation of the marker. The exemplary collision avoidance system 300 may respond to identified objects and boundaries in a manner similar to object persistence in order to change the operation of the mobile industrial vehicle (e.g., cargo tractor 115) and/or change modes of operation of the collision avoidance system 300 as explained in more detail below. Unique identification and orientation estimation allows for the collision avoidance controller 410 within system 300 to define these objects as geometric shapes and respond accordingly. As such, object identification using a camera and an ArUco marker allows for exemplary collision avoidance system 300 to provide a more precise localized response to mission critical objects (e.g., loading gate 110 used to load aircraft 100) given the ability to differentiate from reflective beacons that may lack the further contextual information such an object identification marker provides (e.g., unique differentiation information, as well as ranging, angle, and orientation information).

In still further embodiments, the exemplary collision avoidance system may be programmatically configured to operate under different operating modes (e.g., using different operating parameters for vehicle operation, such as speed, what sensors to use, sensor settings, distance restrictions, and the like) depending on an operational zone where the vehicle with the collision avoidance system is operating. Additionally, embodiments may having the exemplary collision avoidance system on a vehicle switching between modes independently without communication to a larger network.

In more detail, an embodiment may have an aircraft gate area (AGA) mode and drive lane (DL) mode. Each of these two exemplary operating modes, AGA and DL, function within distinct operating parameters and utilize system features uniquely during operation of the vehicle with exemplary collision avoidance system 300 configured to work in such different modes. For example, exemplary DL mode is defined by the boundaries separating drive lanes (e.g., areas where a vehicle 115 is transiting in lanes that are not near to aircraft) from aircraft gate areas (e.g., areas where a vehicle 115 may come in close proximity to aircraft 100 when attempting to transport luggage in dollies 120 to a loader 110 next to the aircraft 100). For example, maximum operating speeds in a physical drive lane area (i.e., where the vehicle 115 may operate in the DL mode) exceeds aircraft gate area maximum speeds by a factor of 2 (i.e., where the vehicle 115 may autonomously and automatically switch to operate in a more restricted AGA mode). In such an example, the beacon detection capability used in some embodiments of collision avoidance may not applicable while operating in the less restrictive DL mode. In this example, the exemplary DL mode of operation may be dependent upon the Front Guard system to prevent collisions with objects in the vehicle path while operating at increased speed in comparison to the aircraft gate area. The exemplary collision avoidance system functionalities available in these two exemplary modes are described in more detail below with reference to FIGS. 40 and 41. Additional operating modes may be enabled in further embodiment by defining new operating parameters and identifying different zonal boundaries for the different modes.

Embodiments described herein may demark different zonal boundaries for the different operating modes of a vehicle's collision avoidance system using the exemplary object identifier marker described above (e.g., an ArUco marker). Detection of these markers may provide input to embodiments of the exemplary collision avoidance system 300 so the system may detect and identify such markers as relevant objects or boundaries (e.g., based upon the coding of the particular ArUco marker). The system may then responsively recognize when to switch from a "front guard detection mode" (e.g., the DL mode), which would be used outside of a restricted area (e.g., a gate area involved with loading an aircraft) to "gate area type detection mode" (e.g., the AGA mode) when entering the more restricted gate area. In this manner, the exemplary collision avoidance system 300 on vehicle 115 may thereafter operate in the more restrictive gate mode (e.g., AGA mode) primarily focusing on beacon detection and also reducing the maximum speed of the tractor. The exemplary collision avoidance system 300 may also know when to switch back to front guard detection mode when leaving the gate area based upon further detection of markers or other geo-referencing with location information (e.g., GPS data). The allowed speed for the cargo tractor 115 may be greater in front guard detection mode (outside of the gate area), than when operating in the gate area type detection mode.

In such embodiments, an exemplary object identifier marker (e.g., a particular ArUco marker) may be used to represent where an object is located, such as an aircraft loader 110 would be in the gate area proximate aircraft 100. As such, detection of such specialized object identifier markers may allow the exemplary collision avoidance system to further enter another mode of operation, and disengage the inside gate area collision avoidance response when the tractor/dolly train 115/120 is within a threshold distance from the aircraft loader (i.e., the detected object identifier marker) because there may be operational times where the dolly train behind the cargo tractor 115 may need or desire to make slight contact (or come closer to the loader than the collision avoidance system would have normally allowed) to the aircraft loader to provide the ability for containers to be loaded/unloaded between the dollies 120 and the aircraft loader platform.

These system triggers may, in these further embodiments, allow for further enhanced and improved collision avoidance responses in both environments while minimizing situations where certain detections may stop the tractor/dolly train unnecessarily. Preventing the unnecessary system triggered stops/responses and allowing for these changes in mode of operation (gate area collision avoidance focusing primarily on the beacons and then outside of gate area focusing primarily on front guard collision avoidance) provides a technical solution and practical application of the above-described system elements to even further improve collision avoidance and enhance safe logistics operations involving logistics vehicles, such as cargo tractors 115 and towed dollies 120.

Figure 39:
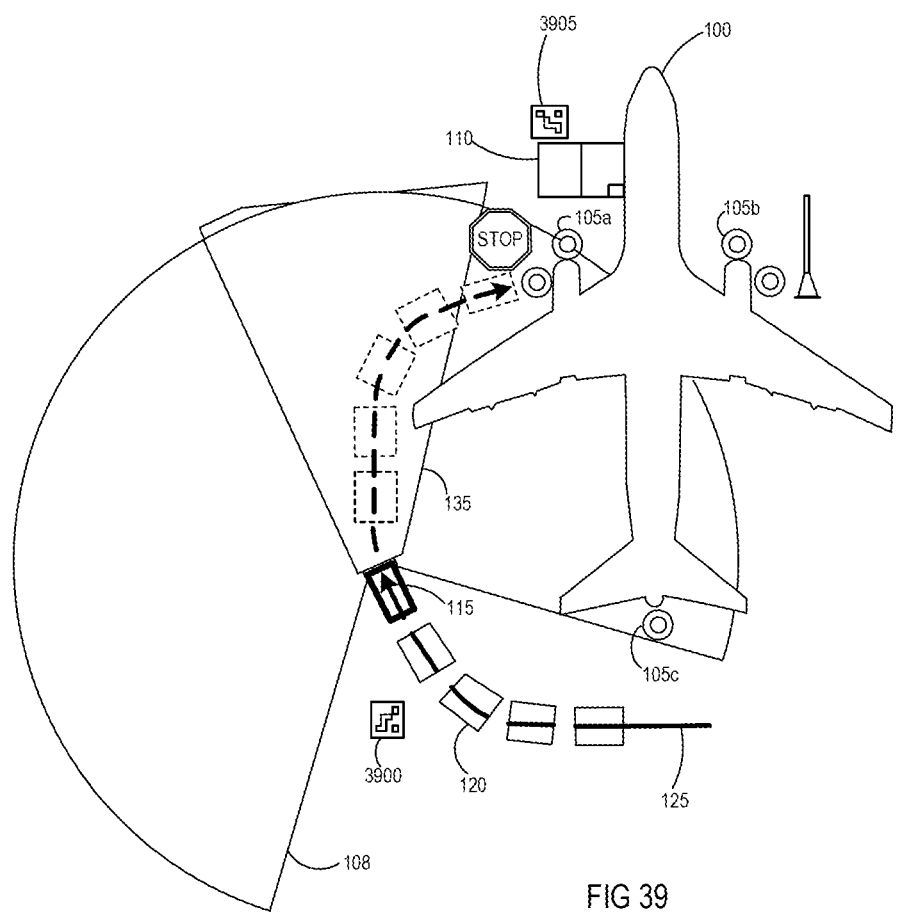
FIG. 39 is a diagram of another exemplary tractor collision avoidance system operational diagram deployed in another exemplary logistics environment in accordance with an embodiment of the invention.

FIG. 39 is a diagram of another exemplary tractor collision avoidance system operational diagram deployed in another exemplary logistics environment in accordance with an embodiment of the invention. As shown in FIG. 39, another embodiment with aircraft 100 is shown with exemplary object identification markers 3900, 3905. Marker 3900 is deployed in this embodiment and coded as an exemplary boundary identification marker identifying an exemplary zonal boundary where operation of the system 300 onboard cargo tractor 115 may differ on either side of the zonal boundary identified by market 3900. Marker 3905 is deployed in this embodiment as an object identifier marker coded to be associated with exemplary loader 110 (and may include the orientation of the loader 110 from sensor analysis of marker 3905). As shown in FIG. 39, when cargo tractor 115 has moved from a DL operating area below boundary identification marker 3900 (where the system 300 operates in a less restrictive DL mode) and into a AGA operating area above boundary identification marker 3900, the exemplary collision system 300 onboard vehicle 115 may responsively and automatically switch from the DL mode to the more restrictive AGA mode.

In a front guard embodiment (e.g., when the exemplary collision avoidance system 300 is operating in a less restricted DL mode), the collision avoidance part of the overall system 300 may use sensors (e.g., sensors 305d, e, f) and the sensor data generated by such sensors in a refined and enhanced manner. In more detail, exemplary collision avoidance system 300 may dynamically adjust the field of view (FOV) of interest to by system 300 that effectively changes where a sensor may be focused and/or a degree of width for the sensor's reception field. In such an embodiment, this allows the exemplary collision avoidance system 300 to change, refine, and dynamically adjust to changes in the operating mode for the system. For example, changes may be made by the exemplary collision avoidance system 300 (e.g., the multi-processor module 405 running the signal processing software module 310a) to prioritize a portion of the sensor data generated by the sensors that effectively has the system 300 paying more attention to sensor data based on the direction of travel and/or the direction vehicle 115 is turning. An embodiment may prioritize the sensor data in this way to essentially adapt the sensor's FOV and effectuate a dynamic FOV response by programmatically adjusting the portion of the sensor data from the sensor's actual field of view that is processed and considered for collision avoidance purposes. This effectively filters out extraneous sensor data from portions of the sensor's actual FOV and has the system 300 pay attention to a subset of the sensor data. Such a subset of the sensor data may, for example, result in an adjusted degree of effective reception field for the sensor (e.g., where the effective FOV has narrowed on both sides relative to the longitudinal axis of the vehicle), or in an adjusted focus for the sensor (e.g., where the effective FOV has changed on one side of the longitudinal axis of the vehicle more than the other). More generally, such an embodiment effectively adjusts where the sensor is focused or effectively adjusts the degree of reception field for the sensor. Such adaptive and dynamic changes to the effective sensor data considered by the system 300 may, for example, be in response to changes in direction of the vehicle 115 (e.g., angular velocity changes in the trajectory of the cargo tractor 115), and/or in response to identifying an object identification marker that indicates a change to the operating area within which the exemplary collision avoidance system 300 (and its vehicle 115) is operating to help prevent unnecessary/unneeded system-initiated vehicle stops. In such an embodiment, exemplary collision avoidance system 300 may better determine if a detected object, for example, would be avoided if the vehicle's path of travel was adjusted to avoid the object within an acceptable distance to where a collision would have occurred if the path had not been changed. Thus, dynamic FOV may be deployed as part of an exemplary collision avoidance system operating in front guard detection mode as a situationally adaptive FOV allowing dynamic FOV enabled exemplary collision avoidance system 300 to respond to objects in the vehicle path.

As noted above, different operating modes of an exemplary collision avoidance system 300 may have different operating parameters and utilize system features in different ways during operation of the vehicle with exemplary collision avoidance system 300 configured to work in such different modes. For example, in addition to speed limit operating parameters, field of view parameters for particular sensors used in a given operating mode, a further exemplary operating parameter/feature that may be relevant to a particular operating mode of the exemplary collision avoidance system 300 may include a minimum keep-out distance (KoD). In general, the minimum KoD is a radial distance from an object at which the exemplary collision avoidance system 300 may use the vehicle actuation system to implement and cause a full immediate vehicle stop. As such, an exemplary minimum KoD lock-out allows for full brake-to-stop responses to an object that may enter the FOV of sensors monitored by the exemplary collision avoidance system. Such an exemplary minimum KoD may be different for different operating modes as speeds involved in different operating modes may differ, which may require the minimum KoD to be higher to account for higher potential speeds in a particular operating area (e.g., under the speed limit parameters associated with the operating mode for that area). However, other areas may have a desired minimum KoD that provides more distance from a detected object for reasons beyond the brake-to-stop rationality (e.g., the area has objects of a hazardous nature that warrants a larger minimum KoD, and the like).

A further feature of an exemplary collision avoidance system 300 may be a local temporary system override. The local temporary system override feature of an exemplary system 300 allows the tractor operator to disable the system 300 on a time limited basis. This may be achieved through interaction with the gear selector 325 (i.e., one of the vehicle actuators controlled by vehicle actuation feedback control 320*a*). For example, placing the cargo tractor 115 in park with this feature implemented as part of exemplary collision avoidance system 300 will disable the system 300, but placing the cargo tractor 115 in drive or reverse from the park position may begin a countdown timer to system 300 re-engagement. In an embodiment, such an exemplary countdown timer may be dependent upon dolly selection. Thus, increasing dolly count may extend the countdown period, and information on the dolly count may be maintained by the exemplary collision avoidance system 300 that utilizes such a local system override feature. Further embodiments may allow the dolly count as a selection through a user interface to the exemplary collision avoidance system 300, which may all for entry of information on, for example, the number of dollies in train 120, as well as the length and mass of a particular embodiment of train 120. Using such dolly count information, an exemplary collision avoidance system 300 may be used when determining the potential control solutions calculated by the exemplary model predictive controller of system 300.

A further embodiment of exemplary collision avoidance system 300 may include further software-based modules in particular logical segments for further roles within the system in accordance with an embodiment of the invention that enhance operation of the system 300, including user interfaces with which to enter information (such as dolly count information) and monitor status of the system 300. In more detail, a further embodiment may include an exemplary sensor platform management software-based module as part of the sensor processing segment 310 shown in FIG. 3 while a system management software-based module may be part of the collision avoidance control segment 315 shown in FIG. 3. Embodiments of the exemplary sensor platform management and system management modules may include aspects that provide for system startup functionality, user input for mode selection, communication features, as well as the generation of different types of user interfaces for exemplary collision avoidance system 300.

For example, such exemplary modules may include an auto start-up feature for exemplary system 300 where at system power-on, the vehicle actuation feedback controller 415 initiates boot cycles for remaining system components in system 300, which results in automatically enabling the exemplary collision avoidance system 300 at the completion of system initialization.

In another example, such exemplary modules may include software-based network connectivity for exemplary system 300. While embodiments of exemplary collision avoidance system 300 have numerous features and operational scenarios where the system 300 operates in an autonomous or semi-autonomous mode that does not require connectivity to larger networks and systems through such a network, the inclusion of network connectivity (e.g., through Wi-Fi, cellular, or other wireless technology) allows for remote system monitoring and manual command of various system states and parameters of system 300, as well as the ability to receive updated information related to particular operating environments (e.g., identification information on particular object identification markets being used within a particular aircraft environment, and the like).

From a user interface perspective, such exemplary modules may enable system 300 to present one or more different graphical user interfaces, including a remote visualizer and/or status indicator. Exemplary graphical user interfaces generated by such modules as part of an exemplary collision avoidance system 300 may provide an intuitive interface for user input that adjusts system parameters (such as dolly count information, and the like). An exemplary remote system visualizer may provide, for example, a graphical representation of MPC calculations and control response solutions. Further, an exemplary status indicator module (implemented as part of such exemplary sensor platform management and system management modules) may communicate the current system state and high level actions of the exemplary collision avoidance system 300 to the driver of vehicle 115, to local observers on the vehicle 115, to local observers located off the vehicle 115 but in the same operating area as the vehicle 115, and/or to remote observers outside the operating area of the vehicle 115.

Figure 40:
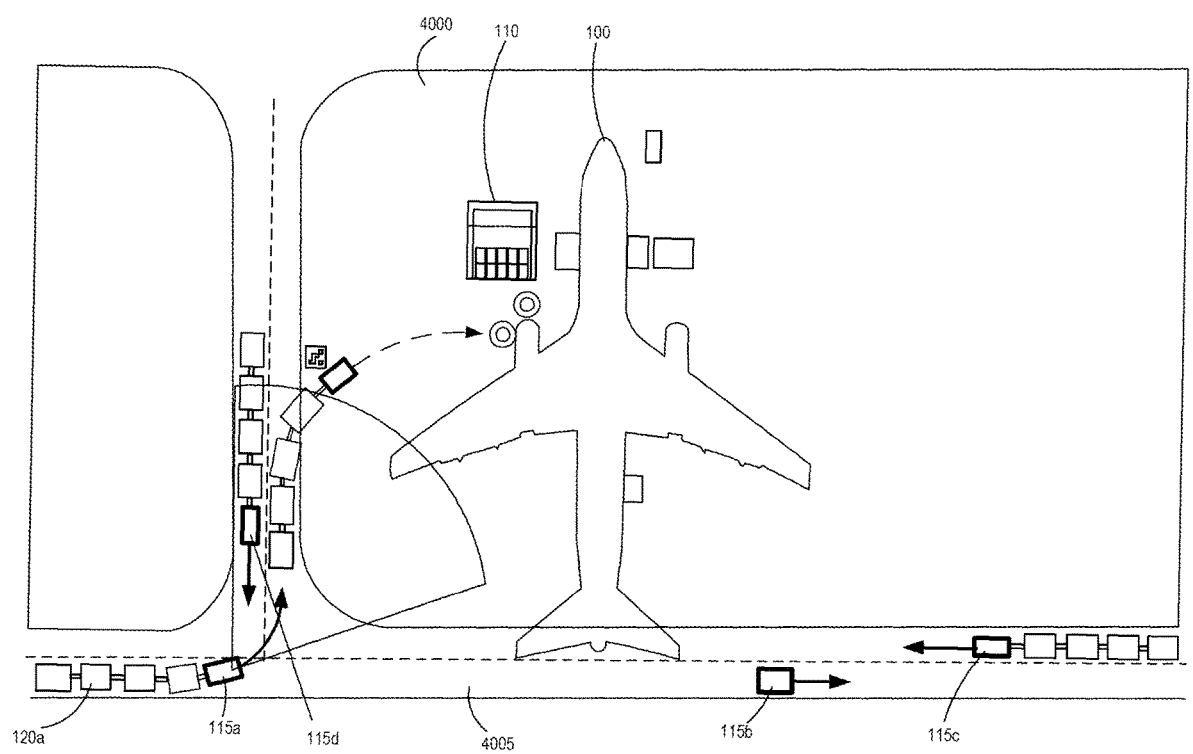
FIG. 40 is a diagram of another exemplary tractor collision avoidance system operational diagram deployed in another exemplary logistics environment where the exemplary tractor collision avoidance system is operating in an exemplary drive lane mode in accordance with an embodiment of the invention.
Figure 41:
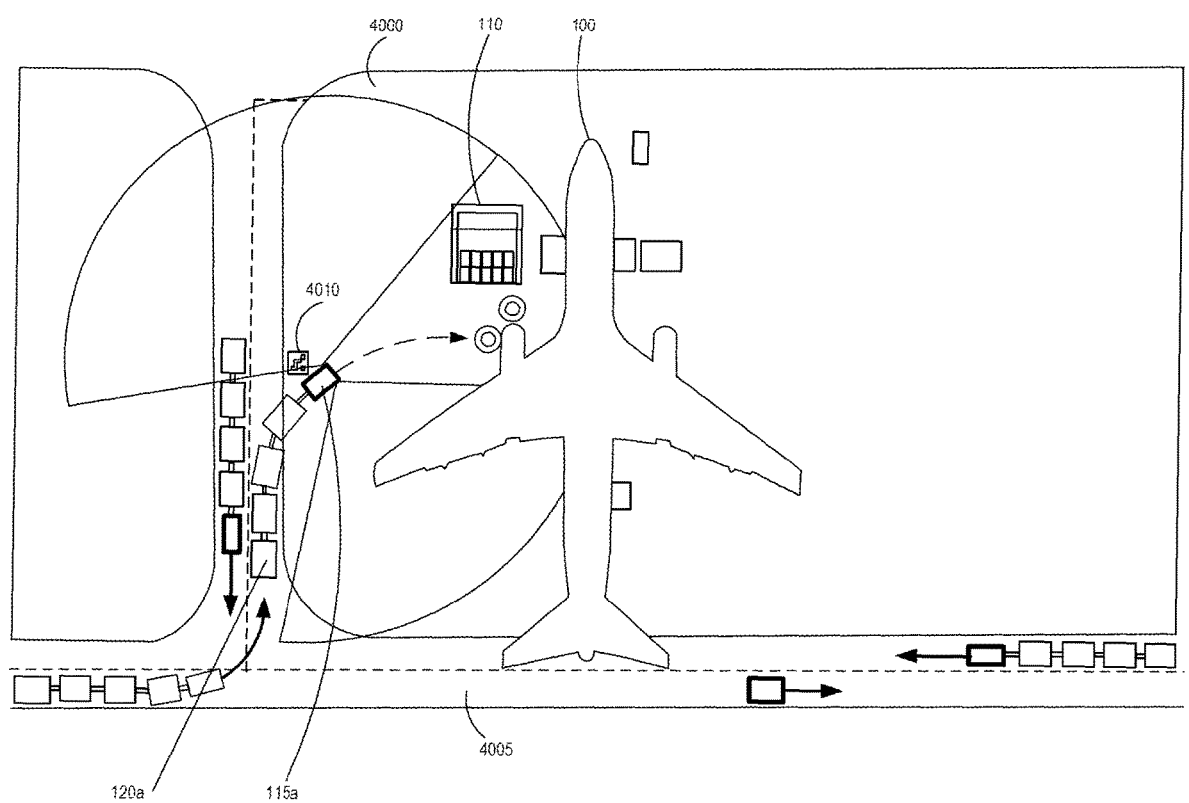
FIG. 41 is a diagram of another exemplary tractor collision avoidance system operational diagram deployed in another exemplary logistics environment where the exemplary tractor collision avoidance system is operating in an exemplary aircraft gate area mode in accordance with an embodiment of the invention.

A further example embodiment is illustrated in FIGS. 40-41, where different operating areas are shown and where an exemplary vehicle and its onboard collision avoidance system may switch from the DL mode to the AGA mode, which engages different collision avoidance system operating parameters and functionality in an autonomous and automatic manner that enhances the collision avoidance capabilities of such an exemplary vehicle. FIG. 40 is a diagram of another exemplary tractor collision avoidance system operational diagram deployed in another exemplary logistics environment where the exemplary tractor collision avoidance system is operating in an exemplary drive lane (DL) mode in accordance with an embodiment of the invention. Referring now to FIG. 40, exemplary cargo tractor vehicles 115*a*-115*d* are illustrated operating in an exemplary DL operating area 4005, while exemplary aircraft 100 and an exemplary loader 110 are disposed next to aircraft 100 within an exemplary AGA operating area 4000. As shown in FIG. 40, the exemplary DL operating area 4005 includes drive lanes, in this example, that do not encroach upon or that allow for vehicles within the DL operating area 4005 to be in such close proximity to aircraft 100 as to be an inherent collision risk to such a high value asset but front guard monitoring allows vehicles 115*a*-115*d* in DL operating area 4005 to help avoid collisions with other objects detected in such drive lanes. While in exemplary DL operating area 4005, an embodiment of exemplary collision avoidance system 300 may be used on vehicles 115*a*-115*d* in DL mode, where operating parameters and system features used may be less restricted (e.g., increased system parameters and a reduced set of system features deployed) than that of operating within AGA operating area 4000 in AGA mode. For example, exemplary DL mode for system 300 within DL operating area 4005 may include a speed limit of 10 mph, sensor FOV restricted to front guard detection mode operations, and a minimum object KoD set to 4 m. In DL mode, the system 300 onboard exemplary cargo tractor vehicle 115*a* may use dynamically adjusted sensors that responsively adjust the sensor FOV based on changed in movement of the vehicle 115*a*, such as when vehicle 115*a* turns. As shown in FIG. 40, as vehicle 115*a* turns, sensors on the exemplary collision avoidance system 300 onboard vehicle 115*a* may adjust their FOV to look in the direction of the turn to better observe objects in the path of the vehicle 115*a*. Further, as shown in FIG. 40, the collision avoidance system 300 onboard vehicle 115*d* may detect an object in its travel path (e.g., turning vehicle 115*a* and its towed dolly train 120*a*), and cause vehicle 115*d* to automatically reduce speed or stop as a result.

FIG. 41 is a diagram of the exemplary logistics environment of FIG. 40, but where the exemplary tractor collision avoidance system on vehicle 115*a* has automatically switched to operate in an exemplary aircraft gate area mode in accordance with an embodiment of the invention. As shown in FIG. 41, vehicle 115*a* has turned as shown in FIG. 40, but has further turned from DL operating area 4005 into AGA operating area 4000. The exemplary collision avoidance system 300 onboard vehicle 115*a* detects exemplary object identification marker 4010 (similar to marker 3900 shown in FIG. 39), identifies marker 4010 as a boundary identification marker based upon coded information on the marker, and without instructions or communication with any larger networks, initiates a change from DL mode to the more restrictive AGA mode for exemplary collision avoidance system 300 operating on vehicle 115*a*. For example, the exemplary AGA mode for system 300 of vehicle 115*a* (i.e., the mode used when operating within AGA operating area 4005) may include a reduced speed limit of 5 mph; cause the LiDAR sensor FOV to be dynamically adjusted to expand to 270 degrees for enhanced collision avoidance within the AGA operating area 4005; engage beacon recognition (not just objects) and object persistence as part of collision avoidance; enable loader identification and tracking (a specific type of object identified using, for example, an exemplary ArUco marker that is recognized to uniquely identify the loader per the code and its orientation); reduce the minimum object KoD to 2 m; and set the minimum beacon KoD to 1 m. In this manner, vehicle 115 and its onboard collision avoidance system 300 may better operate in environments having high value assets and operate in an autonomously adaptive manner to further enhance collision avoidance with objects in the path of the vehicle, including high value assets and objects no longer within the sensor FOV (due to object persistence).

Figure 42:
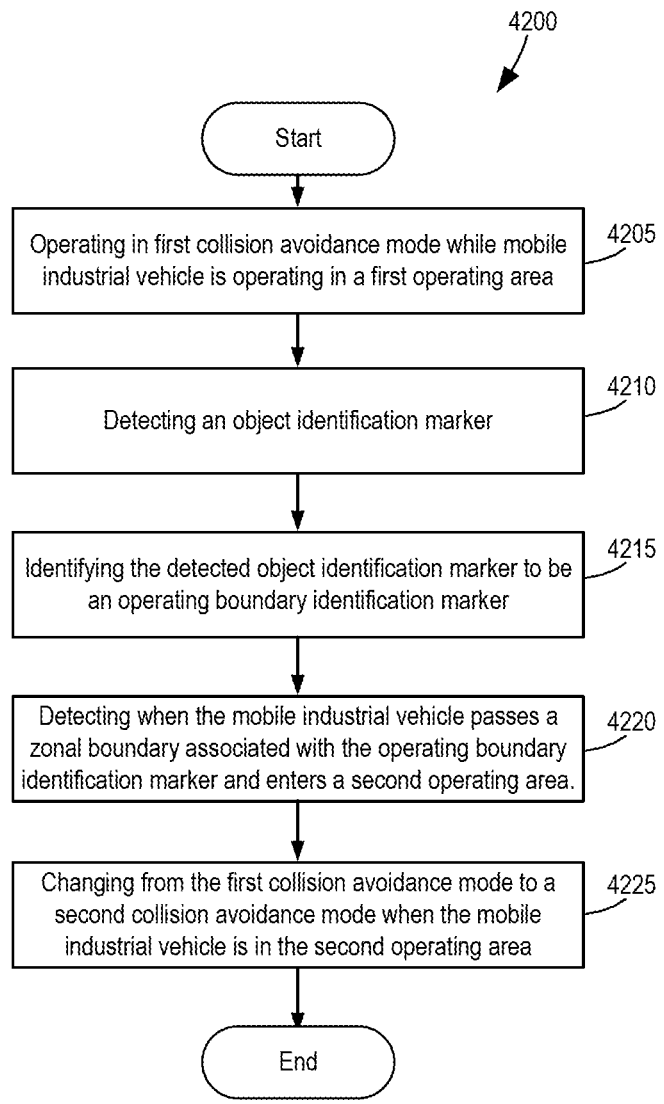
FIG. 42 is a flow diagram of an exemplary method for enhanced collision avoidance by a mobile industrial vehicle using a multi-mode onboard collision avoidance system and that may operate in a plurality of different operating areas in accordance with an embodiment of the invention.

FIG. 42 is a flow diagram of an exemplary method for enhanced collision avoidance by a mobile industrial vehicle using a multi-mode onboard collision avoidance system and that may operate in a plurality of different operating areas in accordance with an embodiment of the invention. Referring now to FIG. 42, exemplary method 4200 begins with the multi-mode onboard collision avoidance system on the mobile industrial vehicle operating in a first collision avoidance mode (e.g., DL mode) while the mobile industrial vehicle is operating in a first of the different operating areas (e.g., the drive lane area 4005 shown in FIGS. 40 and 41). At step 4210, method 4200 proceeds with one of the sensors of the multi-mode onboard collision avoidance system detecting an object identification marker (e.g., marker 3900 or marker 4010, such as an ArUco marker coded to correspond represent a zonal boundary and configured to indicate an orientation for the zonal boundary).

At step 4215, method 4200 proceeds with the multi-mode onboard collision avoidance system identifying the detected first object identification marker to be an operating boundary identification marker. For example, the collision avoidance system 300 on vehicle 115*a* shown in FIG. 41 may detect and identify marker 4010 to an operating boundary identification marker representing a zonal boundary between the DL operating area 4005 and the AGA operating area 4000. At step 4220, method 4200 proceeds with detecting, by the one or more of the sensors of the multi-mode onboard collision avoidance system, when the mobile industrial vehicle passes a zonal boundary associated with the operating boundary identification marker and enters a second of the different operating areas.

At step 4225, method 4200 proceeds with the multi-mode onboard collision avoidance system changing operations from the first collision avoidance mode to a second collision avoidance mode governing operations of the multi-mode onboard collision avoidance system when in the second of the different operating areas. As such, the second collision avoidance mode (e.g., AGA mode) has at least one operating parameter that is more restrictive compared to that operating parameter in the first collision avoidance mode (e.g., DL mode). In more detail, changing from the first to the second collision avoidance mode in step 4225 may be implemented where using a second set of operating parameters for the multi-mode onboard collision avoidance system when in the second collision avoidance mode instead of a first set of operating parameters for the multi-mode onboard collision avoidance system when in the first collision avoidance mode, where at least one operating parameter common to each set has a more restrictive value as part of the second set of operating parameters when compared to as part of the first set of operating parameters. Such an operating parameter may be, for example, a speed limit threshold for the mobile industrial vehicle or a keep off distance for the mobile industrial vehicle (e.g., a minimum radial distance from the mobile industrial vehicle to an object as detected by the multi-mode onboard collision avoidance system, or a minimum radial distance from the mobile industrial vehicle to a reflective beacon as detected by the multi-mode onboard collision avoidance system).

In more detail, the second collision avoidance mode and first collision avoidance modes may different in what operating features are used on the multi-mode collision avoidance system in the different modes. For example, at least one additional operating feature of the multi-mode collision avoidance system may be used in the second collision avoidance mode (e.g., AGA mode) when compared to operating features of the multi-mode collision avoidance system used in the first collision avoidance mode (e.g., DL mode). Such an additional operating feature (or different operating features) may include, for example, a minimum keep off distance threshold feature of causing the mobile industrial vehicle to not be moved within the minimum keep off distance threshold from an object detected by the sensor; an object persistence feature of tracking a detected object after the detected object is out of the field of view of the sensor; an altered field of view feature of changing the field of view of the sensor to enhance avoiding a collision when operating in the second collision avoidance mode; and/or a specialized object detection feature of enabling separate detection of a reflective beacon distinct from and in addition to detection of other objects when operating in the second collision avoidance mode.

Additional Details on Exemplary Dynamic Path-Following or Kinematics Model

As noted above, embodiments may use a dynamic path-following or kinematics model as part of applied and enhanced system, apparatus, and method embodiments that involve predicting future states of (e.g., the movement and path of) multiple element mobile industrial vehicles, such as a cargo tractor with towed dollies or trailers, as part of improved embodiments for avoiding collisions by the mobile industrial vehicle with a high value asset.

In this particular description of an embodiment of such an exemplary dynamic-path following or kinematical model that may be deployed as part of applied and enhanced system, apparatus, and method embodiments, the following abbreviations are used and explained as follows:

t: current time; $\Delta t$: time step u(0): initial displacement; u(t): current displacement at time t u(t+$\Delta t$): next displacement at t+$\Delta t$; v(0): initial linear velocity v(t): current linear velocity at time t; v(t+$\Delta t$): linear velocity at t+$\Delta t$ a(0): initial linear acceleration; a(t): current linear acceleration at t a(t+$\Delta t$): linear acceleration at t+$\Delta t$;

$\theta$(0): initial directional angle; $\theta$(t): current directional angle at time t $\theta$(t+$\Delta t$): next directional angle at t+$\Delta t$; $\omega$(0): initial angular velocity $\omega$(t): angular velocity at time t; $\omega$(t+$\Delta t$): angular velocity at t+$\Delta t$ $\alpha$(0): initial angular acceleration; a(t): angular acceleration at time t $\alpha$(t+$\Delta t$): angular acceleration at t+$\Delta t$;

w: width of vehicle; l: length of vehicle $L_f$: length of hitch on the front part of a vehicle $L_r$: length of hitch on the rear part of a vehicle $\beta$: steering angle; WB: wheel base $L_a$: distance from the rear axle of the towing vehicle to its hitch point $L_b$: distance from the previous hitch point to the rear axle of a towed vehicle $L_c$: distance from the rear axle of a towed vehicle to the next hitch point $R_{ra0}$: rear axle radius of the towing vehicle $R_{rai}$: rear axle radius of the $i^{th}$ towed vehicle $R_{h0}$: hitch radius of the towing vehicle $R_{hi}$: hitch radius of the $i^{th}$ towed vehicle Subscript x, y: along X- and Y-direction Subscript d: towed vehicle Subscript i: the $i^{th}$ vehicle, i=0 is the towing vehicle, i=1 to 4 represents towed units Generally, the below described embodiment of an exemplary dynamic-path following or kinematical model (including FIGS. 11-19) that may be deployed as part of applied and enhanced system, apparatus, and method embodiments predicts the continuous motion of towing vehicle systems and follows their trajectory. Off-tracking effects occurring when the towing vehicle system is making a turn is addressed by the exemplary model. The framework of this exemplary model includes (1) a state space model that describes the relationships between the elements of motion (linear and angular position, velocity, and acceleration) of the towing vehicle and its towed vehicles (e.g., dollies and/or trailers); (2) a geometric model that locates instantaneous positions for those vehicles, including those of the hitch points; (3) an Ackerman steering model that outlines the shape of an entire towing vehicle system at any time by taking the off-tracking effect into consideration; and (4) a hitch back model that calculates the history of directional angles of the towed vehicles based on the input of the towing vehicle and, therefore, capturing the continuous motion of the towing vehicle system.

In prior attempts to address the problem of more accurately tracking the continuous motion of a towing vehicle system (elements of a mobile industrial vehicle), considerable error has been found when comparing the path predicted from that model with the real path of a towing vehicle system. Prior attempts at modeling such behavior assumed that the subsequent towed vehicles follow the same path as the towing vehicle and neglected the off-tracking effect. While others attempted to address this problem using, for example, a kingpin sliding technique and a movable junction technique to eliminate the off-tracking deviation of train-like vehicles, the implementation of those technologies is too costly and most of the towing vehicle systems are still subject to the off-tracking problem. Thus, in order to improve prediction accuracy, an improved dynamic model was developed that addressed the off-tracking effect as described below in more detail.

Figure 11:
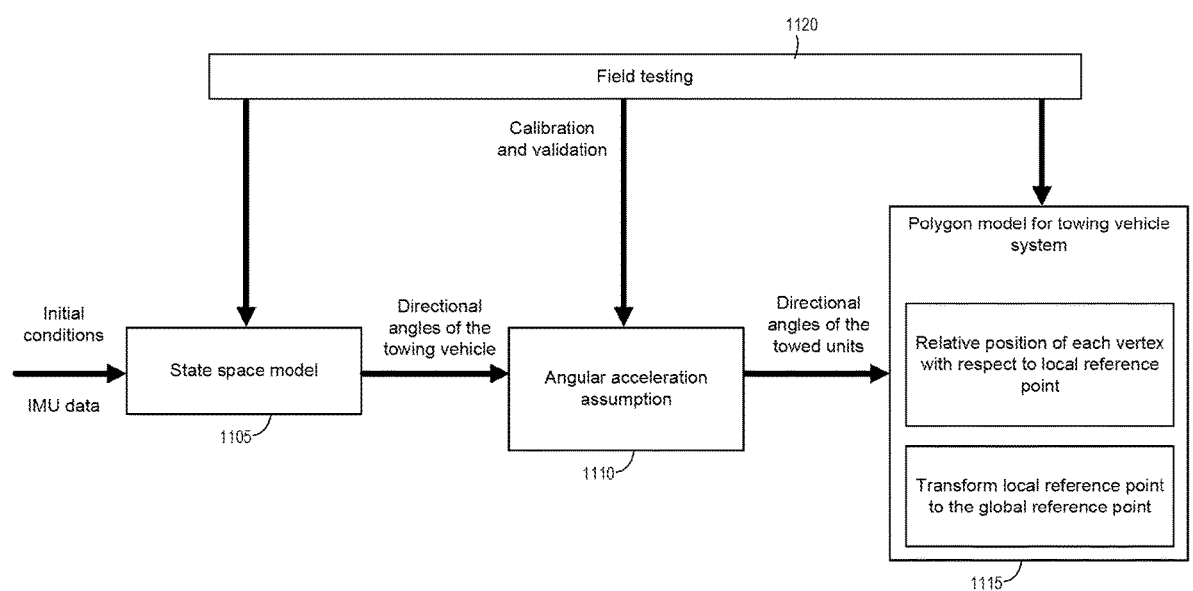
FIG. 11 is an exemplary framework diagram of a dynamic modeling frame that determines the instantaneous status of towing vehicle systems in accordance with an embodiment of the invention.

In train-like vehicle systems, the off-tracking effect means that the towed vehicle always follows a tighter path around a corner compared to the towing vehicle and with more towed units (trailers), each subsequent trailer would follow a tighter path than the one that went before it. As shown in FIG. 11, an exemplary dynamic modeling frame 1105-1120 determined the instantaneous status of towing vehicle systems by employing a state space model to calculate instantaneous positions and velocities for the towing vehicle based on Newton's second law, and thereby estimating the positions of the subsequent towed vehicles by assuming that each towed unit follows the same path (sequence of directional angles) as the towing vehicle. Eqn. (1) shown below lists the state space model, which calculates the instantaneous positions and velocities of the towing vehicle based on its initial conditions collected from the IMU.

$$\begin{Bmatrix} u_x(t+\Delta t) \\ u_y(t+\Delta t) \\ \theta(t+\Delta t) \\ v_x(t+\Delta t) \\ v_y(t+\Delta t) \\ \omega(t+\Delta t) \end{Bmatrix} = \begin{bmatrix} 1 & 0 & 0 & \Delta t & 0 & 0 \\ 0 & 1 & 0 & 0 & \Delta t & 0 \\ 0 & 0 & 1 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{Bmatrix} u_x(t) \\ u_y(t) \\ \theta(t) \\ v_x(t) \\ v_y(t) \\ \omega(t) \end{Bmatrix} + \begin{bmatrix} \frac{\Delta t^2}{2} & 0 & 0 \\ 0 & \frac{\Delta t^2}{2} & 0 \\ 0 & 0 & \frac{\Delta t^2}{2} \\ \Delta t & 0 & 0 \\ 0 & \Delta t & 0 \\ 0 & 0 & \Delta t \end{bmatrix} \begin{Bmatrix} a_x(t) \\ a_y(t) \\ \alpha(t) \end{Bmatrix}$$

Equation (1)

Figure 12:
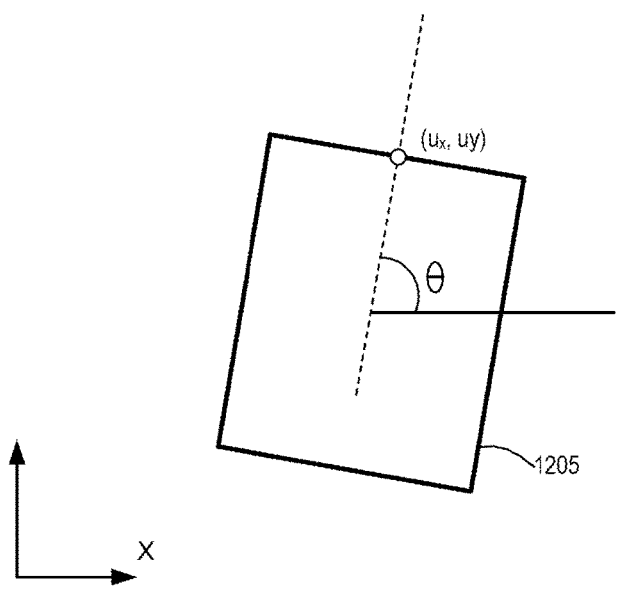
FIG. 12 is a diagram of an exemplary single rigid body model in accordance with an embodiment of the invention.

FIG. 12 is a diagram of an exemplary single rigid body model in accordance with an embodiment of the invention. Assuming that the towing vehicle and towed units are rigid bodies (such as body 1205) with three degrees of freedom: translation along X and Y directions and rotation about Z (as shown in FIG. 12), the state space model can be expressed as Eqn. (1). The position calculated from Eqn. (1) represents the position of a reference point at the towing vehicle and the real-time shape of the towing vehicle will be determined based on the coordinate of that point and its dimensions. The same approach is then applied to determine the instantaneous shapes of the subsequent vehicles.

In Eqn. (1), $u_x$ and $u_y$ represent X- and Y-position of the reference point of a rigid body (e.g., the center of front end of a towing vehicle or towed units), respectively. Based on the reference point, positions of other points within that rigid body can be easily determined following geometric relationship. As a rigid body, any point on the towing vehicle or each towed unit should have the same direction, velocity, and acceleration. The linear velocities and accelerations along X- and Y-directions can be correlated with the directional angle θ as expressed in Eqn. (2) shown below:

$$\frac{v_x(t)}{v_y(t)} = \frac{a_x(t)}{a_y(t)} = \tan(\theta(t)) \qquad \text{Equation (2)}$$

The real-time directional angles of the towing vehicle calculated from Eqn. (1) were then used to predict the directional angles of following towed units to fully determine the shape of the entire towing vehicle system at any time. In estimating the angles of the towed vehicles, the previous model assumed that the towed vehicles follow a same angular position history as the towing vehicle. In another word, the instantaneous directional angle of the towing vehicle is transferred to the subsequent vehicles with an appropriate time delay, which depends on the rigidity of the connection between two neighboring vehicles.

Figure 13:
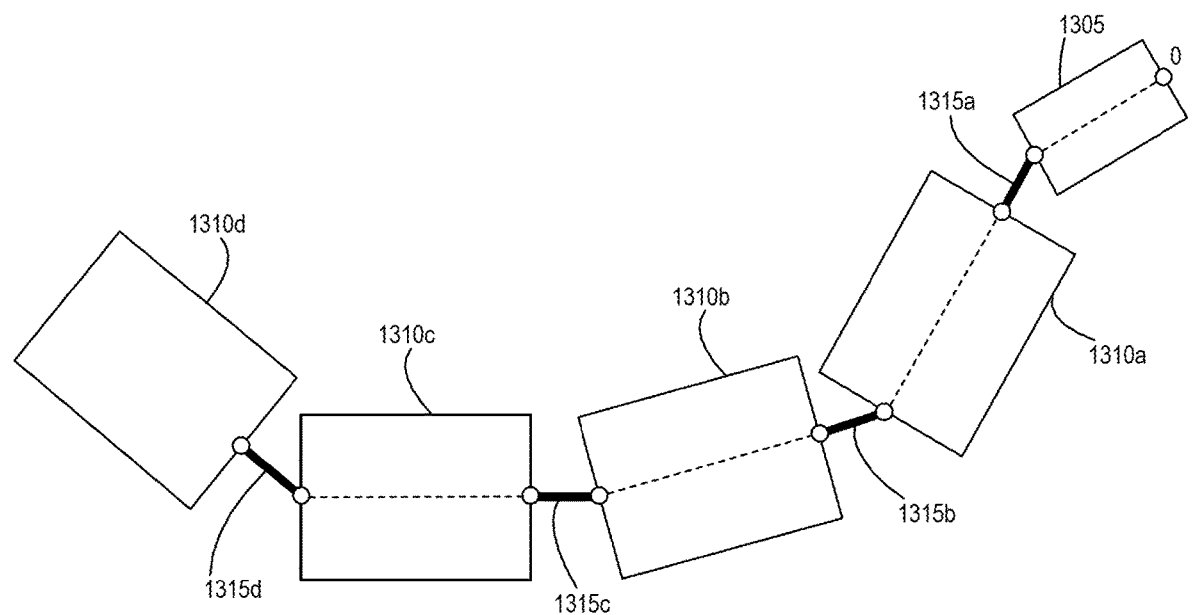
FIG. 13 is a diagram of an exemplary moving towing vehicle system with four towed units in accordance with an embodiment of the invention.

FIG. 13 is a diagram of an exemplary moving towing vehicle system with four towed units in accordance with an embodiment of the invention. Referring now to FIG. 13, the exemplary moving towing vehicle system 1300 is shown as polygons representing a towing vehicle 1305 and a series of towed units (e.g., dollies or trailers) 1310a-1310d linked with hitches 1315a-1315d. Based on the calculated or estimated positions of the towing vehicle 1305 and its sequence towed units 1310a-1310d, a polygon model was developed to predict the instantaneous shape for the exemplary moving towing vehicle system 1300 at any time. A beacon system is used to update instantaneous locations of a reference point on the towing vehicle (e.g. the middle of its front end), which will be an input parameter for this model. In the developed polygon model, the exemplary towing vehicle and each exemplary towed unit are assumed as a rectangle with four vertices, the shape of the entire towed vehicle system then can be represented as a polygon formed by line segments that connect all the vertices. Equation (3) below explains how to calculate global coordinates (related to the reference point O) of four vertices for the $i^{th}$ towed unit $(\tfrac{1}{2}w_d \sin \theta_i - l_t \cos \theta_0 - l_d\Sigma_{j=1}^{i-1} \cos \theta_j - L\Sigma_{j=1}^{i} \cos \theta_j, -\tfrac{1}{2}w_d \cos \theta_i - l_t \sin \theta_0 - l_d\Sigma_{j=1}^{i-1} \sin \theta_j - L\Sigma_{j=1}^{i} \sin \theta_j);$ $(\tfrac{1}{2}w_d \sin \theta_i - l_t \cos \theta_0 - l_d\Sigma_{j=1}^{i} \cos \theta_j - L\Sigma_{j=1}^{i} \cos \theta_j, -\tfrac{1}{2}w_d \cos \theta_i - l_t \sin \theta_0 - l_d\Sigma_{j=1}^{i} \sin \theta_j - L\Sigma_{j=1}^{i} \sin \theta_j);$ $(-\tfrac{1}{2}w_d \sin \theta_i - l_t \cos \theta_0 - l_d\Sigma_{j=1}^{i} \cos \theta_j - L\Sigma_{j=1}^{i} \cos \theta_j, \tfrac{1}{2}w_d \cos \theta_i - l_t \sin \theta_0 - l_d\Sigma_{j=1}^{i} \sin \theta_j - L\Sigma_{j=1}^{i} \sin \theta_j);$ $(-\tfrac{1}{2}w_d \sin \theta_i - l_t \cos \theta_0 - l_d\Sigma_{j=1}^{i-1} \cos \theta_j - L\Sigma_{j=1}^{i} \cos \theta_j, \tfrac{1}{2}w_d \cos \theta_i - l_t \sin \theta_0 - l_d\Sigma_{j=1}^{i-1} \sin \theta_j - L\Sigma_{j=1}^{i} \sin \theta_j);$ Equation (3)

However, by hypothesizing that each towed unit follows the same path (sequence of directional angles) as the towing vehicle, the effect of off-tracking is neglected. In reality, due to the off-tracking effect, the towed vehicle follows a tighter path around a corner compared to the towing vehicle. The negligence of that effect contributes to significant error when predicting the shape of a moving towing vehicle system with more than two towed units using the previously known models.

Figure 14:
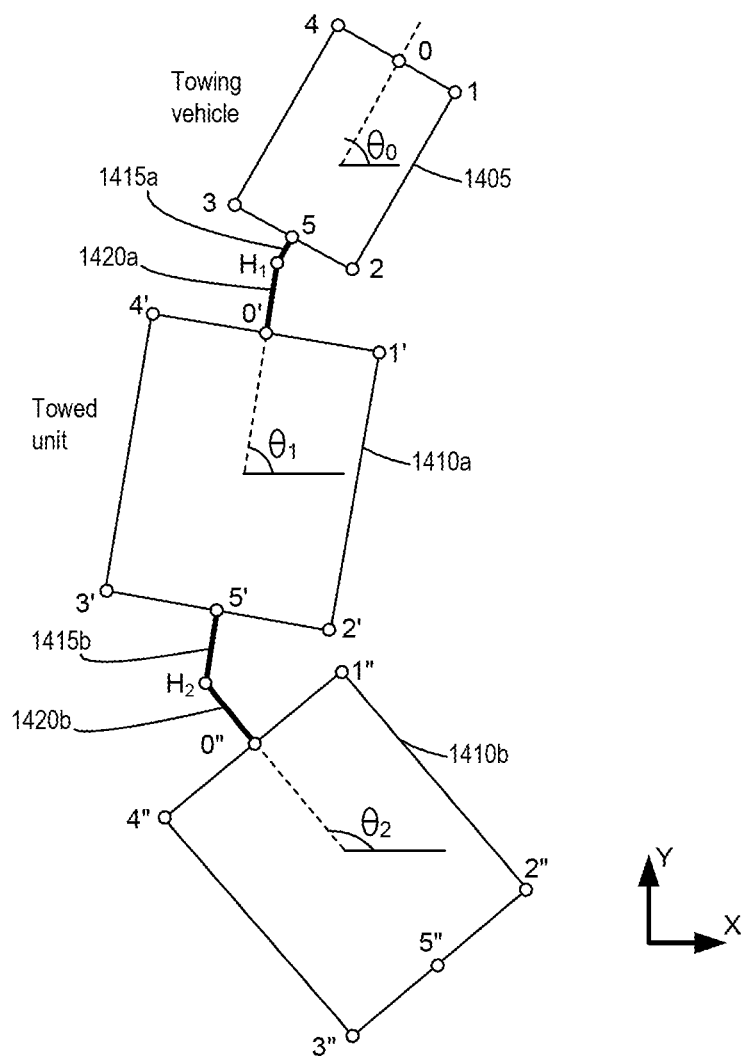
FIG. 14 is diagram of an exemplary geometric model for a towing vehicle system with an exemplary towing vehicle and two towed vehicle units showing hitch points in accordance with an embodiment of the invention.
Figure 15:
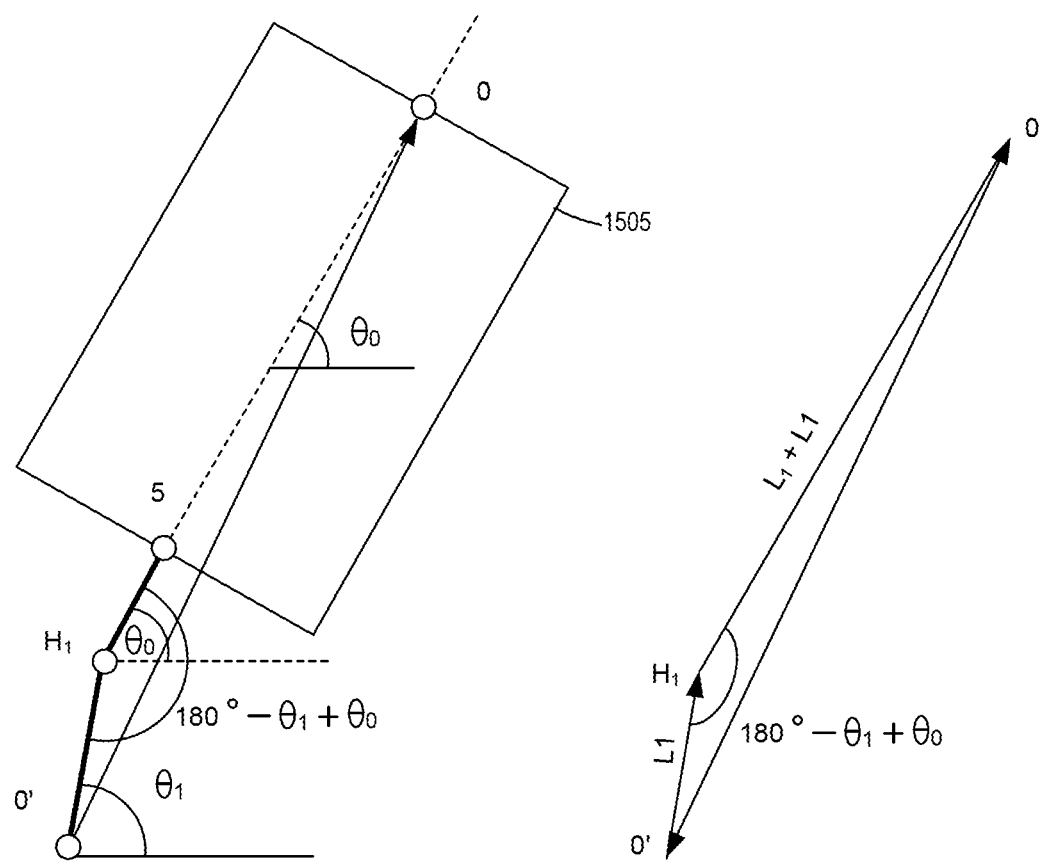
FIG. 15 is a diagram of an exemplary towed vehicle and its hitch point and related vectors in accordance with an embodiment of the invention.

An embodiment of an improved model can track the path of towing vehicle systems. FIG. 14 is diagram of an exemplary geometric model for a towing vehicle system with an exemplary towing vehicle 1405 and two towed vehicle units 1410a, 1410b showing hitch points $H_1$, $H_2$ in accordance with an embodiment of the invention. As part of such an embodiment, the geometric model decides coordinates of all vertices of a moving towing vehicle system at any time, based on which the instantaneous shape of that system can be easily drawn. This model has the connection between the towing vehicle and the towed vehicle, as well as between any two neighboring towed vehicles being represented as a rigid link (e.g., 1415a, 1415b) from the middle of the rear end of the towing vehicle (or a front towed vehicle) to the hitch point, and another rigid link (e.g., link 1420a, 1420b) from that hitch point to the middle of the front end of the towed vehicle (or a rear towed vehicle). Such modeling of the connection allows for implementation of a steering model to capture the off-tracking effect in predicting the path of the vehicle system.

Referring to the exemplary geographic model shown in FIG. 14, various labels and abbreviations are used. For example, $w_t$ is used to represent the width of the towing vehicle, $l_t$ its length, $w_d$ the width of the towed unit, $l_d$ its length, $L_r$ to denote the length of hitch attached to the rear end of the towing vehicle (from 5 to $H_1$), and $L_f$ to denote the length of hitch attached to the front end of the first towed unit (from $H_1$ to O'). Coordinates of the vertices 1~5 of the towing vehicle model and the hitch point $H_1$ can be computed as $1 = (\tfrac{1}{2}w_t \sin \theta_0, -\tfrac{1}{2}w_t \cos \theta_0);$ $2 = (\tfrac{1}{2}w_t \sin \theta_0 - l_t \cos \theta_0, -\tfrac{1}{2}w_t \cos \theta_0 - l_t \sin \theta_0);$ $3 = (-\tfrac{1}{2}w_t \sin \theta_0 - l_t \cos \theta_0, \tfrac{1}{2}w_t \cos \theta_0 - l_t \sin \theta_0);$ $4 = (-\tfrac{1}{2}w_t \sin \theta_0, \tfrac{1}{2}w_t \cos \theta_0);$ and $5 = (-l_t \cos \theta_0, -l_t \sin \theta_0); H_1 = (-(l_t + L_r)\cos \theta_0, -(l_t + L_r)\sin \theta_0)$ Equation (4)

Coordinates of 1' to 5' and $H_2$ with respect to the local reference point O' can be expressed following the same manner as:

$1' = (\tfrac{1}{2}w_d \sin \theta_1, -\tfrac{1}{2}w_d \cos \theta_1);$ $2' = (\tfrac{1}{2}w_d \sin \theta_1 - l_d \cos \theta_1, -\tfrac{1}{2}w_d \cos \theta_1 - l_d \sin \theta_1);$ $3' = (-\tfrac{1}{2}w_d \sin \theta_1 - l_d \cos \theta_1, \tfrac{1}{2}w_d \cos \theta_1 - l_d \sin \theta_1);$ $4' = (-\tfrac{1}{2}w_d \sin \theta_1, \tfrac{1}{2}w_d \cos \theta_1);$ $5' = (-l_d \sin \theta_1, -l_d \sin \theta_1);$ and $H_2 = (-(l_d + L_r)\cos \theta_1, -(l_d + L_r)\sin \theta_1)$ Equation (5)

Likewise, for the $i^{th}$ towed unit, the relative coordinates of its five vertices and $H_i$ with respect to its local reference point can be easily expressed as $1^i = (½w_d \sin θ_i, -½w_d \cos θ_i)$;

$2^i = (½w_d \sin θ_i - l_d \cos θ_i, -½w_d \cos θ_i - l_d \sin θ_i)$;

$3^i = (-½w_d \sin θ_i - l_d \cos θ_i, ½w_d \cos θ_i - l_d \sin θ_i)$;

$4^i = (-½w_d \sin θ_i, ½w_d \cos θ_i)$;

$5^i = (-l_d \cos θ_i, -l_d \sin θ_i)$; and $H^i = (-(l_d + L_r) \cos θ_i, -(l_d + L_r) \sin θ_i)$    Equation (6)

Next, the relative coordinates of four vertices of the first towed unit (Eqns. (4)) are mapped back to the global reference point O in order to obtain their global coordinates. This operation can be performed by transforming the reference point from O' to O. In order to find the mapping relation, a triangle $\Delta OH_1O'$ can be constructed with three vectors $\overrightarrow{O'H_1}$, $\overrightarrow{H_1O}$, and $\overrightarrow{OO'}$, as illustrated with exemplary towed unit 1505 in FIG. 15. Lengths of two vectors $\overrightarrow{O'H_1}$, and $\overrightarrow{H_1O}$ are $OH_1 = l_t + L_r$, and $H_1O' = L_f$; directions of the two vectors are denoted by angles $θ_1$ and $θ_0$. According to the cosine and sine law, the triangle $\Delta OH_1O'$ can be fully solved and the coordinate of O' can be easily mapped to the coordinate of O following the vector addition approach as $O'_x - L_f \cos θ_1 - (l_t + L_r) \cos θ_0 = O_x$ and $O'_y - L_f \sin θ_1 - (l_t + L_r) \sin θ_0 = O_y$. Thus, the global coordinates of the four vertices (1' to 4') of the 1st towed vehicle can be calculated as $1' = (½w_d \sin θ_1 - (l_t + L_r) \cos θ_0 - L_f \cos θ_1, -½w_d \cos θ_1 - (l_t + L_r) \sin θ_0 - L_f \sin θ_1)$;

$2' = (½w_d \sin θ_1 - l_d \cos θ_1 - (l_t + L_r) \cos θ_0 - L_f \cos θ_1, -½w_d \cos θ_1 - l_d \sin θ_1 - (l_t + L_r) \sin θ_0 - L_f \sin θ_1)$;

$3' = (-½w_d \sin θ_1 - l_d \cos θ_1 - (l_t + L_r) \cos θ_0 - L_f \cos θ_1, ½w_d \cos θ_1 - l_d \sin θ_1 - (l_t + L_r) \sin θ_0 - L_f \sin θ_1)$;

$4' = (-½w_d \sin θ_1 - (l_t + L_r) \cos θ_0 - L_f \cos θ_1, ½w_d \cos θ_1 - (l_t + L_r) \sin θ_0 - L_f \sin θ_1)$;    Equation (7)

Inspecting Eqn. (7) and combining it with Eqn. (6), the global coordinates (related to the reference point O) of four vertices of the $i^{th}$ towed unit can be obtained as $1 = (½w_d \sin θ_i - (l_t + L_r) \cos θ_0 - (l_d + L_r) \Sigma_{j=1}^{i-1} \cos θ_j - L_f \Sigma_{j=1}^{i} \cos θ_j, -½w_d \cos θ_i - (l_t + L_r) \sin θ_0 - (l_d + L_r) \Sigma_{j=1}^{i-1} \sin θ_j - L_f \Sigma_{j=1}^{i} \sin θ_j)$;

$2 = (½w_d \sin θ_i - (l_t + L_r) \cos θ_0 - (l_d + L_r) \Sigma_{j=1}^{i-1} \cos θ_j - L_f \Sigma_{j=1}^{i} \cos θ_j, -½w_d \cos θ_i - (l_t + L_r) \sin θ_0 - (l_d + L_r) \Sigma_{j=1}^{i-1} \sin θ_j - L_f \Sigma_{j=1}^{i} \sin θ_j)$;

$3 = (-½w_d \sin θ_i - (l_t + L_r) \cos θ_0 - (l_d + L_r) \Sigma_{j=1}^{i-1} \cos θ_j, ½w_d \cos θ_i - (l_t + L_r) \sin θ_0 - (l_d + L_r) \Sigma_{j=1}^{i-1} \sin θ_j - L_f \Sigma_{j=1}^{i} \sin θ_j)$;

$4 = (-½w_d \sin θ_i - (l_t + L_r) \cos θ_0 - (l_d + L_r) \Sigma_{j=1}^{i-1} \cos θ_j - L_f \Sigma_{j=1}^{i} \cos θ_j, ½w_d \cos θ_i - (l_t + L_r) \sin θ_0 - (l_d + L_r) \Sigma_{j=1}^{i-1} \sin θ_j - L_f \Sigma_{j=1}^{i} \sin θ_j)$    Equation (8)

In order to correctly calculate turning radii of the towing and towed vehicles when the towing vehicle system is making a turn, an Ackerman steering model may be used. Those skilled in the art will appreciate that the Ackerman steering principle defines geometry that is applied to all vehicles in a towing vehicle system with respect to the turning angle of steering wheels (known as the steering angle β). Through that principle, radii at several key points of the vehicle system can be determined, based on which the position of the towed units related to the towing vehicle can be decided and the path of the entire system can be well simulated. By using the Ackerman steering principles as part of this embodiment of a new path-following model, an improved and enhanced description of instantaneous positions of the towing vehicle and each towed vehicle may be achieved that take the maximum off-tracking into account. An embodiment of such a model is further explained below.

Figure 16:
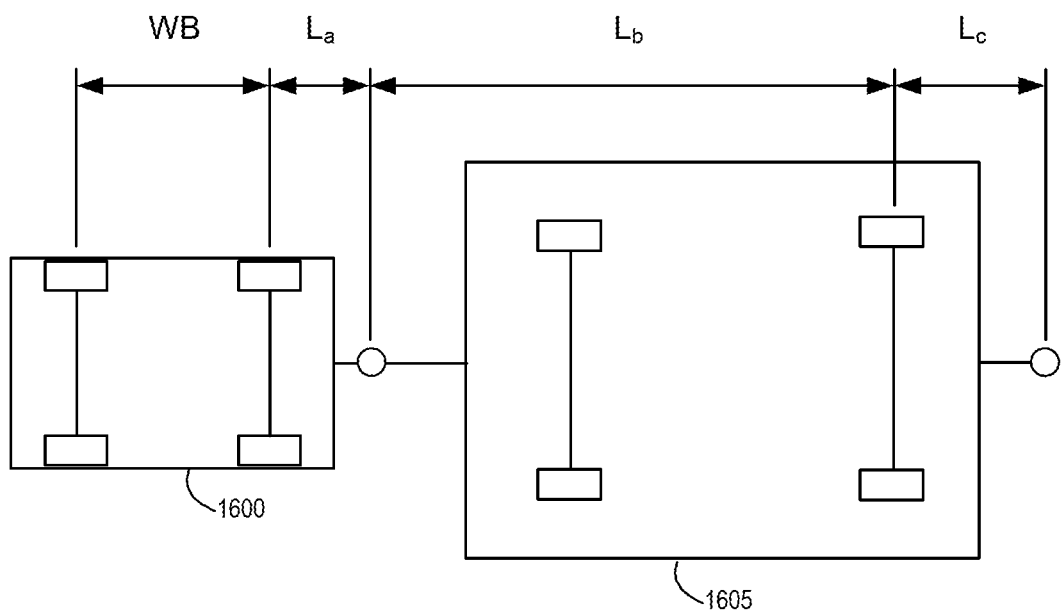
FIG. 16 is a diagram of an exemplary towing vehicle and one towed vehicle (trailer) illustrating particular lengths in a tractor-trailer model in accordance with an embodiment of the invention.
Figure 17:
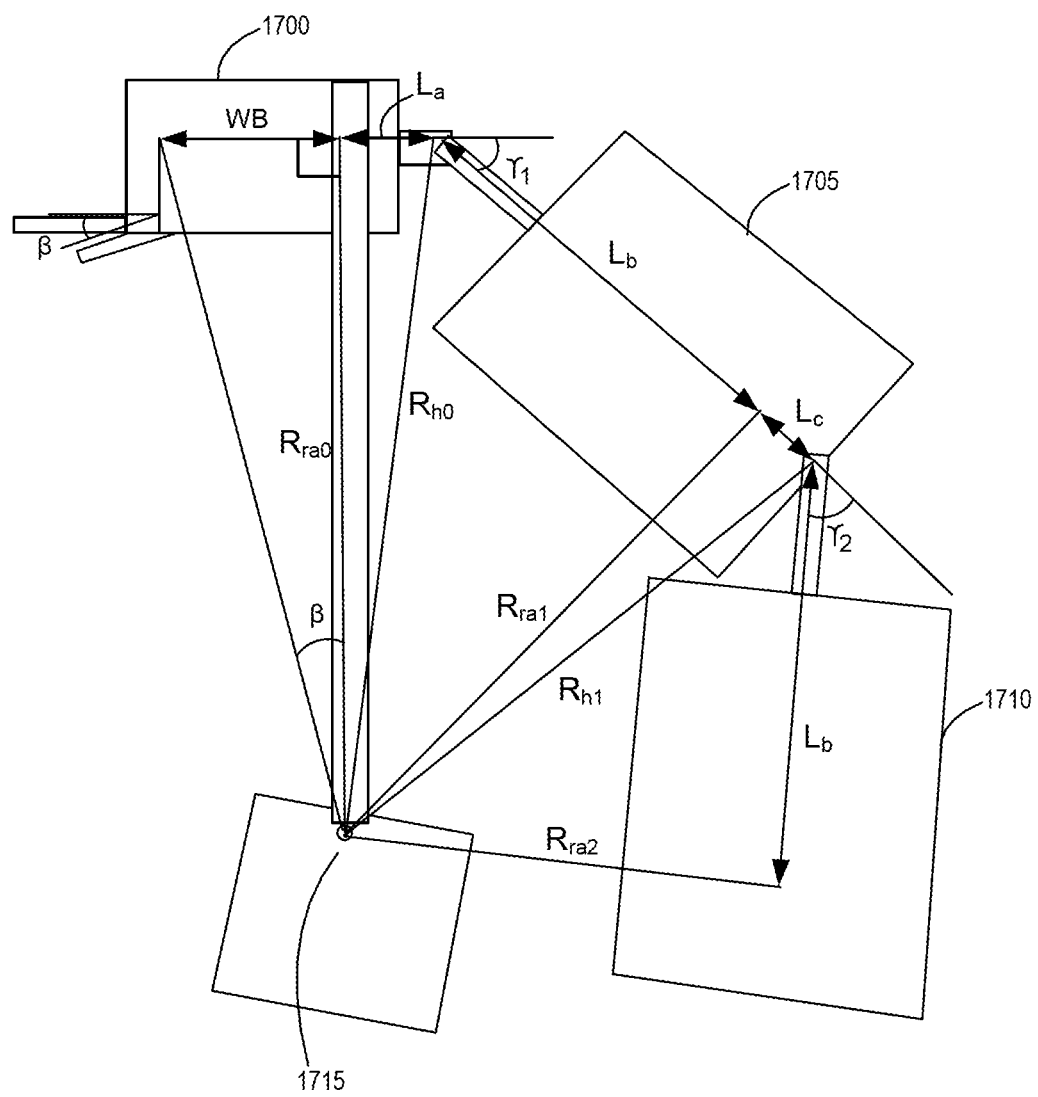
FIG. 17 is a diagram of an exemplary scale model of the exemplary towing vehicle and two towed vehicles (trailers) illustrating particular lengths and particular radii that define a series of virtual triangles in accordance with an embodiment of the invention.

FIG. 16 illustrates a simplified exemplary vehicle system with one towing vehicle (tractor) 1600 and one towed vehicle (trailer) 1605 along with various distance reference lengths in a tractor-trailer model in accordance with an embodiment of the invention. FIG. 17 is a diagram of an exemplary scale model of the exemplary towing vehicle 1700 and two towed vehicles (trailers) 1705, 1710 illustrating particular lengths and particular radii from a reference point 1715 that define a series of virtual triangles in accordance with an embodiment of the invention. To implement the Ackerman steering principle, WB is used to represent the wheel base of the tractor, $L_a$ to represent the length from the rear axle of the tractor to the hitch point, $L_b$ to represent the length from the hitch point to the rear axle of the trailer, and $L_c$ to represent the distance from the rear axle of the trailer to the next hitch point (FIG. 16). In one embodiment, the vehicle system with multiple towed vehicles, $L_b$ and $L_c$ is desired to be the same if the towed vehicles have the same size. Radii calculated for this model include rear axle radius of the tractor 1700 ($R_{ra0}$), rear axle radius of the trailer 1705 (first towed unit) ($R_{ra1}$), hitch radius of the tractor 1700 ($R_{h0}$), and hitch radius of the trailer 1705 ($R_{h1}$), as depicted in FIG. 17. As shown in that figure, a series of virtual triangles can be constructed based on the steering angle and the defined radii and lengths, from which the radii can be calculated from the following trigonometric relationships.

$$R_{ra0} = WB / \tan(β), \quad R_{h0} = \sqrt{L_a^2 + R_{ra0}^2},$$
$$γ_1 = π - \arccos\left(\frac{L_a}{R_{h0}}\right) - \arccos\left(\frac{L_b}{R_{h0}}\right)$$

Equation (9)

where $γ_1$ denotes the difference between the direction of the towing vehicle and the first towed vehicle, which follows the relationship $γ_1 = θ_1 - θ_0$ (FIG. 14). It needs to be mentioned that with the presented steering model, radial position of any point on the vehicle system can be calculated following a similar way to Eqn. (9). We only show the equation to calculate the rear axle radius and hitch radius for the purpose of testing and validation. The front axle radius and its position for the towing vehicle are fully determined through the kinematic model, or the state space model as shown in Eqn. (1)) and do not need to be estimated based on the trigonometric relationships.

Moreover, Eqn. (9) can be easily modified and applied to calculate the radii for any towed vehicle by simply replacing the steering angle and dimensions of the towing vehicle with those of the towed vehicle. Eqn. (10) shows a general formula to calculate the rear axle and hitch radius for the $i^{th}$ towed vehicle, assume that the subsequent towed vehicles are of the same size and have the same $L_b$ and $L_c$.

$$R_{rai} = WB_i / \tan(β_i), \quad R_{hi} = \sqrt{L_c^2 + R_{ari}^2},$$
$$γ_{i+1} = π - \arccos\left(\frac{L_c}{R_{hi}}\right) - \arccos\left(\frac{L_b}{R_{hi}}\right) = θ_{i+1} - θ_i$$

Equation (10)

Hitch Back Method for Path-Following Simulation

The Ackerman steering model helps to predict instantaneous shapes of the towing vehicle system but lacks the capacity of simulating continuous motion of the towing vehicle system by rendering its intermittent steps on a sequence. For example, if a towing vehicle system is traveling in a straight line when the towing vehicle's steering wheels quickly turn to 10° off the heading direction, the towing vehicle and all towed units will instantly adjust themselves into appropriate radial positions as calculated from Eqn. (9) and (10), instead of gradually moving into those positions.

Figure 18A:
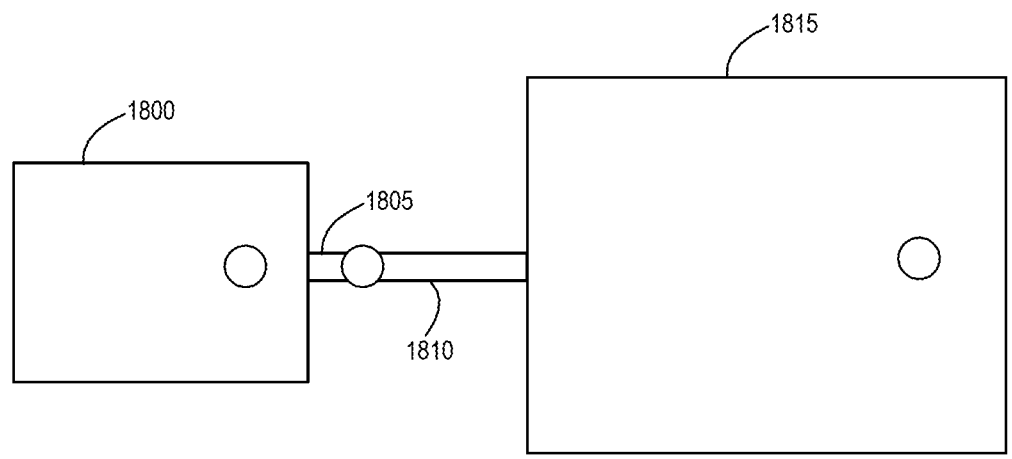
FIG. 18A-18C are diagrams illustrating different configuration states of an exemplary towing vehicle and an exemplary towed vehicle in accordance with an embodiment of the invention.
Figure 18B:
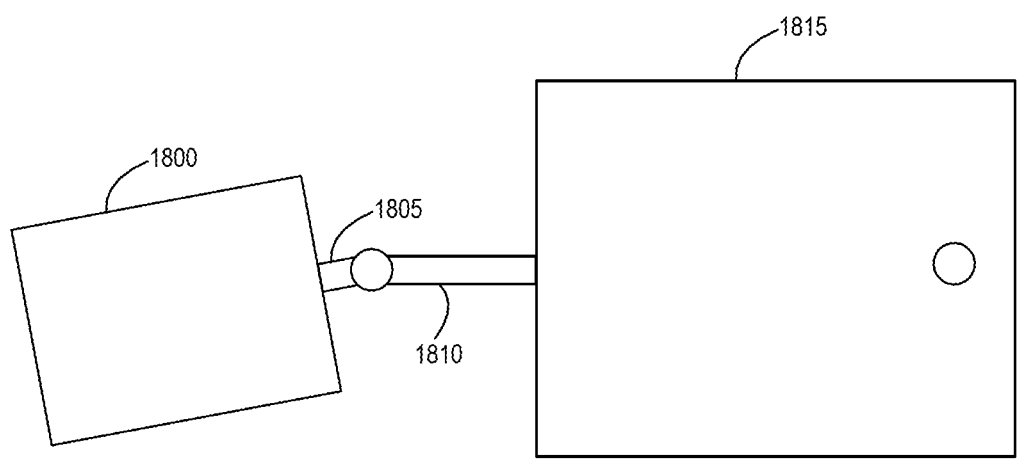
Figure 18C:
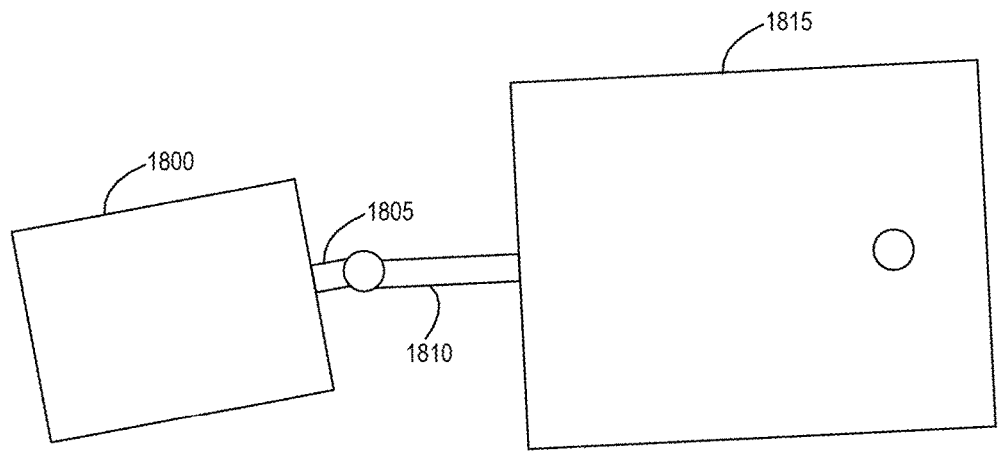
Figure 19:
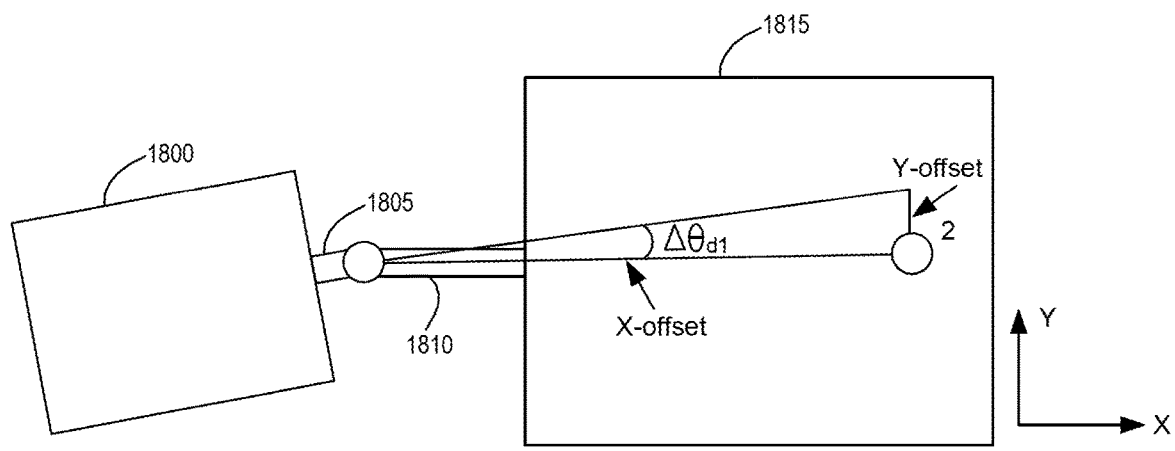
FIG. 19 is a diagram illustrating the trigonometric relationships between the exemplary towing vehicle and the exemplary towed vehicle from FIGS. 18A-18C in accordance with an embodiment of the invention.

In order to more accurately simulate the continuous motion of the towing vehicle system, a "hitch back method" was developed that employs the instantaneous shapes calculated from the Ackerman steering model as reference points while continuously following the path of the towing vehicle system at high accuracy. Referring now to FIGS. 18A-18C, such a method begins from a simple one tractor 1800 (having a rear hitch 1805) and one trailer 1815 (having a front hitch 1810) model at three states: (1) an initial state (FIG. 18A) when the model is traveling in a straight line; (2) an intermediate state (FIG. 18B) when the tractor starts to make a turn while the trailer still travels in that straight line; and (3) a final state (FIG. 18C) when the angular input of the tractor has been transferred to the trailer.

Since the directional angle of the towing vehicle is fully determined based on the IMU data, we only need to develop a process to estimate the increment of angle of the towed vehicle from the initial state to the final state $\Delta\theta_{d1}$. Following a trigonometric relationship illustrated in FIG. 19, the angular increment $\Delta\theta_{d1}$ can be calculated in terms of the X- and Y-offset between the hitch point ahead of it (point 1) and the center point of its rear axle (point 2) as $$\Delta\theta_{di} = \operatorname{atan}\frac{H_{ix} - RA_{dix}}{H_{iy} - RA_{diy}}, i = 1, 2, \ldots \qquad \text{Equation (12)}$$

An exemplary process was generated based on the developed hitch back model (Eqns. (11-12)) and implemented into a simulation package programmed using C++. Continuous motion of the exemplary towing vehicle system with two towed units were successfully simulated using the simulation tool and the simulated path of the towing vehicle system model agreed very well with the real path measured from the scale model and the off-tracking effect when a towing vehicle is making a turn is properly addressed. It deserves to be mentioned that in simulation the velocity of the towing vehicle and its steering angle are input variables, based on which the angular velocity of the towing vehicle can be calculated as $$\omega = \frac{v}{R_{av}} = \frac{v}{WB}\tan\beta,$$

where the rear axle radius $R_{ra}$ is used as the turning radius of the towing vehicle because its center of rotation is located at the center point of the rear axle. The center point of the rear axle is assumed as the center of rotation of a vehicle because the front wheels are free wheels, which generate a steering angle for the vehicle body to follow. In validation, v, ω, and β of the towing vehicle are input from the driver and provided by the IMU data, so the measured radius $R_{ra}$ was compared to the calculated radius WB/tan β to verify the accuracy of the Ackerman steering model in predicting the rear axle radius of individual vehicles. Kinematics of the towed vehicles, include their distance, angular velocity, acceleration, angle of rotation, as well as angular velocity and acceleration follow the relationships described in Newton's second law and can be calculated using the state space model (Eqn. (1)).

Additional Details on Multi-Sensor Detection System Embodiments & its Operation

Further exemplary embodiments may include systems, apparatus, and methods where an industrial vehicle (such as a cargo tractor) utilizes a LiDAR and a single color camera to detect passive beacons, and model-predictive control to stop the vehicle from entering a restricted space. In such embodiments, the beacons may be implemented with standard orange traffic cones alone (depending on a desired height) or deployed with a highly reflective vertical pole attached. The LiDAR may detect these beacons, but may suffer from false positives due to other reflective surfaces such as worker safety vests within the visual environment of the LiDAR. As noted above, the embodiments described herein and as follows help reduce false positive detection from the LiDAR by projecting the beacons in the camera imagery via a deep learning method, and validating the detection using a neural-network learned projection from the camera to the LiDAR space.

In more detail, the further embodiments described below (and illustrated with reference to diagrams in FIGS. 20-37) provide and make use of a substantially real-time industrial collision avoidance sensor system designed to not run into obstacles or people and to protect high-valued equipment. In general, such embodiments may utilize a scanning LiDAR and one or more RGB cameras. A passive beacon is utilized to mark off quarantined areas where the industrial vehicle is not allowed to enter —thus preventing collisions with high-valued equipment. A front-guard processing mode prevents collisions with objects directly in front of the vehicle.

To provide a robust system, the sensing processing system of such an embodiment may use a LiDAR sensor (e.g., a Quanergy eight-beam LiDAR) and a camera sensor (e.g., a single RGB camera). The LiDAR sensor is an active sensor, which can work regardless of the natural illumination. It can accurately localize objects via their 3D reflections. However, the LiDAR is monochromatic and does not differentiate objects based on color. Furthermore, for objects that are far away, the LiDAR may only have one to two beams intersecting the object, making reliable detection problematic. However, unlike the LiDAR, the RGB camera can make detection decisions based on texture, shape and color. An RGB stereo camera can be used to detect objects and to estimate 3D positions. While an embodiment may use more than one camera, the use of stereo cameras typically requires extensive additional processing and may result in difficulty estimating depth when objects lack textural cues. On the other hand, a single RGB camera can be used to accurately localize objects in the image itself (e.g., determine bounding boxes and classify objects). However, the resulting localization projected into 3D space is poor compared to the LiDAR. Furthermore, the camera will degrade in foggy or rainy environments, whereas the LiDAR can still operate effectively.

In the description of the further embodiments that follow below, the embodiments may use both a LiDAR sensor and an RGB camera sensor to accurately detect (e.g., identify) and localize objects using a data fusion process that allows for use of both types of data when detecting or identifying the location of objects. Such embodiments better address the avoidance of collisions using, for example, a fast and efficient method that learns the projection from the camera space to the LiDAR space and provides camera outputs in the form of LiDAR detection (distance and angle); a multi-sensor detection system that fuses both the camera and LiDAR detections to obtain more accurate and robust beacon detections; and/or a technical solution has been implemented using a single Jetson TX2 board (dual CPUs and a GPU) board (a type of multi-processor module) to run the sensor processing and a separate second controller (TX2) for the Model Predictive Control (MPC) system so as to help achieve substantially near real-time operation and avoid lag times (which may lead to collisions). In the context of the description of the further embodiments below, background information on certain types of sensor detection (e.g., camera detection, LiDAR detection) and their use for object detection follows as well as background information on fuzzy logic that may be applied in embodiments to combine data from the different sensors and obtain a detection score for use in such embodiments.

Those skilled in the art will appreciate that object detection from camera imagery may involve both classification and localization of each object of interest. Information on how many objects expected to be found in each image may not be available or known, which means that there is a varying number of outputs for every input image. Additionally, the location of where these objects may appear in the image, or what their sizes might be may not be available or known. Those skilled in the art will further appreciate that with the rise of deep learning (referenced herein as "DL"— also known as deep structured learning or hierarchical machine leaning), existing object detection methods using DL has surpassed many traditional methods in both accuracy and speed. Those skilled in the art will further appreciate the existence of systems improving the detection results in a computationally intelligent way based upon such existing DL detection methods.

In general, image object detection using DL and camera images may use two known approaches. One approach is based on region proposals. Faster regions with convolutional neural networks (R-CNN) is one example. This method first runs the entire input image through some convolutional layers to obtain a feature map. Then there is a separate region proposal network, which uses these convolutional features to propose possible regions for detection. Last, the rest of the network gives classification to these proposed regions. As there are two parts in the network, one for predicting the bounding box, and the other for classification, this kind of architecture may significantly slow down the processing speed. Another type of approach uses one network for both predicting potential regions and for label classification, such as with a You Only Look Once (YOLO) approach. Given an input image, a YOLO approach first divides the image into coarse grids. For each grid, there is a set of base bounding boxes. For each base bounding box, YOLO predicts offsets off the true location, a confidence score, and classification scores if it thinks that there is an object in that grid location. YOLO is fast, but sometimes can fail to detect small objects in the image.

As opposed to camera sensor data based object detection, approaches may use LiDAR detection. For a LiDAR detection based approach, one difficult part may involve classifying points based only on a sparse 3D point cloud. Those skilled in the art will appreciate that one approach may use Eigen-feature analysis of weighted covariance matrices with a Support Vector Machine (SVM) classifier. However, this method is targeted at dense airborne LiDAR point clouds. In another known method, those skilled in the art will appreciate that the feature vectors are classified for each candidate object with respect to a training set of manually labeled object locations.

Those skilled in the art will further appreciate that DL has also been used on 3D object classification. Many existing DL-based 3D object classification problems involve two steps: deciding a data representation to be used for the 3D object and training a convolutional neural network (CNN) on that representation of the object. VoxNet is a 3D CNN architecture that may be used for efficient and accurate object detection from LiDAR and RGBD point clouds. An example of DL for volumetric shapes is the Princeton ModelNet dataset, which has proposed a volumetric representation of the 3D model and a 3D volumetric CNN for classification. However, these solutions also depend on a high density (high beam count) LiDAR, so they would not be suitable for system with an eight-beam Quanergy M8 LiDAR sensor that is an economically viable LiDAR sensor for deploying on a mobile industrial vehicle (such as a cargo tractor).

In systems that fuse different data for object detection, as in the embodiments described herein, different sensors for object detection have their advantages and disadvantages. Embodiments of sensor fusion may integrate different sensors for more accurate and robust detection. For instance, in object detection, cameras can provide rich texture-based and color-based information, which LiDAR generally lacks. On the other hand, LiDAR can work in low visibility, such as at night or in moderate fog or rain. Camera processing in poor-weather conditions can degrade or even fail completely. Also, for the detection of the object position relative to the sensor, the LiDAR can provide a much more accurate spatial coordinate estimation compared to a camera. As both camera and LiDAR have their advantages and disadvantages, when fusing them together, embodiments that improve and enhance object detection based upon fused data may utilize their advantages and eliminate their disadvantages. One approach for camera and LiDAR fusion uses extrinsic calibration (e.g., an approach that uses various checkerboard patterns or look for corresponding points or edges in both the LiDAR and camera imagery, another approach that looks for corresponding points or edges in both the LiDAR and camera imagery in order to perform extrinsic calibration). However, such known approaches require the LiDAR sensors to be expensive with relatively high vertical special resolution (e.g., based upon 32 or 64 beams). Another approach estimates transformation matrices between the LiDAR and the camera. But these approaches are limited and suitable for modeling of only indoor and short range environments.

Another approach uses a similarity measure that automatically registers LiDAR and optical images. However, this approach also uses dense LiDAR measurements. A third kind of approach uses stereo cameras and LiDAR for fusion, which fuses sparse 3D LiDAR and dense stereo image point clouds. However, the matching of corresponding points in stereo images is computationally complex, and susceptible to error if there is little texture in the images. Both of these approaches require dense point clouds and would not be effective with the smaller LiDARs such as the Quanergy M8. Comparing with previous approaches, the embodiments described herein differ in a unique and inventive manner by, for example, using a single camera and relatively inexpensive eight-beam LiDAR for an outdoor collision avoidance system that avoids lags that may be intolerable for a substantially real-time collision avoidance system.

Embodiments may deploy fuzzy logic in processing related elements as part of the solution. One term related to "fuzzy logic" implementations is fuzzy set, which is defined as a class of objects with a continuum of grades of membership. Those skilled in the art will appreciate that the relation between linguistic variable and fuzzy set may be that a linguistic variable can be interpreted using fuzzy sets, which basically means a fuzzy set may be a mathematical representation of linguistic variables. An example of fuzzy set is "a class of tall students." The membership function assigns to each object a grade of membership ranging between zero and one. Instead of giving either true or false conclusions, fuzzy logic uses degrees of truth. The process of fuzzy logic includes three steps. First, input is fuzzified into fuzzy membership function. Then, IF-THEN rules are applied to produce the fuzzy output function. Last, the fuzzy output function is de-fuzzified to get specific output values. Thus, fuzzy logic can be used to reason with inputs that have uncertainty and may be used to combine scores (e.g., confidence scores) from the camera and the LiDAR to obtain a detection score (also referred to as a final confidence score on the probability of detection) for the final fusion result as described in more detail below.

Figure 20:
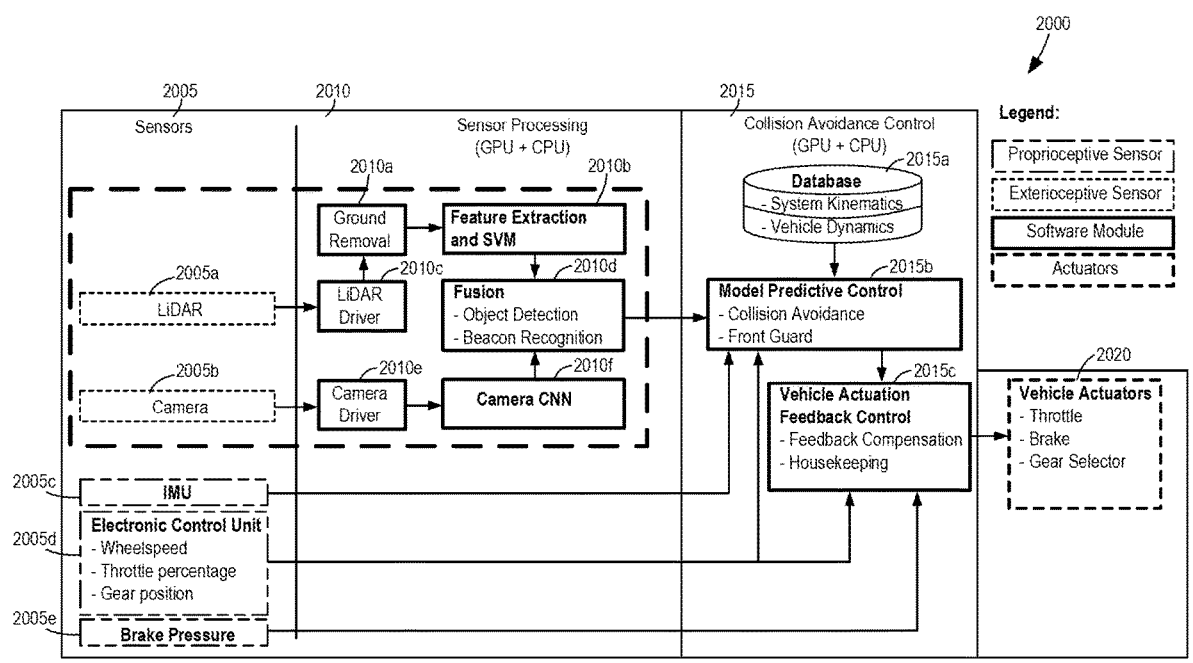
FIG. 20 is a diagram illustrating an exemplary system architecture in accordance with an embodiment of the invention.

FIGS. 20-37 provide additional details further embodiments. Referring now to FIG. 20, an exemplary system architecture 2000 is illustrated in accordance with an embodiment of the invention having exemplary sensors 2005 (e.g., LiDAR sensor 2005$a$, camera sensor 2005$b$, IMU sensor(s) 2005$c$, ECU sensors 2005$d$, and brake pressure sensors 2005$e$), a sensor signal processing system 2010, a collision avoidance control system 2015 (involving a database 2015$a$, a model predictive controller 2015$b$, and a vehicle actuation system 2015$c$), and vehicle actuators 2020. As such, exemplary system architecture 2000 is similar to that shown in FIG. 3 and described above related to exemplary system 300.

As shown in FIG. 20, IMU is an abbreviation for Inertial Measurement Unit; GPU is an abbreviation for Graphics Processing Unit; CPU is an abbreviation for Central Processing Unit; SVM is an abbreviation for Support Vector Machine; and CNN is an abbreviation for Convolutional Neural Network. In FIG. 20, the exemplary camera 2005$b$ and LiDAR 2005$a$ are exteroceptive sensors, and their outputs go to the signal processing system 2010. The LiDAR sensor 2005$a$ detects beacons and rejects other objects. The LiDAR signal processing output gives beacon locations as a distance in meters (in front of the industrial vehicle), the azimuth angle in degrees, and a discriminant value, which is used to discriminate beacons from non-beacons. The camera 2005$b$ reports detections as relative bounding box locations in the image, as well as a confidence of the detection and classification. The LiDAR and camera information is fused to create more robust detections as part of signal processing system 2010.

Figure 21:
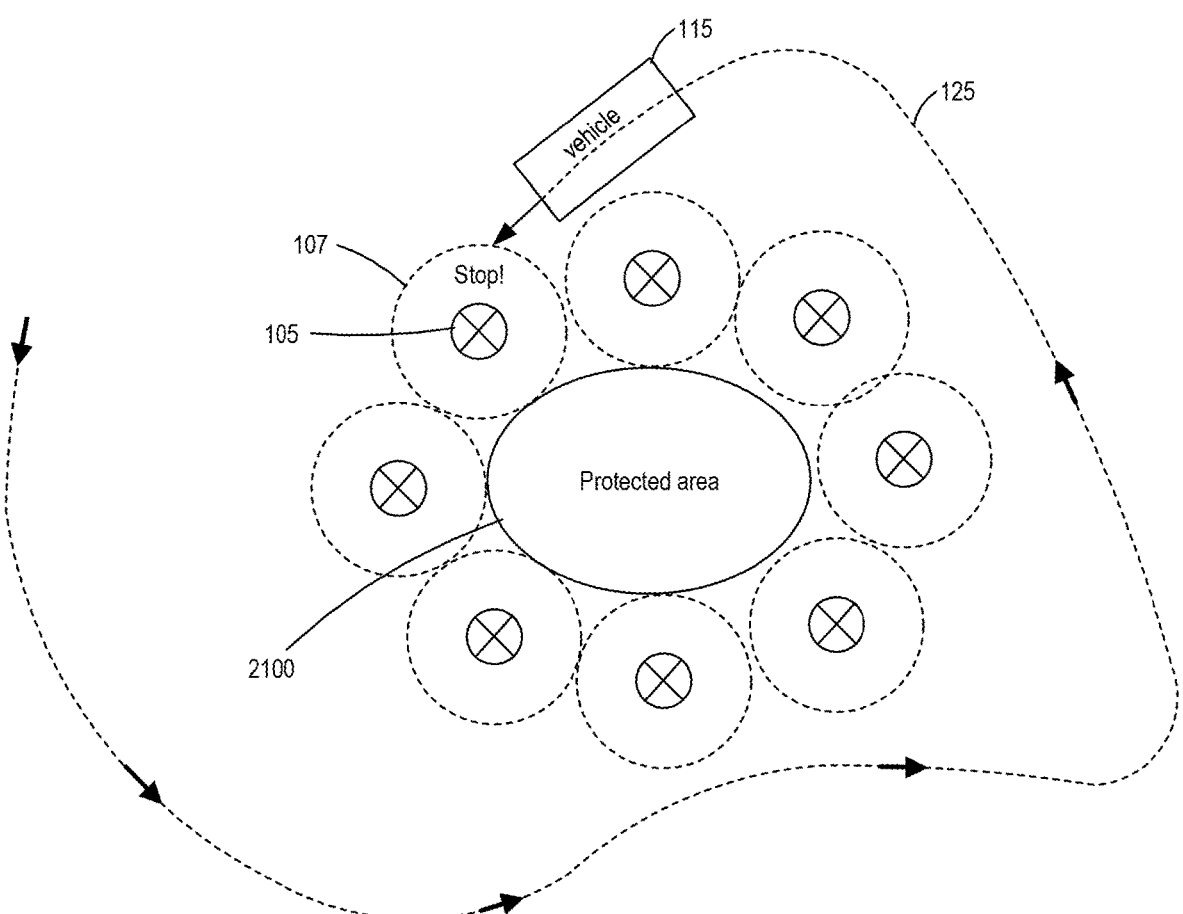
FIG. 21 is an exemplary diagram showing a vehicle disposed and moving relative to different beacons that are placed near a protected area in accordance with an embodiment of the invention.

FIG. 21 shows an example application of using this system for collision avoidance. Referring now to FIG. 21, a vehicle 2100 is illustrated disposed and moving on a path 2105 relative to different beacons 2110 that are placed near a protected area 2115 in accordance with an embodiment of the invention. The protected area 2115 in the middle is quarantined and designated as a non-entry area for industrial vehicles, such as vehicle 2100. The model predictive controller (MPC) 2015$b$ and vehicle actuation system 2015$c$ are control movement and direction of the industrial vehicle 2100. These systems model the vehicle dynamics and system kinematics, and internally maintain a virtual barrier 107 around detected objects. The MPC is a processing based system that, when programmed and executing it's programming, is a model-based approach incorporating predictive control methodology to approximate optimal system control. Control solutions are determined through the evaluation of a utility function comparing computations of a branching network of future outcomes based on observations of the present environment. The implemented MPC program code (implementing such algorithmic steps and as running on the MPC hardware (such as that described with controller 410 in FIG. 4)) predicts collision paths for the vehicle system with detected objects, such as passive beacons. Vehicle speed control solutions are computed by the MPC system for successive future time steps up to the prediction horizon. A utility function determines optimal control solutions from an array of possible future control solutions. Optimal control solutions are defined in this application as solutions which, through operation of the vehicle actuation system and vehicle actuators, allow for operation of the vehicle at a maximum possible speed defined as the speed limit which ensures the vehicle is operating within the control limitations of brake actuation subsystem such that a breach of a virtual boundary around detected objects may be prevented. For example, an embodiment of such a collision avoidance system may be the prediction horizon exceeding 5 seconds. At a maximum possible vehicle speed, this horizon is consistent with detection horizon of the sensor network of the embodiment.

Figure 22:
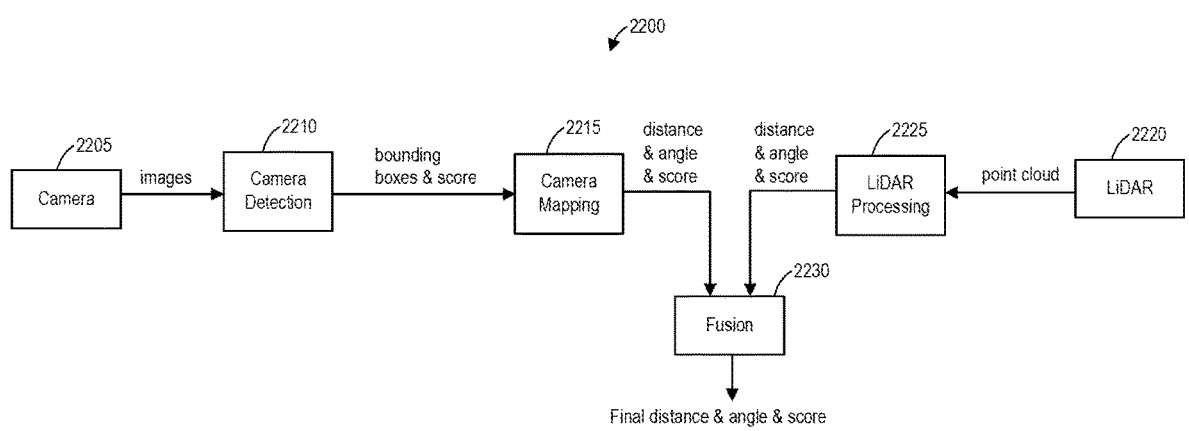
FIG. 22 is an exemplary block diagram for data fusion in accordance with an embodiment of the invention.

FIG. 22 is an exemplary block diagram for data fusion in accordance with an embodiment of the invention. In this illustrated exemplary system 2200, the exemplary flow of data and processing is shown through processing blocks as the different types of data are captured, separately processed, and then fused to determine locations of the reflective beacons. As shown in FIG. 22, images are first captured by camera 2205 (e.g., camera 2005$b$), and data on the captured images is then passed through a camera object detection system 2210 (e.g., as part of sensor processing system 2010). From the processing performed by the camera detection block 2210, the bounding box coordinates of beacons are estimated together with the confidence scores for each bounding box. Next, the detection bounding box from the single camera is mapped through a neural network (NN) (e.g., through camera mapping block 2215 (another part of sensor processing system 2010)) into a distance and angle estimate in order to be able to fuse that information with the distance and angle estimates of the LiDAR processing in the fusion block 2230 (e.g., fusion processing of sensor processing system 2010).

On the other side, point cloud information is generated and provided from the LiDAR 2220 (e.g., LiDAR 2005$a$), then through LiDAR data processing 2225 (e.g., a part of sensor processing system 2010). Estimated distance and angle information of the detected beacons are generated by LiDAR processing block 2225 and provided through to the fusion block 2230. Through the LiDAR processing block 2225, a pseudo-confidence score is also provided to the fusion block 2230. With the LiDAR detection results in the form of distance and angle from both camera and LiDAR, fusion block 2230 fuses them together to obtain a final distance, angle and confidence score for each detection.

In an exemplary embodiment, the maximum speed of the vehicle is about 5 meters per second. In order to have enough reaction time for collision avoidance, the detection frequency needs to be 5 Hz or above. This may be accomplished using, for example, one or more NVIDIA Jetson TX2 computing modules as part of sensor processing system 2010 and use another TX2 for the MPC controller as part of MPC system 2015. To achieve the desired 5 Hz update rate for real-time performance, an embodiment included certain feature to improve software speed enough to meet the requirements. Notably, a less computationally complex method for the removal of ground points from the LiDAR point cloud was used to improve software speed instead of a more computationally complex method that may be more accurate. Furthermore, an embodiment may increase speed by using a linear SVM, with a limited feature set, as opposed to a kernel SVM or other non-linear methods To manage intra-process communication between sensor drivers and signal processing functions, a Robot Operating System (ROS) was used on the TX2 computing module as a flexible framework based operating system with open-source tools, libraries, and conventions for services provided by the operating system. Those skilled in the art will appreciate that ROS provides already-implemented sensor drivers for extracting point cloud and image data from the LiDAR and camera, respectively. Additionally, ROS abstracts and simplifies intra-process data transfer by using virtualized Transmission Control Protocol (TCP) connections between the individual ROS processes, called nodes. As a consequence of this method, multiple excess memory copies are made, which may degrade performance with large objects like LiDAR point clouds. To ameliorate this effect, ROS Nodelets may be used for appropriate LiDAR processes. Those skilled in the art will appreciate that Nodelets builds on ROS Nodes to provide a seamless interface for pooling multiple ROS processes into a single, multi-threaded process. This enables efficient zero-copy data transfers between signal processing steps for the high bandwidth LiDAR computations in an embodiment.

Figure 23:
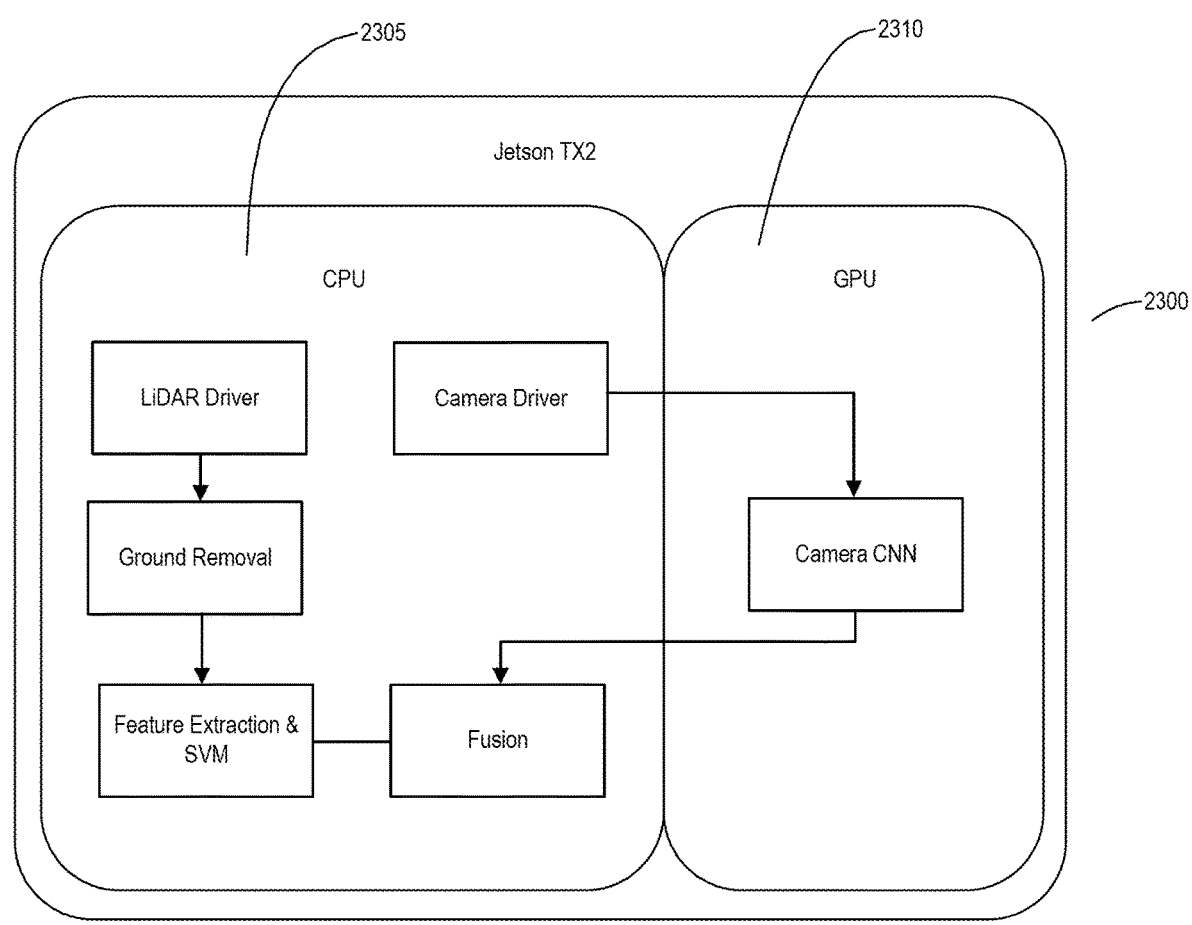
FIG. 23 is an exemplary high level data flow diagram for a processing module used for implementing a signal processing system in accordance with an embodiment of the invention.

In FIG. 23, the high-level flowchart of the relevant ROS nodes can be seen along with their execution location on the Jetson TX2' s hardware 2300. The exemplary NVIDIA Jetson TX2 used in an embodiment has a 256 CUDA core GPU, a Dual CPU, 8 GB of memory and supports various interfaces including Ethernet. As the most computationally intensive operation on the Jetson TX2 module used as part of sensor processing system 2010, an embodiment may allocate or dedicate the entire Graphical Processing Unit (GPU) 2310 to the camera CNN. As such, the sensor drivers, signal processing, and fusion nodes parts of sensory processing system 2010 may be relegated to the CPU 2305. Due to the high core utilization from the LiDAR, an embodiment may need to allocate enough CPU 2305 resources to feed images to the GPU 2310 or undesired throttling of the CNN may occur.

Figure 24:
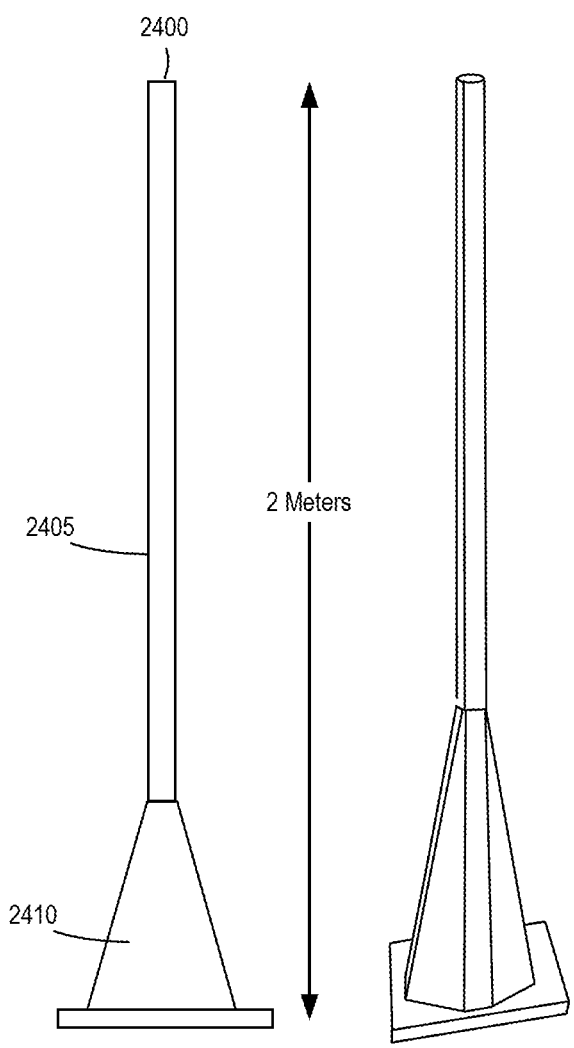
FIG. 24 is an illustration of an exemplary passive beacon in accordance with an embodiment of the invention.

Similar to that shown in FIG. 5, FIG. 24 provides an illustration of an exemplary passive beacon 2400. As shown in FIG. 24, exemplary beacon 2400 may be constructed of a high-visibility 28" orange traffic cone with a 2" diameter highly-reflective pole extending two meters vertically. The beacon 2400 presents as a series of high intensity values in a LiDAR scan, and thus provides a high signal level compared to most background objects. A beacon delineates an area in the industrial complex that is off limits to the vehicle—usually to protect high-valued assets (e.g., area 2115 shown in FIG. 21).

Herein, a deep-learning model called YOLO may be implemented in the camera CNN part of sensor processing system 2010 to detect objects present in the single camera image. Those skilled in the art will appreciate that the YOLO deep-learning methodology outperforms most other deep learning methods in speed, which is important in an embodiment for avoiding collisions. YOLO achieves such speed by combining both region and class prediction into one network, unlike region-based methods that have separate network for region proposals. To train this deep-learning neural network, a large training dataset of beacon images was collected on different days and weather conditions, and was hand-labeled. The collected training dataset covered the camera's full field of view (FOV) (−20 degrees to +20 degrees) and detection range (5 to 40 meters) of the camera (e.g., a FLIR Chameleon3 USB camera with Fujinon 6 mm lens). It reliably represents the detection accuracy from different angles and distances. In an exemplary embodiment, each of the beacons have a consistent construction, with near-identical size, shape, and coloring. These characteristics allow the detection process by the collision avoidance system to reliably recognize beacons at a range, for example, of up to 40 meters under a variety of lighting conditions.

The LiDAR detection mode is designed to detect beacons, but other objects can be in the direct or near-direct path of the industrial vehicle. A front guard system may be implemented with the LiDAR (e.g., LiDAR sensor 2005a) and other sensors (such as cameras). Those skilled in the art will appreciate that LiDAR is good at detecting objects above the ground at a further distances, but the camera is able to provide the system with better detection of smaller objects closer to the tractor (and closer to the ground like chocks). Thus, embodiments of an exemplary front guard system may rely on using data from both the LiDAR and the camera (and fusing or comparing where appropriate) to determine/detect an object for avoidance.

Since many objects lack any bright points (thus being missed by the LiDAR beacon detection), an embodiment may use an exemplary front-guard system that clusters points in a rectangular area above the ground directly in front of the industrial vehicle based upon data from both the LiDAR and the camera to detect an object for avoidance purposes. The front guard may then be used to keep the vehicle from striking obstacles or people. After ground point removal, any remaining points within a rectangular solid region directly in front of the vehicle will be detected and reported to the control system.

Figure 25:
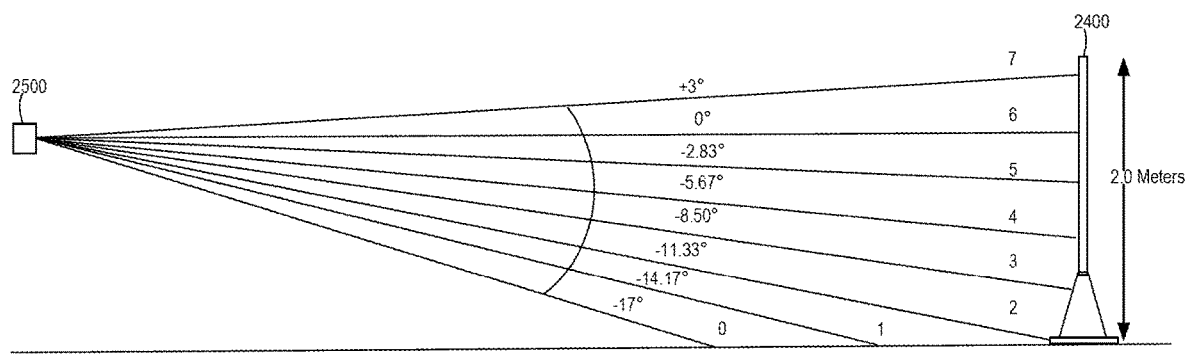
FIG. 25 is a diagram of exemplary LiDAR beams from a LiDAR sensor relative to an exemplary passive beacon disposed in front of the LiDAR sensor in accordance with an embodiment of the invention.
Figure 26:
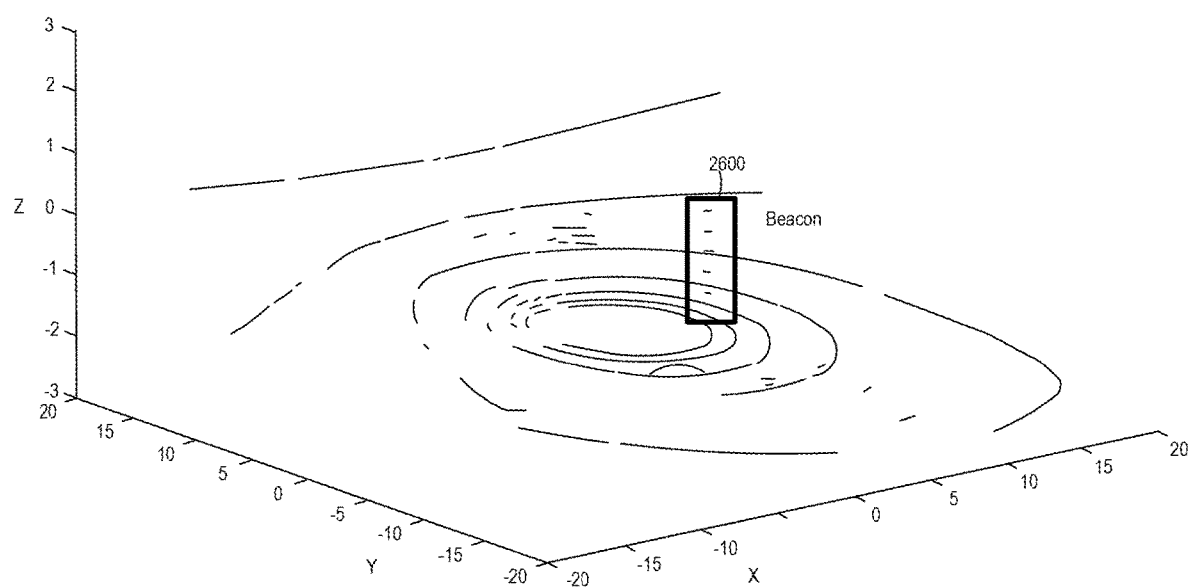
FIG. 26 is an illustration of an exemplary scan of LiDAR point cloud in accordance with an embodiment of the invention.

In more detail, the LiDAR data in an embodiment collects may be in the form of a three-dimensional (3D) and 360 degree field-of-view (FOV) point cloud, which consists of x, y, z coordinates, along with intensity and beam number (sometimes called ring number). The coordinates x, y, and z represent the position of each point relative to the origin centered within the LiDAR. Intensity represents the strength of returns and is an integer for this model of LiDAR. Highly reflective objects such as metal or retro-reflective tape will have higher intensity values. The beam number represents which beam the returned point is located. The LiDAR we use transmits eight beams. The beam numbers are shown in FIG. 25 as emanating from a source 2500 (e.g., LiDAR sensor 2005a) and exposed to, for example, an exemplary passive beacon 2400 in front of the source 2500. Assuming the LiDAR is mounted level to the ground, then beam 7 as shown in FIG. 25 is the top beam, and is aimed upward approximately 3 degrees. Beam 6 points horizontally. The beams are spaced approximately 3 degrees apart. FIG. 26 shows an exemplary scan of LiDAR point cloud. In this figure, the ground points are shown with black points. The beacon 2400 presents as a series of closely-spaced points in the horizontal direction, as shown in the square 2600.

In general, general object detection in LiDAR is a difficult and unsolved problem in the computer vision field. Objects appear at different scales based on their distance to the LiDAR sensor itself, and they can be viewed from any angle. However, the embodiments described herein are really only interested in detecting the beacons, which all have similar characteristics (e.g., the same geometries). In an embodiment, the industrial vehicle may only go so fast, so that the embodiment only need to detect beacons about 20 meters away or closer. Furthermore, exemplary beacons may be designed to have very bright returns. However, other objects can also have bright returns in the scene, such as people wearing safety vests with retro-reflective tape, or other industrial vehicles. As such, an embodiment may include a system that first identifies clusters of points in the scene that present with bright returns. Next, a linear SVM classifier is used to differentiate the beacon clusters from non-beacon clusters. The LiDAR detection system works by utilizing intensity-based and density-based clustering (a modified DBSCAN algorithm) on the LiDAR point cloud. The system then examines all points near the cluster centroid by extracting features and using a linear SVM to discriminate beacons from non-beacons. Further details of these are discussed below.

A modified DBSCAN clustering algorithm, which clusters based on point cloud density as well as intensity, may be used to cluster the bright points, as shown in algorithmic example 1 below. The cluster parameter e was empirically determined to be 0.5 m based on the size of the beacon. Values much larger could group two nearby beacons (or a beacon and another nearby object) together into one cluster, and we wanted to keep them as separate clusters. In Equation 1 below, the distances are estimated using Euclidean distances with only the x (front-to-back) and y (left-to-right) coordinates. Effectively, this algorithmic example clusters bright LiDAR points by projecting them down onto the x-y plane. Alternately, all three coordinates, x, y, z could be used, but the features don't require this because they will be able to separate tall and short objects. This approach is also more computationally efficient than using all three coordinates in the clustering algorithm.

Algorithmic Example 1: LiDAR Bright Pixel Clustering

---

Input: LiDAR point cloud P = {$x_j$, $y_j$, $z_j$, $i_j$, $r_j$} with NP points.
Input: High-intensity threshold: $T_H$.
Input: Cluster distance threshold: e (meters).
Input: Ground Z threshold: $T_G$ (meters).
Output: Cluster number for each bright point in the point cloud.
Remove non-return points:
for each point in the point cloud do
    Remove all non-return points (NaN's) from the the point cloud.
Remove ground points:
for each point in the modified point cloud do
    Remove all points with Z-values below TG from the point cloud.
Remove non-bright points:
for each point in the modified point cloud do
    Remove all points with intensity values below TH from the point cloud.
Cluster bright points:
Assign all points to cluster 0.
Set cl ← 0.
for each point Pj in the modified point cloud do
    if The point does not belong to a cluster then
        Add point to cluster
        Increment the number of clusters: cl ← cl + 1.
        Assign $P_j$ to cluster cl.
        Set the centroid of cluster cl to $P_j$.
        Scan through all remaining points and recluster if necessary.
        for each point $P_m$ with j < m ≤ NP do
            if Dist from point $P_m$ to centroid of cl has distance < ethen
                Add $P_m$ to cluster cl.
                Recalculate centroid of cluster cl.

---

To extract the features, the ground points are removed before feature processing occurs, or else false alarms can occur. Since this industrial application has a smooth, flat area for the ground, an embodiment employs a simple vertical threshold to remove ground points. If this system were to be generalized to areas with more varying ground conditions, ground estimation methods could be utilized. However, for this particular embodiment, this was not necessary.

Figure 27:
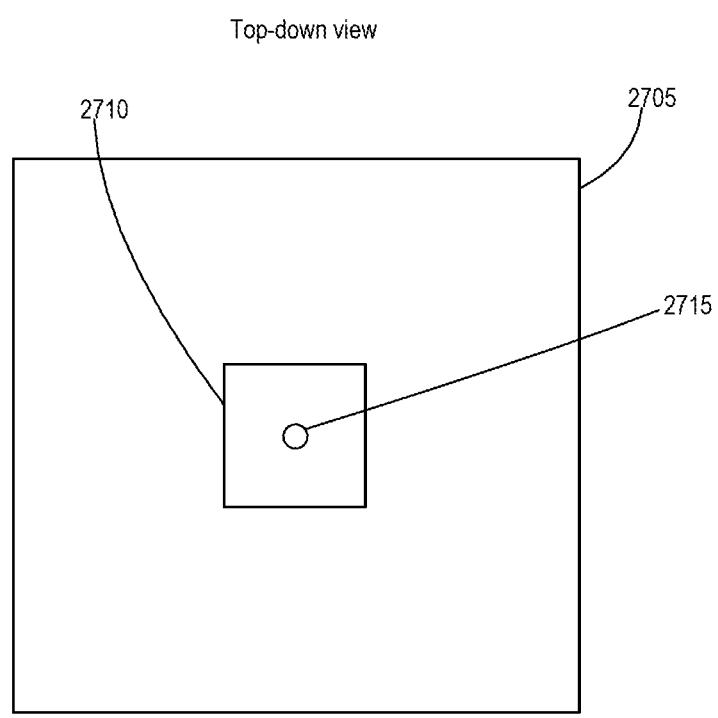
FIG. 27 is an illustration of an exemplary beacon return in accordance with an embodiment of the invention.

Next, the point intensities are compared to an empirically determined threshold. The beacon is designed in this embodiment so that it provides bright returns to the LiDAR via the retro-reflective vertical pole. This works well, but there are also other objects in the scene that can have high returns, such as other industrial vehicles with retro-reflective markings or workers wearing safety vests with retro-reflective stripes. In order to classify objects as beacons and non-beacons, particular features are utilized (such as the height and intensity of the beacons). After ground-removal and thresholding the intensity points, what is left is a set of bright points. A second set of intensity points is also analyzed, which consists of all of the non-ground points (e.g., the point cloud after ground removal). The points in the bright point cloud are clustered. Beacons appear as tall, thin objects, whereas all other objects are either not as tall, or wider. The embodiment extracts features around the cluster center in a small rectangular volume centered at each object's centroid. The embodiment also extracts features using a larger rectangular volume also centered around the objects centroid. Features include counting the number of bright points in each region, determining the x, y, and z extents of the points in each region, etc. Beacons mainly have larger values in the smaller region, while other objects have values in the larger regions. The two regions 2705, 2710 are shown in FIG. 27. The idea of using an inner 2710 and an outer 2705 analysis region is that a beacon will mostly have bright points located in the inner analysis region, while other objects, such as humans, other industrial vehicles, etc., will extend into the outer regions. Equations 1 and 2 below define whether a LiDAR point $p_j$ with coordinates ($x_j$, $y_j$, $z_j$) is in the inner region or outer region, respectively, where the object's centroid has coordinates ($x_c$, $y_c$, $z_c$).

FIG. 27 illustrates an example beacon return 2700 with the analysis windows superimposed. Both the inner 2710 and outer 2705 analysis regions have x and y coordinates centered at the centroid location 2715. The inner analysis region has depth (x coordinate) of 0.5 meters, width (y coordinate) of 0.5 meters, and the height includes all points with z coordinate values of −1.18 meters and above. The outer region extends 2.0 meters in both x and y directions and has the same height restriction as the inner region. These values were determined based on the dimensions of the beacon and based on the LiDAR height. The parameters DxI, DyI and zMIN define the inner region relative to the centroid coordinates. Similarly, the parameters DxO, DyO and zMIN define the outer region relative to the centroid coordinates. A point is in the inner region if $$\left(x_C - \frac{\Delta x_I}{2}\right) \le x_j \le \left(x_C + \frac{\Delta x_I}{2}\right) \text{ and} \quad (1)$$

$$\left(y_C - \frac{\Delta y_I}{2}\right) \le y_j \le \left(y_C + \frac{\Delta y_I}{2}\right) \text{ and}$$

$$z_{MIN} \ge z_j,$$

and a point is in the outer region if $$\left(x_C - \frac{\Delta x_O}{2}\right) \leq x_j \leq \left(x_C + \frac{\Delta x_O}{2}\right) \text{ and} \quad (2)$$

$$\left(y_C - \frac{\Delta y_O}{2}\right) \leq y_j \leq \left(y_C + \frac{\Delta y_O}{2}\right) \text{ and}$$

$$z_{MIN} \geq z_j.$$

In order to be robust, we also extract features on the intensity returns. A linear SVM was trained on a large number of beacon and non-beacon objects, and each feature was sorted based on its ability to distinguish beacons from non-beacons. In general, there is a marked increase in performance then the curve levels out. It was found that ten features were required to achieve very high detection rates and low false alarms. These ten features were utilized in real time, and the system operates in real time at the frame rate of the LiDAR, 5 Hz. The system was validated by first running on another large test set independent of the training set, with excellent performance as a result. Then, extensive field tests were used to further validate the results.

After detection, objects are then classified as beacons or non-beacons. These are appended to two separate lists and reported by their distance in meters from the front of the industrial vehicle, their azimuth angle in degrees, and their discriminate value. Through extensive experimentation, we can reliably see beacons in the LiDAR's FOV from 3 to 20 meters.

LiDAR feature extraction follows the overall algorithm shown below in Algorithmic Example 2. The input is the LiDAR point cloud $P=\{x_j, y_j, z_j, i_j, r_j\}$, where j is the index variable for the j-th point, x, y, z, i and r refer to the x point in meters, the y point in meters, the z point in meters, the intensity and the beam number, respectively, for the j-th point. Note all coordinates are relative to the center of the LiDAR at point (0, 0, 340 0). The x coordinate is positive in front of the LiDAR, and negative behind. The y coordinate is positive to the left of the LiDAR and negative to the right. The z coordinate is positive above the LiDAR and negative below.

In order to extract features for objects, any points that did not provide a return to the LiDAR are removed. These points will present as NaN's (Not a Number) in the LiDAR point cloud. Next, the estimated ground points are removed. The non-ground points are divided into two data subsets: The high-threshold (HT) data and the low-threshold (LT) data. The HT data points only contain high-intensity returns, while the LT data contains points greater than or equal to the low-intensity threshold. Both data subsets do not contain any ground points. The high-intensity threshold was set to 15, and the low-intensity threshold to 0. These threshold values were determined experimentally based on examination of multiple beacon returns at various distance Algorithmic Example 2: LiDAR High-Level Feature Extraction Preprocessing Input: LiDAR point cloud P = $\{x_j, y_j, z_j, i_j, r_j\}$.
Input: Low-intensity threshold: $T_L$.
Input: High-intensity threshold: $T_H$.
Input: Ground Z threshold: $T_G$ (meters).
Output: Feature vector f.

-continued

Remove non-return points:
for each point in the point cloud do
    Remove all non-return points (NaN's) from the point cloud.
Remove ground points:
for each point in the modified point cloud do
    Remove all points with Z-values below $T_G$ from point cloud.
Create threshold point clouds:
Set $P_{HT} = \emptyset$.
Set $P_{LT} = \emptyset$.
for each point Pj in the modified point cloud do
    if Point Pj has intensity _ TH then
        Add Pj to PHT.
    if Point Pj has intensity _ TL then
        Add Pj to PLT.
Extract features:
Extract features f using Algorithmic Example 3 (shown below).

Algorithmic Example 3: LiDAR Feature Extraction

Input: LiDAR high-intensity point cloud PHT = $\{x_j, y_j, z_j, i_j, r_j\}$.
Input: LiDAR low-intensity point cloud PLT = $\{x_j, y_j, z_j, i_j, r_j\}$.
Input: Inner region x-extent: DxI (meters).
Input: Inner region y-extent: DyI (meters).
Input: Outer region x-extent: DxO (meters).
Input: Outer region y-extent: DyO (meters).
Input: LiDAR height above ground: ZL = 1.4 (meters).
Output: Feature vector f.
Cluster the high-intensity point cloud:
for each point in p in the high-intensity point cloud do
    Cluster points and determine cluster centers.
Calculate features:
for each cluster center point c = (xC, yC, zC) in the point cloud do
    Determine all points in PHT in the inner region using Equation 1
    and calculate feature 1 from Table 1.
    Determine all points in PHT in the outer region using Equation 2
    and calculate feature 4 from Table 1.
    Determine all points in PLT in the inner region using Equation 1
    and calculate features 6,7,9 and 10 from Table 1.
    Determine all points in PLT in the outer region using Equation 2
    and calculate features 2,3,5 and 8 from Table 1.
Return f = [ f1, f2, f3, ____, f20].

FIG. 28 is a table 2800 (referenced above as Table 1) describing the extracted features. For example, feature 1 is generated from the high threshold data, which consists solely of high-intensity points. In the column labeled "Data Subsets", the terms HT=High threshold data, and LT=Low threshold data. The data is analyzed only for high-intensity points in the inner analysis region. This feature simply computes the Z (height) extent, that is, the maximum Z value minus the minimum Z value. Note that some of the features are only processed on certain beams, such as feature 2. The features are listed in order of their discriminate power in descending order, e.g., feature 1 is the most discriminate, feature 2 the next most discriminate, etc.

Figure 30:
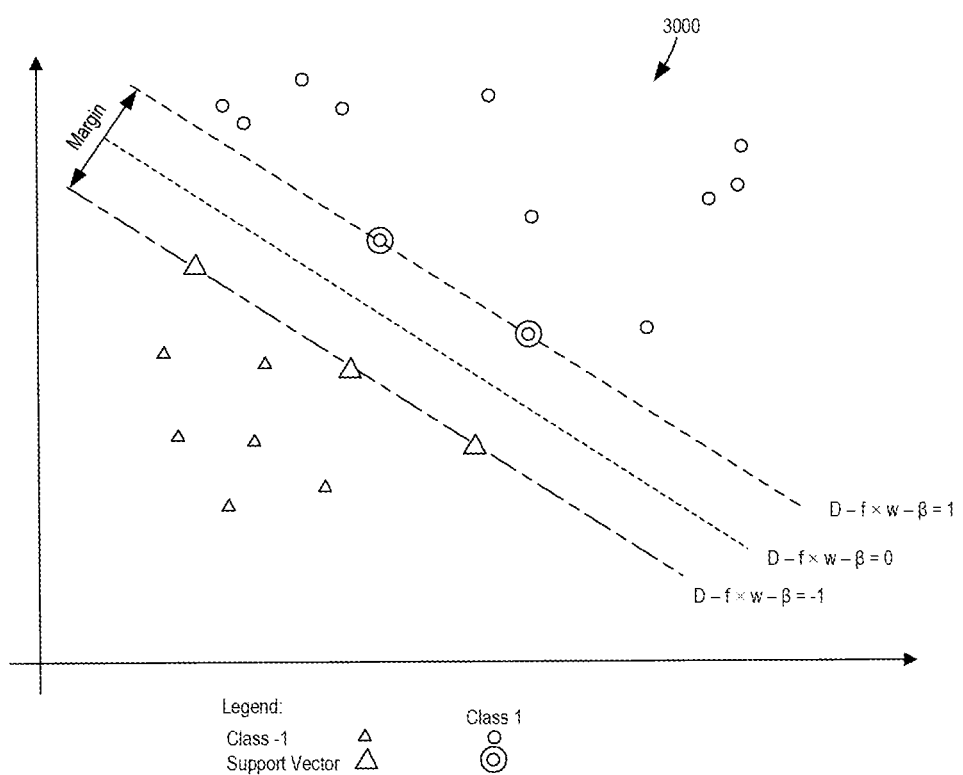
FIG. 30 is a two-dimensional SVM example graph in accordance with an embodiment of the invention.

To detect the beacons in the 3D LiDAR point cloud, an embodiment may use a linear SVM, which makes a decision based on a learned linear discriminant rule operating on the hand-crafted features developed for differentiating beacons. In this embodiment, liblinear was used to train the SVM. Those skilled in the art will appreciate that a linear SVM operates by finding the optimal linear combination of features that best separates the training data. If the M testing features for a testing instance are given by $f=[f_1, f_2, \_\_\_\_, f_M]^T$, where the superscript T is a vector transpose operator, then the SVM evaluates the discriminant $$D = f \cdot w + b, \quad (3)$$

where w is the SVM weight vector and b is the SVM bias term. In this embodiment, M was chosen to be 20. Equation 3 (above) applies a linear weight to each feature and adds a bias term. The discriminant is optimized during SVM training. The SVM optimizes the individual weights in the weight vector to maximize the margin and provide the best overall discriminant capability of the SVM. The bias term lets the optimal separating hyperplane drift from the origin. FIG. 30 shows an example case with two features (and where the margin shown in FIG. 30 is the distance from the D=−1 to D=1 hyperplanes). In this case, the D=0 hyperplane is the decision boundary. The D=+1 and D=−1 hyperplanes are determined by the support vectors. The SVM only uses the support vectors to define the optimal boundary. The SVM was trained with beacon and non-beacon data extracted over multiple data collections. There were 13,190 beacon training instances and 15,209 non-beacon training instances. The test data had 12,084 beacons and 5,666 non-beacon instances.

In this embodiment, M=20 features were chosen. Each feature is first normalized by subtracting the mean of the feature values from the training data and dividing each feature by four times the standard deviation plus $10^{-5}$ (in order to prevent division by very small numbers). Subtracting the mean value centers the feature probability distribution function (PDF) around zero. Dividing by four times the standard deviation 383 maps almost all feature values into the range [−1, 1], because most of the values lie within ±σ$_k$. The normalized features are calculated using $$f'_k = \frac{f_k - \mu_k}{4\sigma_k + 10^{-5}} \quad (4)$$

where $\mu_k$ is the mean value of feature k and $\sigma_k$ is the standard deviation of feature k for k=1, 2, . . . , M. The mean and standard deviation are estimated from the training data and then applied to the test data. The final discriminant is computed using Equation 3 above where the feature vector is the normalized feature vector.

Figure 29:
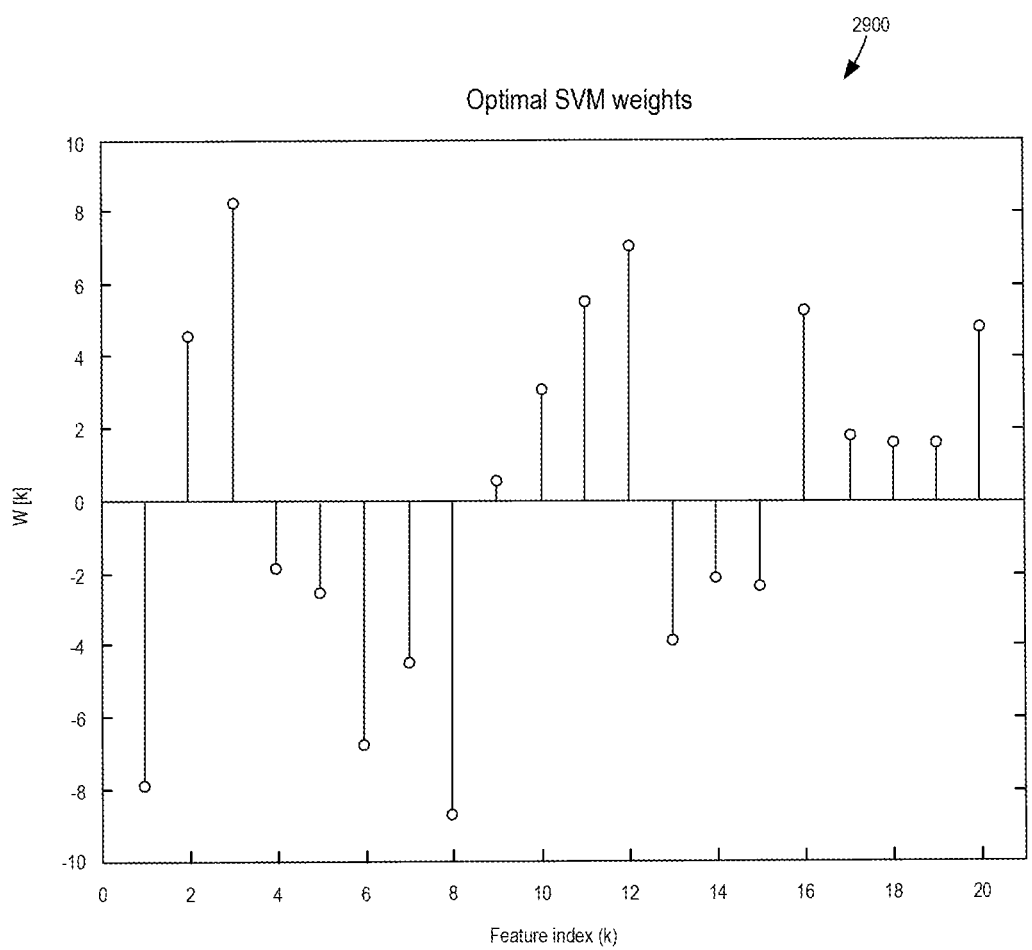
FIG. 29 is graph illustrating optimal feature weights chosen by an SVM training optimizer in accordance with an embodiment of the invention.

The optimal feature weighs for this exemplary embodiment are shown in FIG. 29. Since all the features are normalized, features 1, 3, and 8 have the most influence on the final discriminant function.

If the discriminant D≤0, then the object is declared a beacon. Otherwise it is declared a non-beacon (and ignored by the LiDAR beacon detection system). Once the SVM is trained, implementing the discriminant given in Equation 3 uses minimal processing time.

Figure 31:
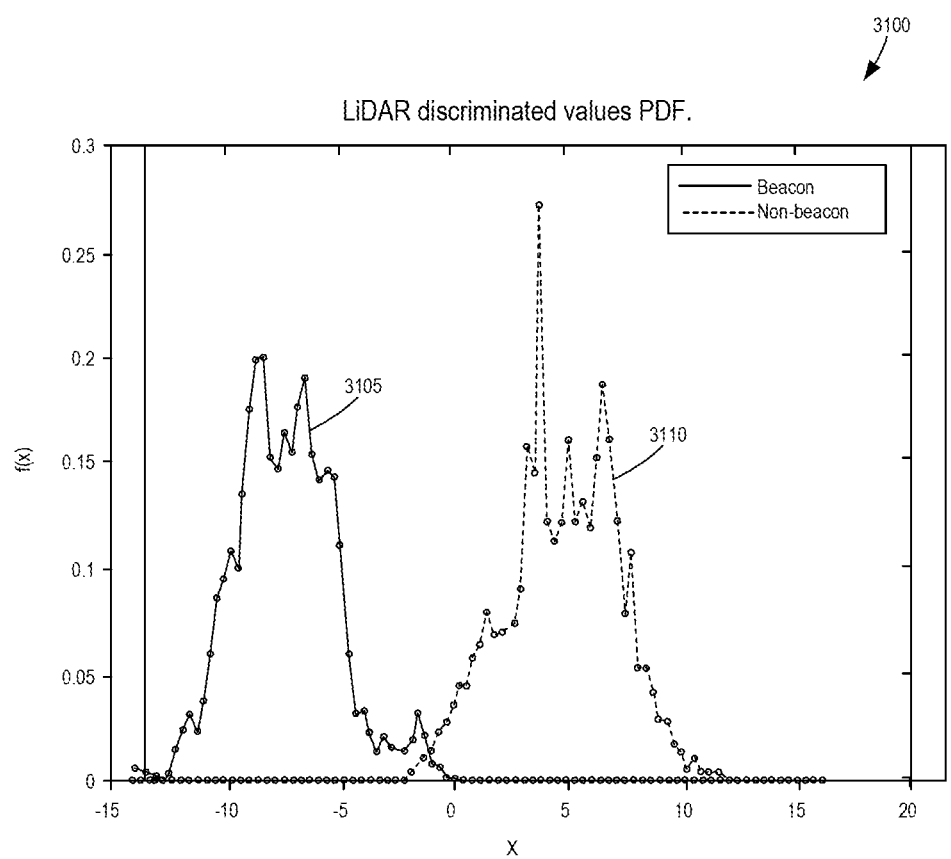
FIG. 31 is a graph illustrating an exemplary probability distribution function (PDF) of the LiDAR discriminant values for beacons and non-beacons in accordance with an embodiment of the invention.

FIG. 31 shows the probability distribution function (PDF) of the LiDAR discriminant values for beacons 3105 and non-beacons 3110, respectively. The PDFs are nearly linearly separable. The more negative the discriminant values, the more the object is beacon-like.

Figure 32:
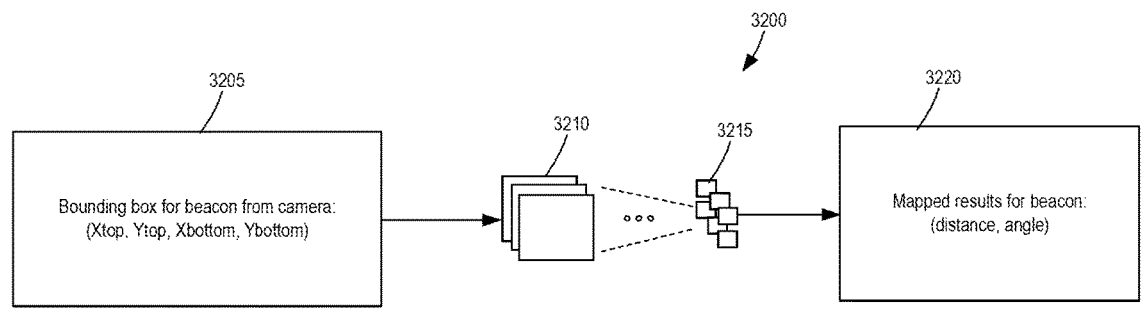
FIG. 32 is a diagram for data flow from a bounding box from the camera that is projected into a range/distance and angle estimate in the LiDAR's coordinate frame in accordance with an embodiment of the invention.

The LiDAR (e.g., LiDAR sensor 2005a) and the camera (e.g., camera sensor 2005b) both provide information on object detection, although in entirely different coordinate spaces. As generally explained with reference to FIG. 22, the LiDAR provides accurate angle and range estimates with the discriminant value offering a rough metric of confidence. The camera processing algorithms return bounding box coordinates, class labels, and confidence values in the range [0, 1]. However, effective fusion in an embodiment uses a common coordinate space. Therefore, a mapping function is deployed in an embodiment to merge these disparate sensor measurements into a shared coordinate space. To build this mapping function, an embodiment may mount the camera and LiDAR to the industrial vehicle and the LiDAR's accurate position measurements, alongside the camera's bounding boxes, were used to collect training data. This data was then used to train a neural network. The end result was a neural network (NN) that could project the camera's bounding boxes into a range and angle estimate in the LiDAR's coordinate frame, as seen in FIG. 32. In this figure, the middle portion 3210 simply represents the bounding boxes 3205 from the camera system and the smaller boxes 3215 before the mapped results 3220 represents an exemplary NN mapper in an embodiment that processes the camera-based information and maps it into the LiDAR coordinate space of distance and angle information.

Figure 33:
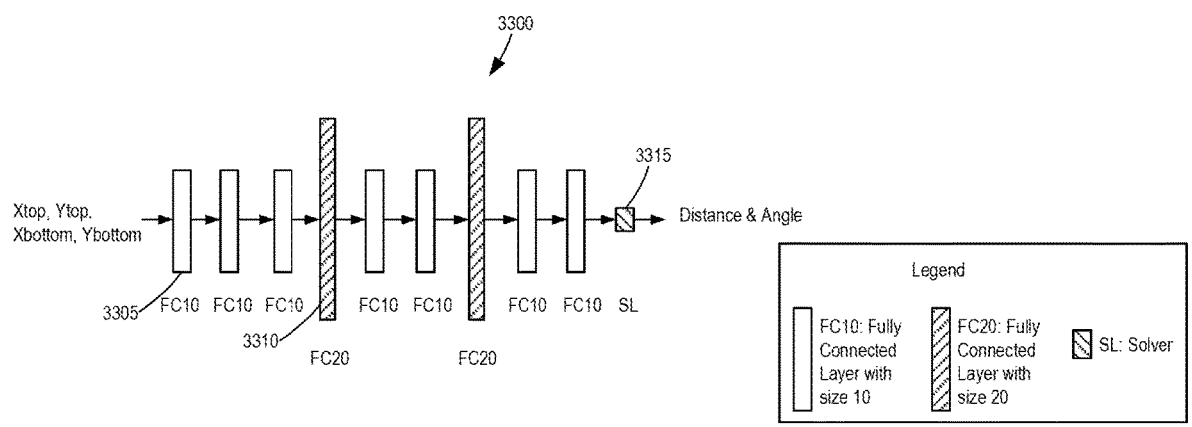
FIG. 33 is a more detailed diagram for data flow from a bounding box from the camera that is projected into a range/distance and angle estimate in the LiDAR's coordinate frame using an exemplary neural network structure for mapping such information in accordance with an embodiment of the invention.

FIG. 33 is a more detailed diagram for data flow from a bounding box from the camera that is projected into a range/distance and angle estimate in the LiDAR's coordinate frame using an exemplary neural network structure for mapping such information in accordance with an embodiment of the invention. The detailed NN structure is shown in FIG. 33 as ten fully connected layers: eight layers of ten neurons 3305 and two layers of twenty neurons 3310 and a solver 3315. Those skilled in the art will appreciate that the exemplary network 3300 in FIG. 33 may be implemented with a convolutional neural network having, for example, multiple fully connected layers 3305 and 3310 to provide results while still maintaining a relatively small network 3300. In more detail, the fully connected layers 3305 in exemplary network 3300 may have ten input weights and an input bias term. Similarly, the fully connected layers 3310 in exemplary network 3300 may have twenty input weights and an input bias term. The weights may be adjusted using a back-propagation optimization procedure until the network 3300 can accurately approximate distance and angle based on the inputs $x_{top}$, $y_{top}$, $x_{bottom}$ and $y_{bottom}$. The solver layer 3315 then takes the final outputs from the last fully connected ten-neuron layer 3305 and adjusts the outputs to their final form: distance is in meters and angle in degrees. An embodiment may be implemented with this structure for its simplicity to compute while outperforming other linear and non-linear regression methods.

With the camera bounding boxes mapped to LiDAR range angle, there still remains the mapping of the discriminate value from LiDAR and confidence scores from camera into a shared space. For this, the [0, 1] range of the camera confidence offers a more intuitive measure than the LiDAR's [−∞, ∞] range for the discriminate value. Thus, the mapping function for this component will map the LiDAR discriminate to a [0, 1] space for fusion with the camera. To do this, a logistic sigmoid was used in an embodiment using the following form $$f(x) = \frac{1}{1 + \varepsilon^{-a \times x}} \quad (5)$$

The discriminate value is multiplied by a gain term, a. The end result is a function that maps the discriminate value to a pseudo-confidence score with a range similar enough to the camera's confidence score for effective fusion.

Further details on such fusion and hyperparameter optimization in an embodiment are explained below. With the fusion algorithmic process described above with the two mapping components, a full pipeline can now be established to combine the LiDAR and camera data into forms similar enough for effective fusion in an embodiment. Using distance and angle information from both camera and LiDAR, an embodiment can correlate LiDAR and camera detections together. Their confidence scores can then be fused as shown in Algorithmic Example 4 described below:

Algorithmic Example 4: Fusion of LiDAR and Camera Detection

```
Input: Detection from LiDAR in the form of [distance, angle,
pseudo-confidence score].
Input: Detection from camera in the form of [distance, angle,
confidence score].
Input: Angular Threshold: A for angle difference between fused camera
and LiDAR detection.
Input: Confidence Threshold: C for final detection confidence score
threshold.
Output: Fused detection in the form of [distance, angle, detection
confidence].
for each detection from camera do
    if a corresponding LiDAR detection, with angle difference less
    than A, exists then
        Fuse by using the distance and angle from LiDAR, and
        combine confidence scores using Fuzzy logic to determine
        the fused detection confidence.
    else
        Create a new detection from camera, using the distance,
        angle, and confidence score from camera as the final
        detection result.
for each LiDAR detection that does not have a corresponding camera
detection do
    Create a new detection from LiDAR, using the distance, angle, and
    confidence score from LiDAR as the final detection result.
for each fused detection do
    Remove detections with final confidences below the C confidence
    threshold.
Return fused detection results.
```

Figure 34:
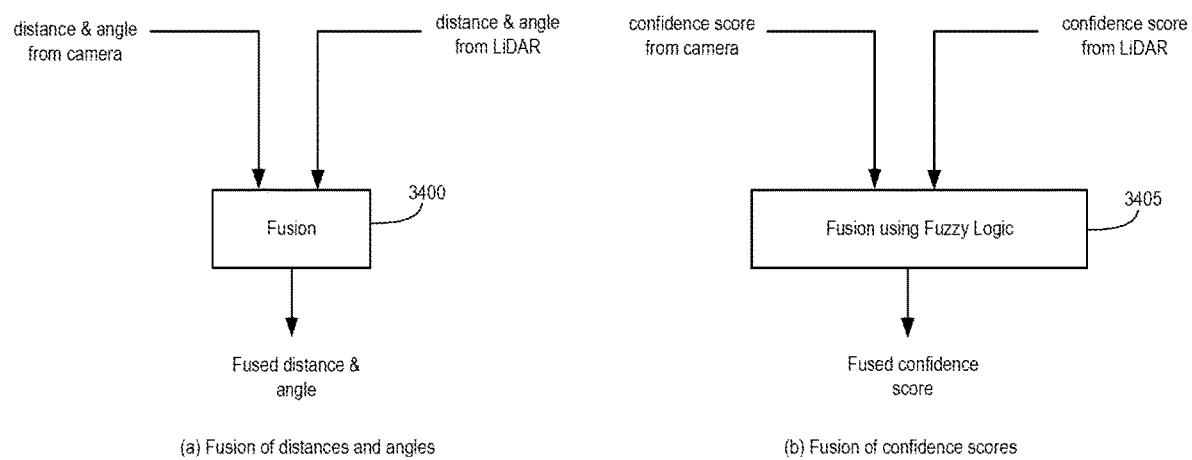
FIG. 34, with parts (a) and (b), illustrates diagrams of two different exemplary data flows and fusion process blocks in accordance with an embodiment of the invention.

In this exemplary embodiment, the strategy for fusion of the distance and angle estimates is different from the fusion of confidence scores, which is shown in the data flow diagrams of FIG. 34. In the process of distance and angle fusion 3400, for each camera detection, when there is a corresponding detection from LiDAR, an embodiment may use the distance and angle information from LiDAR, as LiDAR can provide much more accurate position estimation. When there is no corresponding LiDAR detection, an embodiment may use the distance, angle and confidence score from camera to create a new detection. For each detection from LiDAR that does not have corresponding camera detection, an embodiment may use the distance, angle and confidence score from LiDAR as final result. For confidence score fusion 3405 (as shown in part (b) of FIG. 34), an embodiment may use fuzzy logic to produce a final confidence score when there is corresponding camera and LiDAR detection. In an embodiment, the exemplary fuzzy rules used in such a fuzzy logic system for data fusion are as follows:
1. If the LiDAR confidence score is high, then the probability for detection is high.
2. If the camera confidence score is high, then the probability for detection is high.
3. If the LiDAR confidence score is medium, then the probability for detection is medium.
4. If the LiDAR confidence score is low and the camera confidence score is medium, then the probability for detection is medium.
5. If the LiDAR confidence score is low and the camera confidence score is low, then the probability for detection is low.

Figure 35:
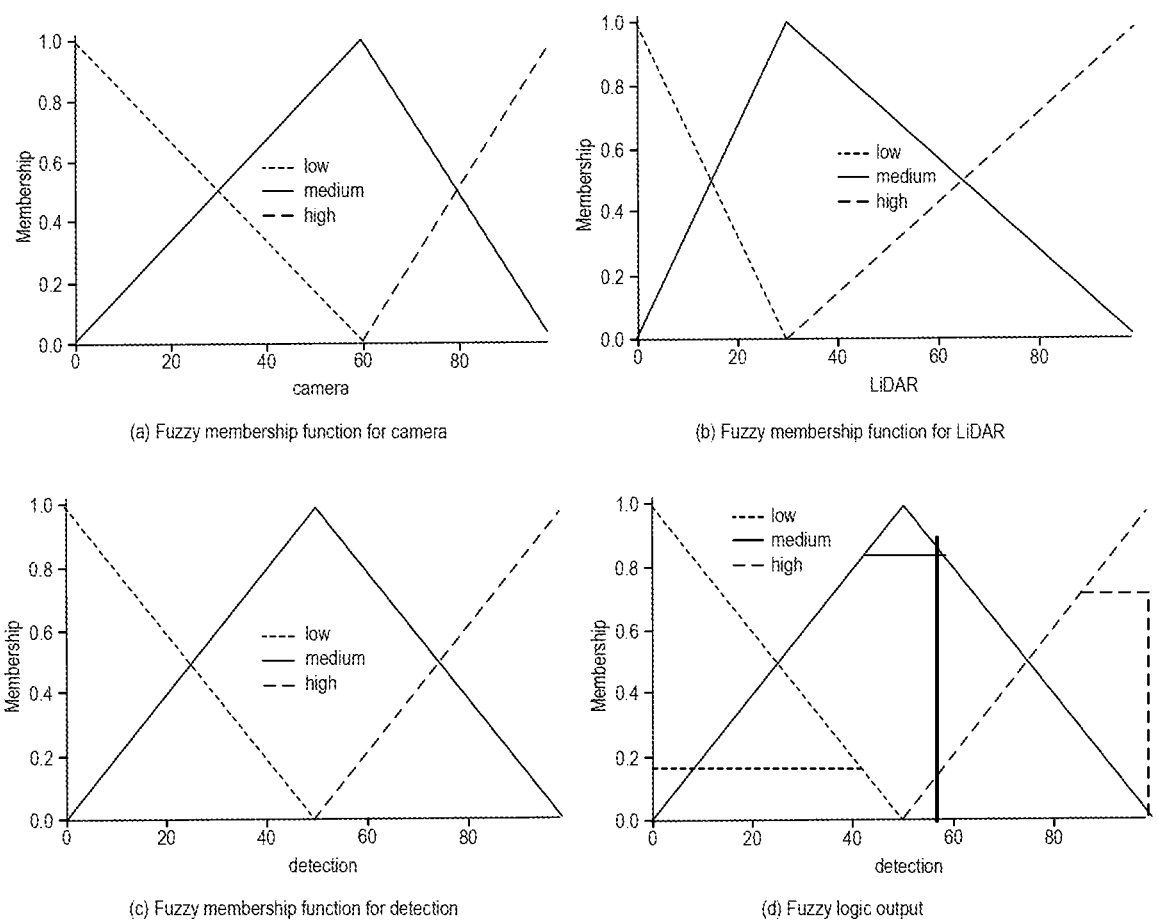
FIG. 35, with parts (a)-(d), illustrates various different exemplary fuzzy membership functions and graphical representations of fuzzy logic output when performing data fusion using fuzzy logic in accordance with an embodiment of the invention.

In this embodiment, the exemplary fuzzy rules are chosen in this way because of the following reasons: First, if either the LiDAR or the camera shows a high confidence in their detection, then the detections are very likely to be true. This is the reason for Rules 1 and 2. Second, the LiDAR is robust at detection up to about 20 meters. Within that range, the confidence score from the LiDAR is usually high or medium. Beyond that range, the value will drop to low. This is the reason for Rule 3. Third, beyond the 20 meters detection range, the system will solely rely on the camera for detection. This is the reason for Rules 4 and 5. FIG. 35 shows the process of using fuzzy logic to combine the confidence scores from camera and LiDAR. The camera input, LiDAR input and detection output is fuzzified into fuzzy membership functions as shown in FIGS. 35(a), 35(b), and 35(c). The output is shown in FIG. 35(d). In this example, when confidence score from the LiDAR is 80 and the score from the camera is 20, by applying the five pre-defined fuzzy rules, the output detection score is around 56 (as shown in FIG. 35(d)).

Figure 36:
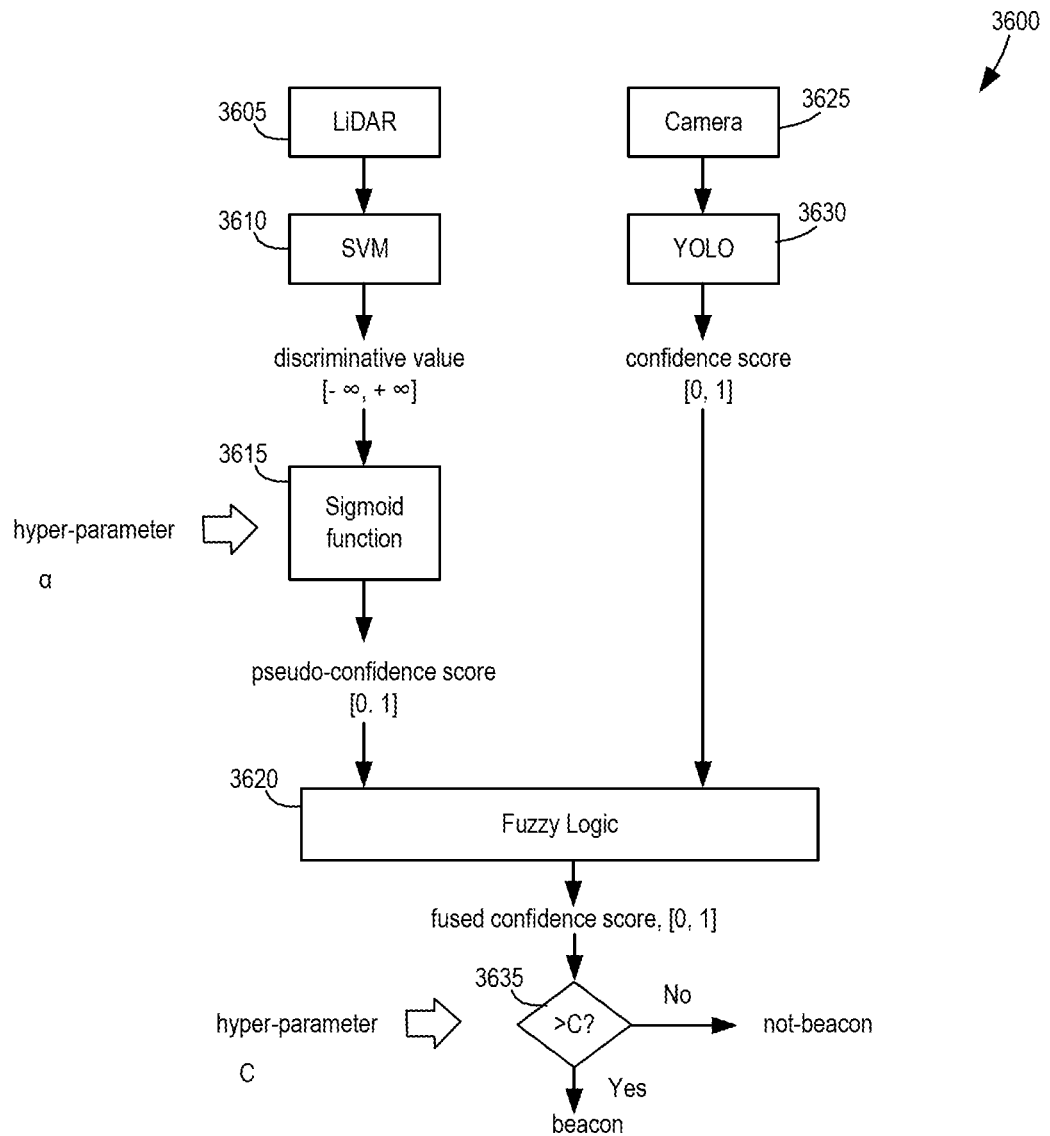
FIG. 36 is a diagram for data flow and processing of LiDAR and camera information using different processing techniques and with fusion of confidence scores using hyperparameters in accordance with an embodiment of the invention.

Those skilled in the art will appreciate that in machine learning, the value of a hyperparameter is set before the learning process. In Equation 5, a controls the LiDAR sigmoid-like squashing function, and is one of the hyperparameters to be decided. In Algorithmic Example 4 shown above, there is another hyperparameter threshold C for the final detection. FIG. 36 is a diagram for data flow and processing of LiDAR and camera information using different processing techniques and with fusion of confidence scores using hyperparameters in accordance with an embodiment of the invention. Referring now to FIG. 36, the exemplary data flow 3600 shows where these two hyperparameters may be used as part of the exemplary fusion process. In an example with reference to FIG. 36, exemplary LiDAR 3605 may provide point cloud (x, y, z coordinates) and intensity data for each return point. Candidate objects may then be identified, and for each object, the SVM 3610 then determines a discriminant value (e.g., as explained above relative to LiDAR point closes and discriminants evaluated and optimized). The hyperparameter a controls the shape of the sigmoid function 3615, which converts the SVM discriminant value in the range $(-\infty,\infty)$ into a pseudo-confidence score in the range [0,1]. The reason to do this conversion is that the camera 3625 and YOLO detector 3630 also outputs a bounding box, class label (e.g., beacon, non-beacon, etc.), and a confidence score in the range [0,1] for all detected objects. Having confidence estimates from the two sensors in the same range allows a fuzzy logic system 3620 to fuse these two scores, similar to that described above and with reference to FIG. 35. Finally, the fused confidence scores are compared to a threshold hyperparameter C at decision point 3635 in FIG. 36. The hyperparameters a and C may be determined by performing a grid search on the parameters. For optimization of hyperparameters, those skilled in the art will appreciate that commonly used approaches may include marginal likelihood, grid search, and evolutionary optimization.

In an exemplary embodiment explained below, the embodiment utilized grid search. In grid search, the two hyperparameters are investigated by selecting candidate values for each, then generating a 2D matrix of their cross product. As we have two hyperparameters a and C to be tuned, those skilled in the art will appreciate that the embodiment uses the Kolmogorov-Smirnov Test, also known as KS-Test, to determine which hyperparameter values to choose. As such, the effects of various parameter combinations using a 2D matrix of the true positive rate (TPR), the false positive rate (FPR), and the Kolmogorov-Smirnov test result were examined in an embodiment where the KS-Test is used to find the α and C that maximize the value of TPR minus FPR. To maximize TPR and minimize FPR, the purpose of the KS-test is to find the balance between the two metrics.

In this exemplary embodiment, the values chosen for α are 1/100, 1/500, 1/1,000, 1/5,000, 1/10,000, 1/50,000, 1/100,000, 1/500,000, and 1/1,000,000, while the values for C are 0.5, 0.55, 0.6, 0.65, 0.7, 0.75, 0.8, 0.85, 0.9, and 0.95. To balance between TPR and FPR, the KS-test results indicate that the embodiment should have hyperparameter α to be 1/500,000 and hyperparameter C to be 0.65 as optimal values. Thus, in an example and based on the results for determining such hyperparameters in this embodiment, α=1/500,000 and C=0.65 were chosen to be the optimal values and the overall fusion results advantageously produce better results than utilizing only the camera 3625 or only the LiDAR 3605.

In an exemplary embodiment used for various experiments, the LiDAR was implemented as a Quanergy M8-1 LiDAR. It has eight beams with a vertical spacing of approximately 3 degrees. The camera images are collected by a FLIR Chameleon3 USB camera with Fujinon 6 mm lens. To collect data and test the exemplary system embodiment in a relevant environment, an open outdoor space was used having an office building and a large, relatively flat concrete area adjacent to the building; a few parked cars; a trailer; and a couple of gas storage tanks, etc.

Twenty extensive data collections were conducted as part of the tests. These tests were designed to collect training data for an exemplary system embodiment and testing data to check the system's performance and to tune the system parameters. Many tests consisted of beacons placed in a random position in the sensors' FOV. Other tests had beacons in known locations in order to assess the LiDAR and camera accuracies for estimating the range and distance. Later tests used the LiDAR as the "ground truth", since it is highly accurate at estimating range and distance.

Most of the initial tests had the industrial vehicle being stationary. Later, tests were performed with the industrial vehicle moving. For the initial tests where beacon locations were known, the ground was marked with different distances and angles. The ground point straight below the LiDAR is used as the 0 meter distance and 0 degree angle is directly in front of the industrial vehicle. From there, the distance from 3 meters at each meter interval up to 40 meters across the 0 degree angle line was marked. The 0 degree angle is directly in front of the industrial vehicle. We also marked the −20 degree, −15 degree, −10 degree, −5 degree, 0 degree, 5 degree, 10 degree, 15 degree and 20 degree lines for beacon location. In this way, the tests constructed a dataset of beacons with labeled ground truths. For static beacon testing, the beacon was placed in both known and unknown locations and recorded data.

For the stationary vehicle testing, several tests evaluated different parts of the system embodiment. For instance, a beacon was placed on a very short wooden dolly attached to a long cord. This allowed the beacon to be moved while the people moving it were not in the sensors' fields of view. This allowed the beacon to be placed at a known distance along the 0 degree angle line and drug toward the vehicle to collect data at continuous locations. We also did similar tests along the −40 degree, −20 degree, −10 degree, 10 degree, 20 degree and 40 degree angle lines. Finally, we collected data where the beacon was drug from the −40 degree angle to all the way across the 40 degree angle at roughly fixed distances. These data collections provided a large amount of data to use in training and testing an exemplary system embodiment for avoiding collisions.

Exemplary data collections were also performed with humans. The retro-reflective stripes on the vests present bright returns to the LiDAR, which may cause false positives. To measure these effects, different people wore a highly reflective vest and stood in front of the system's LiDAR and cameras in a known location. Data was gathered with the person in multiple orientations facing toward and away from the camera. This test was also performed without the reflective safety vests. Other tests had people walking around in random directions inside the sensors' FOV. The data collected here was part of the non-beacon data used to train the SVM.

In order to examine interference when people and beacons were also in the scene, people wore a vest standing close to the beacon in known locations. Data was then recorded, which helped the system to distinguish the beacon and people even if in close contact. Furthermore, tests of an exemplary system embodiment were performed with some dynamic cases of beacons and people in close proximity. To gather this data, the beacon was pulled around using the rope and dolly while a second person moved around the beacon. There were also a series of data collections with the vehicle driving straight at or just past a beacon or another object, to test that the sensor system was stable under operating conditions. The vehicle was driven at a constant speed, accelerating and braking (to make the vehicle rock), and in a serpentine manner. Finally, data collections were performed with the vehicle driving around with different obstacles and beacons present. This was mainly to support system integration and tune the MPC controller and actuators. All of these collections provided a rich dataset for system analysis, tuning, and performance evaluation of such an exemplary embodiment.

Related to camera detection training, exemplary training images for YOLO also included images taken by a Nikon D7000 camera and images from PASCAL VOC dataset. In one example, the total number of training images was around 25,000. In this example, the network structure of YOLO is basically the same as the default setting. One difference is the number of filters in the last layer. This number is related to the number of object categories we are trying to detect and the number of base bounding boxes for each of the grid sections that YOLO divides the image into. For example, if an embodiment divides each image into 13 by 13 grids, then for each grid, YOLO predicts 5 bounding boxes, and for each bounding box, there are 5+N parameters (N represents the number of categories to be predicted). As a result, the last layer filter size is 13×13×5×(5+N). Another difference is that an embodiment may change the learning rate to $10^{-5}$ to avoid divergence.

Related to LiDAR detection training, exemplary LiDAR data was processed through a series of steps. An embodiment implemented a ground clutter removal algorithm to keep ground points from giving us false alarms, to avoid high reflections from reflective paints on the ground, and to reduce the size of our point cloud. Clusters of points are grouped into distinct objects and are classified using a SVM. The SVM in this embodiment may be trained using a large set of data which has beacons and non-beacon objects. The exemplary LiDAR data was divided into two disjoint sets: training and testing. In the training dataset, there were 13,190 beacons and 15,209 non-beacons. The testing dataset contained 5,666 beacons and 12,084 non-beacons. The confusion matrices for training and testing illustrating the performance of classifying Beacons vs Non-Beacons are shown in Tables 2 (training) and 3 (testing) of FIG. 37. The results show good performance for the training and testing datasets. Both datasets show over 99.7% true positives (beacons) and around 93% true negatives (non-beacons) in the exemplary embodiment of this particular example using the exemplary LiDAR data.

Thus, as explained in the more detailed embodiments above, embodiments may be implemented as a multi-sensor detection system that fuses camera and LiDAR detections for a more accurate and robust beacon detection system. An embodiment of such a system may be designed as a real-time industrial system for collision avoidance. An embodiment that implements this type of data fusion helps to obtain more accurate position and label information for each detection as part of a collision avoidance solution that can be deployed on an industrial mobile vehicle (such as a cargo tractor). This type of data fusion, as part of an embodiment, may also help to create detection beyond the conventional range of LiDAR while within the range of camera.

In summary, it should be emphasized that the sequence of operations to perform any of the methods and variations of the methods described in the embodiments herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to enhance and improve logistics operations (such as cargo and package loading, transport, and unloading) using an enhanced industrial vehicle (such as a cargo tractor and associated dollies loaded with cargo/packages) that is improved to better avoid collisions with less detected false positives and refined automated feedback systems. As noted above, the exemplary embodiments disclosed herein may be used independently from one another and/or in combination with one another and may have applications to devices and methods not disclosed herein. Further, those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention, as recited in the claims below, is intended to cover modifications and variations.

What is claimed:

1. A method for enhanced collision avoidance by a mobile industrial vehicle of a high value asset based upon multi-sensor data fusion, the high value asset having one or more reflective beacons disposed relative to the high value asset, comprising the steps of:
    (a) detecting, with a LiDAR sensor on the mobile industrial vehicle, one or more of the reflective beacons relative to the mobile industrial vehicle;
    (b) detecting, with a camera sensor on the mobile industrial vehicle, one or more objects relative to the mobile industrial vehicle;
    (c) fusing, by a sensor processing system on the mobile industrial vehicle, the sensor data detected by each of the LiDAR sensor and the camera sensor to identify a relative location of the one or more of the reflective beacons based upon a multi-sensor fused data source using the detected LiDAR sensor data and the detected camera sensor data;
    (d) determining, by a model predictive controller on the mobile industrial vehicle, a plurality of control solutions, wherein each of the control solutions defines a threshold allowable speed for the mobile industrial vehicle at discrete moments based upon an estimated path to a breaching point radially projected from the verified relative location of the one or more of the reflective beacons;
    (e) identifying, by the model predictive controller, one of the control solutions as an optimal solution based upon a performance cost function, wherein the one of the control solutions is associated with an optimal threshold allowable speed; and
    (f) responsively actuating, by a vehicle actuation system on the mobile industrial vehicle, a vehicle speed control element when the mobile industrial vehicle exceeds the optimal threshold allowable speed to cause the mobile industrial vehicle to alter movement operations within a time window and achieve a desired movement operation relative to a current speed of the mobile industrial vehicle.

2. The method of claim 1, wherein the mobile industrial vehicle comprises a powered vehicle and a plurality of consecutively linked towed vehicles to the powered vehicle; and
    wherein the step of determining the plurality of control solutions comprises determining, by the model predictive controller on the mobile industrial vehicle, the plurality of control solutions, wherein each of the control solutions defines the threshold allowable speed for the mobile industrial vehicle at discrete moments in time/space based upon a predicted path of the powered vehicle and the towed vehicles to the breaching point radially projected from the verified relative location of the one or more of the reflective beacons.

3. The method of claim 2, wherein the path of the powered vehicle and the towed vehicles is predicted by the model predictive controller without active detection of the location of any of the towed vehicles that follow the powered vehicle.

4. The method of claim 1, wherein the fusing step (c) comprises:
    determining one or more bounding boxes based upon sensor data generated by the camera sensor when detecting the one or more objects;
    determining a mapped space based upon sensor data generated by the LiDAR sensor when detecting the one or more of the reflective beacons;
    projecting the determined one or more bounding boxes into the determined mapped space; and
    comparing the determined one or more bounding boxes to objects detected in the mapped space to verify the relative location of the one or more of the reflective beacons.

5. The method of claim 4, wherein the step of projecting the determined one or more bounding boxes into the determined mapped space is performed by the sensor processing system using a convolutional neural network.

6. The method of claim 1, wherein the fusing step (c) comprises:
    determining the one or more bounding boxes and a camera confidence score based upon the sensor data generated by the camera sensor when detecting the one or more objects;
    determining the mapped space and a LiDAR confidence score based upon the sensor data generated by the LiDAR sensor when detecting the one or more of the reflective beacons;

projecting the determined one or more bounding boxes into the determined mapped space to identify the relative location of the one or more objects and determine a final confidence score based upon the camera confidence score and the LiDAR confidence score;

disregarding the identified relative location of a particular one of the one or more objects when the final confidence score for that particular one of the one or more objects is below a confidence threshold; and comparing the determined one or more bounding boxes to objects detected in the mapped space to verify the relative location of the one or more objects not disregarded based on its respective final confidence score.

7. The method of claim 6, wherein at least the step of disregarding the identified relative location of the one or more objects when the final confidence score is below the confidence threshold is performed by fuzzy logic within the sensor processing system.

8. The method of claim 1 further comprising the step of deploying the one or more reflective beacons relative to the high value asset.

9. The method of claim 8, wherein the step of deploying the one or more reflective beacons relative to the high value asset comprises placing the one or more reflective beacons next to the high value asset.

10. The method of claim 8, wherein the step of deploying the one or more reflective beacons relative to the high value asset comprises actuating at least one of the one or more reflective beacons from a stowed position to a deployed active position.

11. The method of claim 8, wherein the step of deploying the one or more reflective beacons relative to the high value asset comprises actuating at least one of the one or more reflective beacons from a stowed position on the high value asset to a deployed active position on the high value asset.

12. The method of claim 1, wherein the step of responsively actuating a vehicle speed control element comprises actuating a throttle on the mobile industrial vehicle as the vehicle speed control element.

13. The method of claim 1, wherein the step of responsively actuating a vehicle speed control element comprises applying a brake on the mobile industrial vehicle as the vehicle speed control element.

14. An enhanced system for collision avoidance by a mobile industrial vehicle of a high value asset based upon multi-sensor data fusion, the high value asset having one or more reflective beacons disposed relative to the high value asset, the system comprising:

a sensing processing system disposed on the mobile industrial vehicle, the sensing processing system further comprising:

a LiDAR sensor mounted in a forward orientation to detect one or more of the reflective beacons in front of the mobile industrial vehicle, a camera sensor mounted in a forward orientation to detect one or more objects in front of the mobile industrial vehicle, a multi-processor module responsive to inputs from each of the LiDAR sensor and the camera sensor and operative to fuse the sensor data detected by each of the LiDAR sensor and the camera sensor to identify a relative location of the one or more of the reflective beacons based upon a multi-sensor fused data source using the detected LiDAR sensor data and the detected camera sensor data;

a model predictive controller disposed on the mobile industrial vehicle, the model predictive controller configured by being programmatically operative to:

determine a plurality of control solutions, wherein each of the control solutions defines a threshold allowable speed for the mobile industrial vehicle at discrete moments based upon an estimated path to a breaching point radially projected from the verified relative location of the one or more of the reflective beacons;

identify one of the control solutions as an optimal solution based upon a performance cost function, wherein the one of the control solutions is associated with an optimal threshold allowable speed; and a vehicle actuation system comprising at least a vehicle actuator configured to respond to when the mobile industrial vehicle exceeds the optimal threshold allowable speed by causing the mobile industrial vehicle to alter movement operations of the mobile industrial vehicle to avoid collision with the high value asset.

15. The system of claim 14, wherein the mobile industrial vehicle comprises a powered vehicle and a plurality of consecutively linked towed vehicles to the powered vehicle; and wherein the model predictive controller is further configured by being further programmatically operative to determine the plurality of control solutions, wherein each of the control solutions defines the threshold allowable speed for the mobile industrial vehicle at discrete moments in time/space based upon a predicted path of the powered vehicle and the towed vehicles to the breaching point radially projected from the verified relative location of the one or more of the reflective beacons.

16. The system of claim 15, wherein the path of the powered vehicle and the towed vehicles is predicted by the model predictive controller without active detection of the location of any of the towed vehicles that follow the powered vehicle.

17. The system of claim 14, wherein the multi-processor module of the sensing processing system is operatively configured to fuse the sensor data detected by each of the LiDAR sensor and the camera sensor in order to identify the relative location of the one or more of the reflective beacons by being programmatically operative to:

determine one or more bounding boxes based upon sensor data generated by the camera sensor when detecting the one or more objects;

determine a mapped space based upon sensor data generated by the LiDAR sensor when detecting the one or more of the reflective beacons;

project the determined one or more bounding boxes into the determined mapped space; and compare the determined one or more bounding boxes to objects detected in the mapped space to verify the relative location of the one or more of the reflective beacons.

18. The system of claim 17, wherein the multi-processor module of the sensing processing system is operatively configured to project the determined one or more bounding boxes into the determined mapped space using a convolutional neural network.

19. The system of claim 14, wherein the multi-processor module of the sensing processing system is operatively configured to fuse the sensor data detected by each of the LiDAR sensor and the camera sensor in order to identify the relative location of the one or more of the reflective beacons by being programmatically operative to:

determine one or more bounding boxes and a camera confidence score based upon the sensor data generated by the camera sensor when detecting the one or more objects;

determine a mapped space and a LiDAR confidence score based upon the sensor data generated by the LiDAR sensor when detecting the one or more of the reflective beacons;

project the determined one or more bounding boxes into the determined mapped space to identify the relative location of the one or more objects and determine a final confidence score based upon the camera confidence score and the LiDAR confidence score;

disregard the identified relative location of a particular one of the one or more objects when the final confidence score for that particular one of the one or more objects is below a confidence threshold; and compare the determined one or more bounding boxes to objects detected in the mapped space to verify the relative location of the one or more objects not disregarded based on its respective final confidence score.

20. The system of claim 14, wherein the multi-processor module of the sensing processing system is operatively configured to fuse the sensor data detected by each of the LiDAR sensor and the camera sensor in order to identify the relative location of the one or more of the reflective beacons by using fuzzy logic that is programmatically operative to:

determine one or more bounding boxes and a camera confidence score based upon the sensor data generated by the camera sensor when detecting the one or more objects;

determine a mapped space and a LiDAR confidence score based upon the sensor data generated by the LiDAR sensor when detecting the one or more of the reflective beacons;

project the determined one or more bounding boxes into the determined mapped space to identify the relative location of the one or more objects and determine a final confidence score based upon the camera confidence score and the LiDAR confidence score;

disregard the identified relative location of a particular one of the one or more objects when the final confidence score for that particular one of the one or more objects is below a confidence threshold; and compare the determined one or more bounding boxes to objects detected in the mapped space to verify the relative location of the one or more objects not disregarded based on its respective final confidence score.

21. The system of claim 14, wherein each of the one or more reflective beacons comprises a base support and a vertical pole attached to the base support, wherein the vertical pole includes reflective material disposed along a length of the vertical pole.

22. The system of claim 14, wherein at least one of the one or more reflective beacons comprises an integral reflective beacon as part of the high value asset, wherein the integral reflective beacon is actuated from a stowed position where the integral reflective beacon is not visible to a deployed active position where the integral reflective beacon is visible.

23. The system of claim 14, wherein the vehicle actuator comprises a throttle disposed on the mobile industrial vehicle.

24. The system of claim 14, wherein the vehicle actuator comprises a brake disposed on the mobile industrial vehicle.

25. The system of claim 14, wherein the vehicle actuation system further comprises:

a vehicle monitor that monitors the current speed of the mobile industrial vehicle; and a feedback control system that responsively actuates the vehicle actuator when the monitored speed of the mobile industrial vehicle exceeds the optimal threshold allowable speed to cause the mobile industrial vehicle to alter movement operations of the mobile industrial vehicle within a predetermined time window.

26. An enhanced system for collision avoidance by a mobile industrial vehicle of a high value asset based upon multi-sensor data fusion, the system comprising:

a plurality of reflective beacons disposed relative to pre-designated positions on the high value asset;

a sensing processing system disposed on the mobile industrial vehicle, the sensing processing system further comprising:

a LiDAR sensor mounted in a forward orientation to detect one or more of the reflective beacons in front of the mobile industrial vehicle, a camera sensor mounted in a forward orientation to detect one or more objects in front of the mobile industrial vehicle, a multi-processor module responsive to inputs from each of the LiDAR sensor and the camera sensor and operative to fuse the sensor data detected by each of the LiDAR sensor and the camera sensor to identify a relative location of the one or more of the reflective beacons based upon a multi-sensor fused data source using the detected LiDAR sensor data and the detected camera sensor data, wherein the multi-processor module of the sensing processing system is operatively configured to fuse the sensor data detected by each of the LiDAR sensor and the camera sensor in order to identify the relative location of the one or more of the reflective beacons by being programmatically operative to:

determine one or more bounding boxes based upon sensor data generated by the camera sensor when detecting the one or more objects;

determine a mapped space based upon sensor data generated by the LiDAR sensor when detecting the one or more of the reflective beacons;

project the determined one or more bounding boxes into the determined mapped space; and compare the determined one or more bounding boxes to objects detected in the mapped space to verify the relative location of the one or more of the reflective beacons;

a model predictive controller disposed on the mobile industrial vehicle, the model predictive controller configured by being programmatically operative to:

determine a plurality of control solutions, wherein each of the control solutions defines a threshold allowable speed for the mobile industrial vehicle at discrete moments based upon an estimated path to a breaching point radially projected from the verified relative location of the one or more of the reflective beacons;

identify one of the control solutions as an optimal solution based upon a performance cost function, wherein the one of the control solutions is associated with an optimal threshold allowable speed; and a vehicle actuation system comprising at least a vehicle actuator configured to respond to when the mobile industrial vehicle exceeds the optimal threshold allowable speed by causing the mobile industrial vehicle to alter movement operations of the mobile industrial vehicle to avoid collision with the high value asset.

27. An enhanced system for front guard collision avoidance by a mobile industrial vehicle of objects in a direction of travel of a mobile industrial vehicle based upon multi-sensor data fusion, the system comprising:
- a sensing processing system disposed on the mobile industrial vehicle, the sensing processing system further comprising:
  - a LiDAR sensor mounted in a forward orientation to detect one or more of the objects in front of the mobile industrial vehicle,
  - a camera sensor mounted in a forward orientation to detect the one or more objects in front of the mobile industrial vehicle,
  - a multi-processor module responsive to inputs from each of the LiDAR sensor and the camera sensor and operative to fuse the sensor data detected by each of the LiDAR sensor and the camera sensor to identify a relative location of the one or more of the objects based upon a multi-sensor fused data source using the detected LiDAR sensor data and the detected camera sensor data, wherein the multi-processor module of the sensing processing system is operatively configured to fuse the sensor data detected by each of the LiDAR sensor and the camera sensor in order to identify the relative location of the one or more of the objects by being programmatically operative to:
    - determine one or more bounding boxes based upon sensor data generated by the camera sensor when detecting the one or more objects;
    - determine a mapped space based upon sensor data generated by the LiDAR sensor when detecting the one or more of the objects;
    - project the determined one or more bounding boxes into the determined mapped space; and
    - compare the determined one or more bounding boxes to objects detected in the mapped space to verify the relative location of the one or more of the objects;
- a model predictive controller disposed on the mobile industrial vehicle, the model predictive controller configured by being programmatically operative to:
  - determine a plurality of control solutions, wherein each of the control solutions defines a threshold allowable speed for the mobile industrial vehicle at discrete moments based upon an estimated path to a breaching point radially projected from the verified relative location of the one or more of the objects;
  - identify one of the control solutions as an optimal solution based upon a performance cost function, wherein the one of the control solutions is associated with an optimal threshold allowable speed; and
- a vehicle actuation system comprising at least a vehicle actuator configured to respond to when the mobile industrial vehicle exceeds the optimal threshold allowable speed by causing the mobile industrial vehicle to alter movement operations of the mobile industrial vehicle to avoid collision with the objects.

28. The system of claim 27, wherein the multi-processor module is responsive to inputs from each of the LiDAR sensor and the camera sensor by being further programmatically operative to dynamically adjust an effective field of view for at least one of the LiDAR sensor and the camera sensor considered by the multi-processor module in response to the altered movement operations of the mobile industrial vehicle.

29. The system of claim 27, wherein the multi-processor module is responsive to inputs from each of the LiDAR sensor and the camera sensor by being further programmatically operative to dynamically adjust an effective field of view for at least one of the LiDAR sensor and the camera sensor considered by the multi-processor module in response to detection of a change in direction of the mobile industrial vehicle.

30. The system of claim 27, wherein the multi-processor module is responsive to inputs from each of the LiDAR sensor and the camera sensor by being further programmatically operative to
- detect an object identification marker using sensor data generated by at least one of the LiDAR sensor and the camera sensor;
- identify the detected object identification marker as a boundary identifier between a first operating area and a second operating area; and
- dynamically adjust an effective field of view for subsequent sensor data generated by at least one of the LiDAR sensor and the camera sensor in response to identified boundary identifier.

31. The system of claim 28, wherein the multi-processor module is further programmatically operative to dynamically adjust the effective field of view for at least one of the LiDAR sensor and the camera sensor by being further operative to dynamically limit at least one of the detected LiDAR sensor data and the detected camera sensor data used in the multi-sensor fused data source for identifying the relative location of the one or more of the objects.

32. The system of claim 31, wherein the dynamically limited at least one of the detected LiDAR sensor data and the detected camera sensor data used in the multi-sensor fused data source is dynamically limited to effectively adjust where the at least one of the LiDAR sensor and the camera sensor is focused.

33. The system of claim 31, wherein the dynamically limited at least one of the detected LiDAR sensor data and the detected camera sensor data used in the multi-sensor fused data source is dynamically limited to effectively adjust a degree of reception field width for the at least one of the LiDAR sensor and the camera sensor.

34. A method for enhanced collision avoidance by a mobile industrial vehicle using a multi-mode onboard collision avoidance system and that may operate in a plurality of different operating areas, the multi-mode onboard collision avoidance system having a plurality of sensors, the method comprising the steps of:
- operating, by the multi-mode onboard collision avoidance system on the mobile industrial vehicle, in a first collision avoidance mode while the mobile industrial vehicle is operating in a first of the different operating areas;
- detecting, by one of the sensors of the multi-mode onboard collision avoidance system, a first object identification marker;
- identifying, by the multi-mode onboard collision avoidance system, the detected first object identification marker to be an operating boundary identification marker;
- detecting, by the one or more of the sensors of the multi-mode onboard collision avoidance system, when the mobile industrial vehicle passes a zonal boundary associated with the operating boundary identification marker and enters a second of the different operating areas; and changing, by the multi-mode onboard collision avoidance system, operations from the first collision avoidance mode to a second collision avoidance mode governing operations of the multi-mode onboard collision avoidance system when in the second of the different operating areas, wherein the second collision avoidance mode comprises at least one operating parameter that is more restrictive compared to the at least one operating parameter in the first collision avoidance mode.

35. The method of claim 34, wherein the step of changing operations from the first collision avoidance mode to the second collision avoidance mode comprises using a second set of operating parameters for the multi-mode onboard collision avoidance system when in the second collision avoidance mode instead of a first set of operating parameters for the multi-mode onboard collision avoidance system when in the first collision avoidance mode, wherein the at least one operating parameter has a more restrictive value as part of the second set of operating parameters when compared to as part of the first set of operating parameters.

36. The method of claim 34, wherein the at least one operating parameter comprises a speed limit threshold for the mobile industrial vehicle.

37. The method of claim 34, wherein the at least one operating parameter comprises a keep off distance for the mobile industrial vehicle.

38. The method of claim 37, wherein the keep off distance for the mobile industrial vehicle comprises a minimum radial distance from the mobile industrial vehicle to an object as detected by the multi-mode onboard collision avoidance system.

39. The method of claim 37, wherein the keep off distance for the mobile industrial vehicle comprises a minimum radial distance from the mobile industrial vehicle to a reflective beacon as detected by the multi-mode onboard collision avoidance system.

40. The method of claim 34, wherein the second collision avoidance mode comprises at least one additional operating feature of the multi-mode collision avoidance system used in the second collision avoidance mode when compared to operating features of the multi-mode collision avoidance system used in the first collision avoidance mode.

41. The method of claim 40, wherein the additional operating feature of the multi-mode collision avoidance system comprises a minimum keep off distance threshold feature of causing the mobile industrial vehicle to not be moved within the minimum keep off distance threshold from an object detected by the sensor.

42. The method of claim 40, wherein the additional operating feature of the multi-mode collision avoidance system comprises an object persistence feature of tracking a detected object after the detected object is out of the field of view of the sensor.

43. The method of claim 40, wherein the additional operating feature of the multi-mode collision avoidance system comprises an altered field of view feature of changing the field of view of the sensor to enhance avoiding a collision when operating in the second collision avoidance mode.

44. The method of claim 40, wherein the additional operating feature of the multi-mode collision avoidance system comprises a specialized object detection feature of enabling separate detection of a reflective beacon distinct from and in addition to detection of other objects when operating in the second collision avoidance mode.

45. The method of claim 40, wherein the first object identification marker comprises an ArUco marker coded to correspond represent the zonal boundary and configured to indicate an orientation for the zonal boundary.

* * * * *